US008498923B2

(12) United States Patent
Marynowski et al.

(10) Patent No.: US 8,498,923 B2
(45) Date of Patent: Jul. 30, 2013

(54) AUTOMATED TRADING SYSTEM IN AN ELECTRONIC TRADING EXCHANGE

(75) Inventors: John M. Marynowski, Buffalo, NY (US); Catalin D. Voinescu, London (GB); Stefan Puscasu, Bucharest (RO); Thomas M. O'Donnell, Woodstock, IL (US)

(73) Assignee: Edge Capture, LLC, Woodstock, IL (US)

( * ) Notice: Subject to any disclaimer, the term of this patent is extended or adjusted under 35 U.S.C. 154(b) by 0 days.

(21) Appl. No.: 13/096,176

(22) Filed: Apr. 28, 2011

(65) Prior Publication Data
US 2012/0030086 A1 Feb. 2, 2012

Related U.S. Application Data

(62) Division of application No. 11/474,951, filed on Jun. 27, 2006, which is a division of application No. 09/417,774, filed on Oct. 14, 1999, now Pat. No. 7,251,629.

(51) Int. Cl.
*G06Q 40/00* (2012.01)

(52) U.S. Cl.
USPC ............. 705/37; 705/36 R; 705/38; 705/26.1; 235/380

(58) Field of Classification Search
CPC .................................................... G06Q 40/00
USPC ................... 705/37, 36 R, 38, 26.1; 235/380
See application file for complete search history.

(56) References Cited

U.S. PATENT DOCUMENTS

| 2,046,381 A | 7/1936 | Hicks |
| 3,082,402 A | 3/1963 | Scantlin |

(Continued)

FOREIGN PATENT DOCUMENTS

| EP | 0573991 | 12/1993 |
| GB | 2277177 A | 10/1994 |

(Continued)

OTHER PUBLICATIONS

Letter to Janice Mitnick of the SEC from Timothy H. Thompson, The Chicago Board Options Exchange, dated Jun. 12, 1997, re Amendment No. 2 to SR-CBOE-96-68. 4 pages.

(Continued)

*Primary Examiner* — Daniel Felten
(74) *Attorney, Agent, or Firm* — Edell, Shapiro & Finnan, LLC

(57) ABSTRACT

An electronic exchange system network includes a trader site having an automated trading system capable of submitting orders to an exchange site. The automated trading system determines whether an order should be submitted based on, for example, the current market price of an option and theoretical buy and sell prices. The theoretical buy and sell prices are derived from, among other things, the current market price of the security underlying the option. A look-up table stores a range of theoretical buy and sell prices for a given range of current market price of the underlying security. Accordingly, as the price of the underlying security changes, a new theoretical price may be indexed in the look-up table, thereby avoiding calculations that would otherwise slow automated trading decisions. Other techniques may be used in addition or in the alternative to speed automatic decision-making. In addition, a system of checks may be conducted to ensure accurate and safe automated trading. The automated trading system may be capable of automatically submitting orders in connection with the underlying security in order to hedge part of the delta risk associated with the automated option trades.

50 Claims, 11 Drawing Sheets

U.S. PATENT DOCUMENTS

| | | | |
|---|---|---|---|
| 3,296,597 A | 1/1967 | Scantlin |
| 3,573,747 A | 4/1971 | Adams |
| 3,581,072 A | 5/1971 | Nymeyer |
| 4,412,287 A | 10/1983 | Braddock, III |
| 4,674,044 A | 6/1987 | Kalmus |
| 4,823,265 A | 4/1989 | Nelson |
| 4,903,201 A | 2/1990 | Wagner |
| 5,038,284 A | 8/1991 | Kramer |
| 5,063,507 A | 11/1991 | Lindsey |
| 5,077,665 A | 12/1991 | Silverman |
| 5,101,353 A | 3/1992 | Lupien |
| 5,151,103 A | 9/1992 | Tepic |
| 5,161,103 A | 11/1992 | Kosaka |
| 5,258,908 A | 11/1993 | Hartheimer |
| 5,267,148 A | 11/1993 | Kosaka et al. |
| 5,270,922 A | 12/1993 | Higgins |
| 5,297,032 A | 3/1994 | Trojan |
| 5,313,560 A | 5/1994 | Maruoka |
| 5,315,634 A | 5/1994 | Tanaka |
| 5,339,392 A | 8/1994 | Risberg |
| 5,375,055 A | 12/1994 | Togher |
| 5,497,317 A | 3/1996 | Hawkins |
| 5,500,793 A | 3/1996 | Deming, Jr. |
| 5,557,517 A | 9/1996 | Daughterty, III |
| 5,630,126 A | 5/1997 | Redpath |
| 5,655,088 A | 8/1997 | Midorikawa |
| 5,732,397 A | 3/1998 | DeTore |
| 5,774,880 A | 6/1998 | Ginsberg |
| 5,787,402 A | 7/1998 | Potter |
| 5,799,287 A | 8/1998 | Dembo |
| 5,809,483 A | 9/1998 | Broka |
| 5,819,238 A | 10/1998 | Fernholz |
| 5,845,266 A | 12/1998 | Lupien |
| 5,857,176 A | 1/1999 | Ginsberg |
| 5,870,730 A | 2/1999 | Furuya |
| 5,873,071 A | 2/1999 | Ferstenberg |
| 5,884,286 A | 3/1999 | Daughtery, III |
| 5,905,974 A | 5/1999 | Fraser |
| 5,926,801 A | 7/1999 | Matsubara |
| 5,940,810 A | 8/1999 | Traub |
| 5,950,176 A | 9/1999 | Keiser |
| 5,963,923 A | 10/1999 | Garber |
| 6,016,483 A | 1/2000 | Rickard |
| 6,049,783 A | 4/2000 | Segal |
| 6,058,391 A | 5/2000 | Gardner |
| 6,061,662 A | 5/2000 | Makivic |
| 6,064,985 A | 5/2000 | Anderson |
| 6,134,535 A | 10/2000 | Belzberg |
| 6,173,270 B1 | 1/2001 | Cristofich |
| 6,236,980 B1 | 5/2001 | Reese |
| 6,263,321 B1 | 7/2001 | Daughtery, III |
| 6,304,858 B1 | 10/2001 | Mosler |
| 6,317,728 B1 | 11/2001 | Kane |
| 6,347,307 B1 | 2/2002 | Sandhu |
| 6,377,940 B2 | 4/2002 | Tilfors et al. |
| 6,405,180 B2 | 6/2002 | Tilfors et al. |
| 6,415,269 B1 | 7/2002 | Dinwoodie |
| 6,418,417 B1 | 7/2002 | Corby |
| 6,418,419 B1 | 7/2002 | Nieboer et al. |
| 6,519,574 B1 | 2/2003 | Wilton |
| 6,546,375 B1 | 4/2003 | Pang et al. |
| 6,594,643 B1 | 7/2003 | Freeny, Jr. |
| 6,618,707 B1 | 9/2003 | Gary |
| 6,832,210 B1 | 12/2004 | Li |
| 6,839,686 B1 | 1/2005 | Galant |
| 6,990,467 B1 | 1/2006 | Kwan |
| 7,024,387 B1 | 4/2006 | Nieboer et al. |
| 7,103,569 B1 | 9/2006 | Groveman |
| 7,155,410 B1 | 12/2006 | Woodmansey |
| 7,162,448 B2 | 1/2007 | Madoff |
| 7,165,043 B2 | 1/2007 | Keyes |
| 7,236,952 B1 | 6/2007 | D'Zmura |
| D551,675 S | 9/2007 | Noviello |
| 7,315,838 B2 | 1/2008 | Gershon |
| 7,356,499 B1 | 4/2008 | Amburn |
| 7,383,220 B1 | 6/2008 | Keith |
| 7,383,222 B2 | 6/2008 | Keith |
| 7,398,244 B1 | 7/2008 | Keith |
| 7,412,416 B2 | 8/2008 | Friesen |
| 7,472,087 B2 | 12/2008 | Keith |
| 7,496,533 B1 | 2/2009 | Keith |
| 7,539,638 B1 | 5/2009 | Keith |
| 7,613,647 B1 | 11/2009 | Cushing |
| 2001/0005835 A1 | 6/2001 | Kodama |
| 2002/0010673 A1 | 1/2002 | Muller |
| 2002/0019779 A1 | 2/2002 | Healey |
| 2002/0019794 A1 | 2/2002 | Katz et al. |
| 2002/0023048 A1 | 2/2002 | Buhannic |
| 2002/0026321 A1 | 2/2002 | Faris |
| 2002/0120555 A1 | 8/2002 | Lerner |
| 2007/0156574 A1* | 7/2007 | Marynowski et al. .......... 705/37 |

FOREIGN PATENT DOCUMENTS

| | | |
|---|---|---|
| WO | 9010910 A1 | 9/1990 |
| WO | 9506918 | 3/1995 |
| WO | 9710559 | 3/1997 |
| WO | 9737735 AI | 10/1997 |
| WO | 0051043 | 8/2000 |
| WO | 0062212 | 10/2000 |

OTHER PUBLICATIONS

Memo to Charles Henry from Timothy Thompson dated Nov. 7, 1996, re Rule Filing, regarding RAES Kickouts including Securities and Exchange Commission, File No. SR-CBOE-96—entitled "Securities and Exchange Commission Form 19b-4, Proposed Rule Change by the CBOE", pp. 1-5, 6, and 8-15.

File Memos to Office of the Chairman from Timothy Thompson, The Chicago Board Options Exchange, dated Oct. 15, 1996, re Rule Filing, regarding RAES Kickouts and Memo to Office of the Chairman from Timothy Thompson dated Oct. 2, 1996, re RAES, reject Rule Filing including Securities and Exchange Commission, File No. SR-CBOE-96—entitled "Securities and Exchange Commission Form 19b-4, Proposed Rule Change by the CBOE", pp. 1-9.

The Chicago Board Options Exchange, Regulatory Bulletin, vol. RB8, No. 14, dated Jul. 23, 1997, pp. 1-24.

Federal Register, vol. 62, No. 125, dated Jun. 30, 1997, pp. 35241-35243 re File No. SR-CBOE-96-68.

Draft letter to Janice Mitnick of the SEC from Timothy Thompson, The Chicago Board Options Exchange, dated Dec. 12, 1996, re Amendment No. 1 to SR-CBOE-96-68 including Draft CBOE, Inc. Rules Chapter VI, 4 pages, and Securities and Exchange Commission, File No. SR-CBOE-96-68 entitled "Securities and Exchange Commission Form 19b-4, Proposed Rule Change by the CBOE", pp. 1-13.

The Chicago Board Options exchange, Regulatory Bulletin, vol. RB7, No. 47, dated Dec. 25, 1996, pp. 1-7.

Letter to Sharon Lawson of the SEC from Nancy L. Nielsen, The Chicago Board Options Exchange, dated Aug. 31, 1995, re SR-CBOE-95-52 including Securities and Exchange Commission File No. SR-CBOE-95-52, entitled "Securities and Exchange Commission Form 19b-4, Proposed Rule Change by the CBOE", pp. 1-28.

Letter to John Ayanian of the SEC from Michael L. Meyer of Schiff Hardin & Waite, dated Dec. 14, 1995 re File No. SR-CBOE-95-52, 2 pages.

The Chicago Board Options Exchange, Regulatory Bulletin, vol. RB6, No. 23, dated Dec. 27, 1995, pp. 1-12.

Federal Register, vol. 60, No. 206, dated Oct. 25, 1995, pp. 54737-54739 re SR-CBOE-95-52.

The Chicago Board Options Exchange 1995 Information Circulars Memo to Membership from Legal Department dated Jan. 24, 1996, entitled Information Circular IC96-04, 5 pages.

The Chicago Board Options Exchange, Regulatory Bulletin, vol. RB7, No. 2, dated Jan. 24, 1996, pp. 1-15.

The Chicago Board Options Exchange, regulatory Circular RG96-13 to Membership from Legal Department dated Jan. 24, 1996, entitled "1995 Regulatory Circulars", pp. 1-12.

Federal Register, vol. 61, No. 2, dated Jan. 3, 1996, pp. 199-202 re SR-CBOE-95-52.

Securities and Exchange Commission File No. SR-CBOE-89-27, entitled "Form 19b-4, Proposed Rule Change by the Chicago Board Options Exchange, Inc.", pp. 1-8.

Securities and Exchange Commission File No. SR-CBOE-89-27, Amendment No. 2, entitled "Form 19b-4, Proposed Rule Change by the Chicago Board Options Exchange, Inc.", pp. 1-16.
Federal Register, vol. 55, No. 49, dated Mar. 13, 1990, Notices, pp. 9384-9386, re SR-CBOE-89-27.
Federal Register, vol. 55, No. 178, dated Sep. 13, 1990, Notices, pp. 37784-37786, re SR-CBOE-89-27 and SR-CBOE-89-29.
The Chicago Board Options Exchange "RAES : Retail Automatic Execution System", Feb. 1990, pp. 1-5.
Letter to Mr. Howard Kramer of the SEC from Robert P. Ackermann, the Chicago Board Options Exchange, dated Aug. 10, 1990, re SR-CBOE-89-27 Amendment No. 2 and SR-CBOE-89-29 Amendment No. 1.
Federal Register, vol. 55, No. 148, dated Aug. 1, 1990, Notices, pp. 31272-31273.
Federal Register, vol. 55, No. 154, dated Aug. 9, 1990, Notices, pp. 32523-32524.
Letter to Mr. Howard Kramer of the SEC from Robert P. Ackermann, the Chicago Board Options Exchange, dated Jan. 22, 1990, re Amendments to SR-CBOE-89-27, SR-CBOE-89-28, SR-CBOE-89-29, and SR-CBOE-89-30.
Notes, 1 page re 89-27, dated Jul. 3, 1990, Gene Lopez, systems on RAES.
Letter to Mr. Howard Kramer of the SEC from Robert P. Ackermann, the Chicago Board Options Exchange, dated Mar. 7, 1990, re SR-CBOE-89-27 Amendment No. 1.
Notes—handwritten, 2 pages dated Jan. 17, 1990 re RAES, author unknown.
Letter to Howard Kramer of the SEC from Robert P. Ackermann, the Chicago Board Options Exchange, dated Jun. 27, 1990, re SR OBOE 89-27 as Amended, 2 pages.
Securities and Exchange Commission File No. SR-CBOE-89-27, entitled "Form 19b-4, Proposed Rule Change by the Chicago Board Options Exchange, Inc.", pp. 1-16.
Exhibit A, RAES Equity Daily Contracts, Month Totals for May 1990, 36 pages.
Exhibit B, RAES Equity Daily Orders, Month Totals for May 1990, 13 pages.
Exhibit C, Projected RAES Equity 11-20 Lot Front & Second Month Contracts, Month Totals for May 1990, *Includes all ORS orders after 8:40 a.m., Premium Under $10, 5 pages.
Exhibit D, Projected RAES Equity 11-20 Lot Front & Second Month Orders, Month Totals for May 1990, *Includes All ORS orders after 8:40 a.m., Premium Under $10, 5 pages.
The Chicago Board Options Exchange, Regulatory Bulletin, Sep. 26, 1990, vol. RB2, No. 18, pp. 1-8.
The Chicago Board Options Exchange, Regulatory Bulletin, Feb. 14, 1990, vol. RB2, No. 3, pp. 1-12.
Letter to Howard Kramer of the Sec from Nancy L. Nielsen, the Chicago Board Options Exchange, dated Dec. 16, 1997, re SR-CBOE-97-66 including File No. SR-CBOE-97-66, entitled "Securities and Exchange Commission Form 19b-4, Proposed Rule Change by Chicago Board Options Exchange", pp. 1-15.
Federal Register, vol. 63, No. 25, dated Feb. 6, 1998, Notices, pp. 6247-6249, re SR-CBOE-97-66.
The Chicago Board Options Exchange, Regulatory Bulletin, Feb. 25, 1998, vol. RB9, No. 4, pp. 1-15.
The Chicago Board Options Exchange, Regulatory Bulletin, Feb. 11, 1998, vol. RB9, No. 3, pp. 1-20.
Letter to Richard Strasser of the SEC from Stephanie C. Mullins, the Chicago Board Options Exchange, dated Jul. 27, 1999, re Amendment 2 to SR-CBOE-98-53 including Exhibit A, Chicago Board Options Exchange, Inc. Rules, Chapter VIII—Market-Makers, Trading Crowds and Modified Trading Systems, Section B: Trading Crowds, 4 pages.
Handwritten Notes dated Jan. 6, 1998, re Connie Kigins, Sonia Patton, and SR-CBOE-98-53, author unknown.
Federal Register, vol. 64, No. 154, dated Aug. 11, 1999, Notices, pp. 43793-43795, re SR-CBOE-98-53.
The Chicago Board Options Exchange, Regulatory Bulletin, vol. RB10, No. 35, dated Aug. 27, 1999, pp. 1-8.
The Chicago Board Options Exchange, Regulatory Bulletin, vol. RB10, No. 1, dated Jan. 4, 1999, pp. 1-8.

Letter to Gordon Fuller of the Sec from Timothy Thompson, the Chicago Board Options Exchange, dated Sep. 29, 2000, re Amendment No. 1 to SR-CBOE-99-51 including Exhibit A, Chapter VIII-Market-Makers, Trading Crowds and Modified Trading Systems, Section B: Trading Crowds, 3 pages.
Letter to Michael Walinskas of the SEC from Nancy L. Nielsen, the Chicago Board Options Exchange, dated Aug. 31, 1999, re SR-CBOE-99-51 including File No. SR-CBOE-99-51, entitled "Securities and Exchange Commission Form 19b-4 Proposed Rule Change by Chicago Board Options Exchange", pp. 1-18.
E-Mail to thomptim@cboe.com from PatelS@sec.gov, dated Nov. 6, 2000, re CBOE-99-51 including Chapter VIII—Market-Makers, Trading Crowds and Modified Trading Systems, Section B: Trading Crowds.
E-Mail to Tim Thompson from Karen Calvin dated Jun. 27, 2000, re 8.51.03.
Handwritten Notes dated Sep. 27, 2000, re John Roeser, Gordon Fuller, and File 99-51, 1 page, author unknown.
Handwritten Notes dated Oct. 30, 2000, re 99-51, Gordon Fuller, and Supna Patel, author unknown.
Letter to Sharon Lawson of the SEC from Nancy Nielsen, the Chicago Board Options Exchange, dated Mar. 31, 1994 re File No. SR-CBOE-94-12 including File No. SR-CBOE-94-12, entitled Proposed Rule Change by the Chicago Board Options Exchange, Inc., pp. 1-17.
Letter to John Ayanian of the SEC from Michael L. Meyer, Schiff Hardin & Waite, dated Feb. 17, 1995, re File Nos. SR-CBOE-95-05 and 95-06.
Letter to Sharon Lawson of the SEC from Nancy Nielsen, the Chicago Board Options Exchange, dated Jan. 17, 1995, re File No. SR-CBOE-95-06 including File No. SR-CBOE-95-06, entitled Proposed Rule Change by the Chicago Board Options Exchange, Inc., pp. 1-16.
Federal Register, vol. 62, No. 250, dated Dec. 31, 1997, pp. 68326-68327, re SR-CBOE-97-61.
The Chicago Board Options Exchange, Regulatory Bulletin, vol. RB9, No. 1, dated Jan. 14, 1998, pp. 1-16.
Letter to Howard Kramer of the SEC from Nancy Nielsen, the Chicago Board Options Exchange, dated Dec. 1, 1997, re SR-CBOE-97-61 including File No. SR-CBOE-97-61, entitled Proposed Rule Change by the Chicago Board Options Exchange, Inc., pp. 1-44.
Letter to Richard Strasser of the SEC from Joanne Moffic-Silver, the Chicago Board Options Exchange, dated Dec. 24, 1997, re SR-CBOE 97-61 including draft charters for all Market Performance Committees and Floor Procedure Committees, 8 pages.
Letter to Sharon Lawson of the SEC from Michael L. Meyer, Schiff Hardin & Waite, dated Aug. 31, 1993, re Amendment No. 2 to File No. SR-CBOE-93-22; RAES Anti-Trade-Through Procedures including Exhibit A, Chapter VI Doing Business on the Exchange Floor, one page.
Letter to Sharon Lawson of the SEC from Michael L. Meyer, Schiff Hardin & Waite, dated Jun. 10, 1993, re Amendment No. 1 to File No. SR-CBOE-93-22 including Exhibit A, Chapter VI Doing Business on the Exchange Floor, one page.
Letter to Sharon Lawson of the SEC from Nancy Nielsen, the Chicago Board Options Exchange, dated May 7, 1993, re File No. SR-CBOE-93-22 including File No. SR-CBOE-93-22, entitled Proposed Rule Change by the Chicago Board Options Exchange, Inc., pp. 1-12.
Federal Register, vol. 58, No. 182, dated Sep. 22, 1993, pp. 49342-49343.
The Chicago Board Options Exchange, Regulatory Bulletin, vol. RB5, No. 19, dated Oct. 13, 1993, pages.
Memo to C. Henry from N. Nielsen, the Chicago Board Options Exchange, dated May 5, 1993, re Rule Change File No. SR-CBOE-93-22.
Letter to Nancy Nielsen, the Chicago Board Options Exchange, from Michael L. Meyer, Schiff Hardin & Waite, dated May 4, 1993 re Amendment No. 1 to file 92-40.
Letter to John Ayanian of the SEC from Timothy Thompson, the Chicago Board Options Exchange, dated Sep. 16, 1997, re Amendment No. 1 to SR-CBOE-97-45 including Exhibit A—Chicago Board Options Exchange, Inc. Rules, Chapter VIII—Market-Makers, Trading Crowds and Modified Trading Systems and Exhibit B—Memo to Exchange Membership from Legal Department re Schedule of fines that may be imposed pursuant to Rule 17.50 for violations of DJX Crowd standards of trading conduct, 6 pages total.
Letter to Howard Kramer of the SEC from Nancy Nielsen, the Chicago Board Options Exchange, dated Sep. 4, 1997, re SR-CBOE-97-45 including File No. SR-CBOE-97-45, entitled Proposed Rule Change by the Chicago Board Options Exchange, Inc., pp. 1-28.
Federal Register, vol. 62, No. 198, dated Oct. 14, 1997, pp. 53358-53361, re SR-CBOE-97-45.
Letter to John Ayanian of the SEC from Timothy Thompson, the Chicago Board Options Exchange, dated Sep. 24, 1997, re SR-CBOE-97-45, 3 pages.
The Chicago Board Options Exchange, Regulatory Bulletin, vol. RB8, No. 20, dated Oct. 22, 1997, pp. 1-28.
Letter to Michael Walinskas of the SEC from Timothy Thompson, the Chicago Board Options Exchange, dated Oct. 2, 1997, re SR-CBOE-97-45, 4 pages.
Letter to Scott C. Kursman of the SEC from Michael Meyer, Schiff Hardin & Waite, dated Jul. 11, 1994, re File No. SR-CBOE-93-17.
Letter to Sharon Lawson of the SEC from Nancy Nielsen, the Chicago Board Options Exchange, dated Mar. 29, 1993, re File No. SR-CBOE-93-17 including File No. SR-CBOE-93-17, entitled Proposed Rule Change by the Chicago Board Options Exchange, Inc., pp. 1-11.
The Chicago Board Options Exchange, Regulatory Bulletin, vol. RB5, No. 16, dated Aug. 24, 1994, pp. 1-8.
Federal Register, vol. 59, No. 146, dated Aug. 1, 1994, pp. 38996-38997, re SR-CBOE-93-17.
Federal Register, vol. 59 No. 146, dated Aug. 1, 1994, pp. 39004 and 39007-39008.
Federal Register, vol. 58, No. 165, dated Aug. 27, 1993, pp. 45360-45365.
Federal Register, vol. 58, No. 109, dated Jun. 9, 1993, pp. 32404-32405, re SR-CBOE-93-17.
The Chicago Board Options Exchange, Regulatory Bulletin, vol. RB5, No. 13, dated Jul. 14, 1993, pp. 1-7.
Federal Register, vol. 59, No. 146, dated Aug. 1, 1994, pp. 38992-38997.
Memo to C. Henry from N. Nielsen, Chicago Board Options Exchange, dated Mar. 26, 1993, re Rule Change File No. SR-CBOE-93-17.
Federal Register, vol. 54, No. 119, dated Jun. 22, 1989, pp. 26284-26285, re SR-CBOE-89-04.
File No. SR-CBOE-89-04, Securities and Exchange Commission Form 19b-4, entitled Proposed Rule Change by the Chicago Board Options Exchange, Inc., pp. 1-21.
The Chicago Board Options Exchange Memo to Members and Member Organizations from Legal Services dated Jul. 14, 1989, re Firm Quotes and Other Rule Amendments Effective Jul. 24, 1989, CBOE #89-70, 2 pages.
Letter to Mark McNair of the SEC from Nancy Nielsen, the Chicago Board Options Exchange, dated Jul. 13, 1989, re SR-CBOE-89-04 including renumbered rules, 6 pages total.
Federal Register, vol. 54, No. 180, dated Sep. 19, 1989, pp. 38580-38581.
Federal Register, vol. 55, No. 99, dated May 22, 1990, pp. 21131-21135.
Federal Register, vol. 54, No. 61, dated Mar. 31, 1989, pp. 13282-13283.
Federal Register, vol. 54, No. 39, dated Mar. 1, 1989, pp. 8614-8616.
Federal Register, vol. 54, No. 40, dated Mar. 2, 1989, pp. 8856-8859.
Federal Register, vol. 54, No. 146, dated Aug. 1, 1989, pp. 31754-31755.
Securities and Exchange Commission [Release No. 34-25995; File Nos. SR-CBOE-87-35 and SR-CBOE-87-47], 53 FR 31781, 14 pages.
File No. SR-CBOE-87-35, Securities and Exchange Commission Form 19b-4, entitled Proposed Rule Change by the Chicago Board Options Exchange, Inc., pp. 1-23, including Exhibit A, RAES Usage by Trade Month Equity Customer Trades—All Firms, Sep.-May 1986.
Letter to Holly Smith of the SEC from Fred Krieger, the Chicago Board Options Exchange, dated May 10, 1988, re SR-CBOE-87-35.
Handwritten Note dated Mar. 8, 1988 re Auto-Ex to numerous recipients from Fred Krieger, the Chicago Board Options Exchange, including Amex Filing on AUTO-Ex, File No. SR-AMEX-88-6 (10 pages).
The Chicago Board Options Exchange Bulletin, vol. 16, No. 34, dated Aug. 24, 1988, 2 pages.
Handwritten Note to Ed Provost from Nancy N., Chicago Board Options Exchange, dated Aug. 13, 1989, re CBOE 85-16 Original Filing—Equity RAES and CBOE 87-35 Pilot Lumanent.
SEC [Release No. 34-25995; File Nos. SR-CBOE-87-35 and SR-CBOE-87-47], 53 FR 31781, 14 pages.
Letter to Nancy Sanow of the SEC from Joanne Moffic-Silver, Chicago Board Options Exchange, dated Nov. 4, 1999, re Withdrawal of SR-CBOE-98-44.
Letter to Richard Strasser of the SEC from Stephanie Mullins, Chicago Board Options Exchange, dated Apr. 7, 1999, re Amendment No. 3 to SR-CBOE-98-44.
Letter to Richard Strasser of the SEC from Stephanie Mullins, Chicago Board Options Exchange, dated Jan. 4, 1999, re Amendment 2 to SR-CBOE-98-44 including one page attachment Chapter VI, Doing Business on the Exchange Floor, Section A: General.
"Self-Regulatory Organizations; New York Stock Exchange LLC; Order Approving Proposed Rule Change, as Modified by Amendment No. 1 Thereto, Relating to NYSE Rule 1500"; Federal Register, vol. 73 No. 003, dated Jan. 4, 2008; Securities and Exchange Commission; Release No. 34-57058; File No. SR-NYSE-2007-102; pp. 903-909.
Brad Adelberg; "STRIP: A Soft Real-Time Main Memory Database for Open Systems"; Sep. 1997, 213 pages.
Brad Adelberg & Hector Garcia-Molina, "Project Synopsis: Evaluating STRIP", date unknown, 5 pages.
Brad Adelberg et al.; "Database Support for Efficiently Maintaining Derived Data"; Feb. 21, 2002, 25 pages.
Aley, "Way of Wall Street: Extreme Investing", Fortune Magazine, Feb. 5, 1996, pp. 114-120.
Fred D. Arditti, "Derivatives: A Comprehensive Resource for Options, Futures, Interest Rate Swaps, and Mortgage Securities", Harvard Business School Press, 1996.
Paul Asquith et al., "Short Sales and Trade Classification Algorithms", Jun. 16, 2008, 32 pages.
Howard Banks, "Great Expectations: Europe's rush to create its own Nasdaq is putting the cart before the horse", Forbes, Dec. 2, 1996, pp. 110-112.
Thomas A. Bass, "The Predictors: How a Band of Maverick Physicists Used Chaos Theory to Trade Their Way to a Fortune on Wall Street", Henry Holt and Company, 1999, 321 pages.
Brandon Becker et al., "Automated Securities Trading", Journal of Financial Services Research, 1992, pp. 327-341.
Daniel Beunza & David Stark, "Tools of the Trade: The Socio-Technology of Arbitrage in a Wall Street Trading Room", New York Conference on Social Studies of Finance, Columbia University and the Social Science Research Council, May 3-4, 2002.
Daniel Beunza & David Stark, "The Organization of Responsiveness: Innovation and Recovery in the Trading Rooms of Lower Manhattan", Socio-Economic Review, vol. 1 Issue 2, 2003, pp. 135-164.
Daniel Beunza & David Stark, "A Sociology of Arbitrage: Market Instruments in a Trading Room", New York Conference on Social Studies of Finance, Columbia University and the Social Science Research Council, May 3-4, 2002 (DRAFT).
Geir Høidal Bjønnes & Dagfinn Rime, "FX Trading . . . LIVE! Dealer Behavior and Trading Systems in Foreign Exchange Markets" Aug. 2000, 43 pages.
Geir Hødal Bjønnes & Dagfinn Rime, "Dealer Behavior and Trading Systems in Foreign Exchange Markets", Norges Bank, Nov. 27, 2003, 35 pages.
Fischer Black, "Toward a Fully Automated Stock Exchange", Financial Analysis Journal, Nov.-Dec. 1971, pp. 24-28, 86-87.
Fischer Black, "Toward a Fully Automated Stock Exchange", Financial Analysis Journal, Jul.-Aug. 1971, pp. 29-35, 44.
Fischer Black and Myron Scholes, "The Pricing of Options and Corporate Liabilities", Journal of Political Economy, May 9, 1972.

Richard Bookstaber, "The Complete Investment Book: Trading Stocks, Bonds, and Options with Computer Applications", Scott, Foresman and Company, 1985, 413 pages.

Rachel A. Bourne & Rehan Zaidi, "A Quote-Driven Automated Market", date unknown, 6 pages.

T. Huynh & C. Lassez, "A CLP(R) Options Trading Analysis System", in "Logic Programming: Proceedings of the Fifth International Conference and Symposium", vol. 1, MIT Press Series in Logic Programming (Robert A. Kowalski & Kenneth A. Bowen eds., 1988).

Adam Bradbery, "Chaos Breeds Complexity", date unknown, 1 page.

William J. Broad, "Swords Have Been Sheathed But Plowshares Lack Design", The New York Times International, Feb. 5, 1992.

Cynthia A. Brown et al., "TRADER" An Expert System for Trading Commodities Futures, 1991, pp. 92-96.

Sonja Butzengeiger et al., "Making GHG Emissions Trading work—crucial issues in designing national and international Emissions Trading Systems", HWWA Discussion Paper, Hamburg Institute of International Economics, 2001, 53 pages.

Nicholas Chan et al., "Information Dissemination and Aggregation in Asset Markets with Simple Intelligent Traders", Massachusetts Institute of Technology Artificial Intelligence Laboratory and Center for Biological and Computational Learning Department of Brain and Cognitive Sciences, A.I. Memo No. 1646, C.B.C.K. paper No. 164, Sep. 1998, 31 pages.

Rakesh Chandra & Arie Segev, "Managing Temporal Financial Data in an Extensible Database", Walter A. Haas School of Business University of California at Berkeley and Information and Computing Sciences Division, Lawrence Berkeley Laboratory, date unknown, 12 pages.

Peter Chapman, "Order Out of Chaos on Buy-Side Desks: Proliferating Order Management Systems", Tradersmagazine.com, Sep. 1999.

Dimitris N. Chorafas, "Simulation, Optimization and Expert Systems: How Technology is Revolutionizing the Way Securities are Underwritten, Analyzed and Traded", Institutional Investor Publication, 1992, 422 pages.

Neil A. Chriss, "Black-Scholes and Beyond: Option Pricing Models", Irwin Professional Publishing, 1997, Chapters 4-10.

N. F. Maxemchuck & D. H. Schur, "An Internet Multicast System for the Stock Market", AT&T Labs—Research, date unknown, 19 pages.

Barry A. Cipra, "A Chaotic Walk on Wall Street", SIAM News, May 1992.

Eric K. Clemons & Bruce W. Weber, "Information Technology and Screen-Based Securities Trading: Pricing the Stock and Pricing the Trade", Management Science, vol. 43 No. 12, Dec. 1997.

Jennifer Conrad & Gautam Kaul, "An Anatomy of Trading Strategies", The Review of Financial Studies, Fall 1998, vol. 11 No. 3, pp. 489-519.

Jennifer Conrad et al., "Institutional trading and alternative trading systems", Journal of Financial Economics, vol. 70, 2003, pp. 99-134.

Anne Constable, "Marking Predictions Make Money", date unknown.

Karen Corcella, "Automated Execution as Springboard to Growth", Wall Street & Technology, vol. 11 Issue 3, Sep. 1993.

Karen Corcella, "Market Prediction Turns the Tables on Random Walk", Wall Street & Technology, vol. 12 Issue 13, May 1, 1995.

Karen Corcella, "Symphony plays a solo", Wall Street & Technology, vol. 12 Issue 11, Mar. 1995.

John C. Cox, "Option Pricing: A Simplified Approach", Journal of Financial Economics, vol. 7, 1979, pp. 229-263.

Marianne Demarchi & Theirry Foucault, "Equity Trading Systems in Europe: A survey of recent changes", Feb. 1998.

M.A.H. Dempster & D.G. Richards, "Pricing Exotic American Options Fitting the Volatility Smile", Centre for Financial Research Judge Institute of Management Studies, University of Cambridge, Mar. 1999, 35 pages.

Sanjeev Dewan & Haim Mandelson, "Information Technology and Time-Based Competition in Financial Markets", Management Science, vol. 44 No. 5, May 1998, pp. 595-609.

Ian Domowitz, "A taxonomy of automated trade execution systems", Journal of International Money and Finance, vol. 12, 1993, pp. 607-631.

Ian Domowitz & Ruben Lee, "The Legal Basis for Stock Exchanges: The Classification and Regulation of Automated Trading Systems", Mar. 1998, 57 pages.

Bernard Dumas et al., "Implied Volatility Functions: Empirical Tests", The Journal of Finance, vol. 22 No. 6, Dec. 1998.

John F. Ehlers, "Mesa and Trading Market Cycles: Forecasting and Trading Strategies from the Creator of Mesa", Wiley Trader's Advantage, 1992.

Wolfgang Emmerich et al., "Markup Meets Middleware", 1999, 6 pages.

"Comparing The Performance of Stock Exchange Trading Systems", in "The Internationalisation of Capital Markets and the Regulatory Response" (John Fingleton & Dirk Schoenmaker eds., 1992).

Joan Junkus, Ph.D., "US Options Exchange", in "The Handbook or Equity Derivatives" (Jack Clark Francis et al. eds., 1995).

Motion by Edge to Lift Stay and Set Case Schedule, *Edge Capture LLC and Edge Specialists, LLC v. Barclays Bank PLC et al.*, (1:09-cv-01521—US DC for the Northern District of IL), Jun. 30, 2010.

Wolverine's Response to Edge's Motion to Lift Stay and Set Case Schedule, *Edge Capture LLC and Edge Specialists, LLC v. Barclays Bank PLC et al.*, (1:09-cv-01521—US DC for the Northern District of IL), Jul. 1, 2010.

Order Granting Edge's Motion to Lift Stay and Set Case Schedule, *Edge Capture LLC and Edge Specialists, LLC v. Barclays Bank PLC et al.*, (1:09-cv-01521—US DC for the Northern District of IL), Jul. 1, 2010.

Wolverine's Proposed Schedule, *Edge Capture LLC and Edge Specialists, LLC v. Barclays Bank PLC et al.*, (1:09-cv-01521—US DC for the Northern District of IL), Jul. 16, 2010.

Proposed Schedule by Barclays and UBS, *Edge Capture LLC and Edge Specialists, LLC v. Barclays Bank PLC et al.*, (1:09-cv-01521—US DC for the Northern District of IL), Jul. 16, 2010.

Edge's Proposed Schedule and Request for a Scheduling Conference, *Edge Capture LLC and Edge Specialists, LLC v. Barclays Bank PLC et al.*, (1:09-cv-01521—US DC for the Northern District of IL), Jul. 16, 2010.

Declaration of Pat Burns re Edge's Proposed Schedule and Request for a Scheduling Conference, *Edge Capture LLC and Edge Specialists, LLC v. Barclays Bank PLC et al.*, (1:09-cv-01521—US DC for the Northern District of IL), Jul. 16, 2010.

Minute Entry Denying Request for Scheduling Conference, *Edge Capture LLC and Edge Specialists, LLC v. Barclays Bank PLC et al.*, (1:09-cv-01521—US DC for the Northern District of IL), Jul. 23, 2010.

Wolverine's Motion to Dismiss Amended Complaint, *Edge Capture LLC and Edge Specialists, LLC v. Barclays Bank PLC et al.*, (1:09-cv-01521—US DC for the Northern District of IL), Aug. 13, 2010.

Barclays and UBS's Renewed Motion to Dismiss Amended Complaint, *Edge Capture LLC and Edge Specialists, LLC v. Barclays Bank PLC et al.*, (1:09-cv-01521—US DC for the Northern District of IL), Aug. 13, 2010.

Barclays and UBS's Memo in Support Renewed Motion to Dismiss Amended Complaint, *Edge Capture LLC and Edge Specialists, LLC v. Barclays Bank PLC et al.*, (1:09-cv-01521—US DC for the Northern of IL), Aug. 13, 2010 Part 1, pp. 1-115.

Barclays and UBS's Memo in Support Renewed Motion to Dismiss Amended Complaint, *Edge Capture LLC and Edge Specialists, LLC v. Barclays Bank PLC et al.*, (1:09-cv-01521—US DC for the Northern District of IL), Aug. 13, 2010, Part 2, pp. 116-230.

Wolverine's Memo in Support of Motion to Dismiss Amended Complaint, *Edge Capture LLC and Edge Specialists, LLC v. Barclays Bank PLC et al.*, (1:09-cv-01521—US DC for the Northern District of IL), Aug. 13, 2010, Part 1, pp. 1-84.

Wolverine's Memo in Support of Motion to Dismiss Amended Complaint, *Edge Capture LLC and Edge Specialists, LLC v. Barclays Bank PLC et al.*, (1:09-cv-01521—US DC for the Northern District of IL), Aug. 13, 2010, Part 2, pp. 85-166.

Wolverine's Opposition to Motion for Leave to File a 30 Page Brief in Response to Defendant's Motion to Dismiss, *Edge Capture LLC and Edge Specialists, LLC v. Barclays Bank PLC et al.*, (1:09-cv-01521—US DC for the Northern District of IL), Sep. 3, 2010.

Barclays and UBS's Opposition to Plaintiffs' Motion for Leave to File a 30 Page Brief in Response to Defendants' Motions to Dismiss,

*Edge Capture LLC and Edge Specialists, LLC v. Barclays Bank PLC et al.*, (1:09-cv-01521—US DC for the Northern District of IL), Sep. 7, 2010.
Order Denying Plaintiffs' Motion for Leave, *Edge Capture and Edge Specialists, LLC v. Barclays Bank PLC et al.*, (1:09-cv-01521—US DC for the Northern District of IL), Sep. 9, 2010.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 1, pp. 1-169.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 2, pp. 170-340.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 3, pp. 341-511.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 4, pp. 512-682.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 5, pp. 683-853.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 6, pp. 854-1023.
Plaintiffs' Motion for Leave plus Exhibits, *Edge Capture LLC and Edge Specialists, LLC v. Barclays Bank PLC et al.*, (1:09-cv-01521—US DC for the Northern District of IL), Sep. 3, 2010, Part 7, pp. 1024-1184.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 1, pp. 1-165.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 2, pp. 166-331.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 3, pp. 332-497.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 4, pp. 498-663.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 5, pp. 664-829.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 6, pp. 830-995.
Plaintiffs' Memo of Law in Opposition to Barclays and UBS Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 4, 2010, Part 7, pp. 996-1147.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 1, pp. 1-165.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 2, pp. 166-331.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 3, pp. 332-497.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 4, pp. 498-663.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 5, pp. 664-829.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 6, pp. 830-995.
Plaintiffs Memo in Opposition to Wolverine's Motion to Dismiss Amended Complaint, *Edge Capture LLC and Edge Specialists, LLC v. Barclays Bank PLC et al.*, (1:09-cv-01521—US DC for the Northern District of IL), Oct. 4, 2010, Part 7, pp. 996-1153.
Barclays and UBS's Reply Memo in Support of their Renewed Motion to Dismiss the Amended Complaint, *Edge Capture LLC and Edge Specialists, LLC v. Barclays Bank PLC et al.*, (1:09-cv-01521—US for the Northern District of IL), Oct. 22, 2010.
Wolverine's Reply Memo in Support of its Renewed Motion to Dismiss the Amended Complaint, *Edge Capture LLC and Edge Specialists, LLC v. Barclays Bank PLC et al.*, (1:09-cv-01521—US DC for the Northern District of IL), Oct. 22, 2010.
Plaintiffs' Motion for Leave to File Attached Sur-Reply in Opposition to Defendants' Renewed Motion to Dismiss the Amended Complaint, *Edge Capture LLC and Edge Specialists, LLC v. Barclays Bank PLC et al.*, (1:09-cv-01521—US DC for the Northern District of IL), Nov. 5, 2010.
Barclays and UBS's Opposition to Plaintiffs Motion for Leave to File Sur-Reply in Opposition to Motion to Dismiss the Amended Complaint, *Edge Capture LLC and Edge Specialists, LLC v. Barclays Bank PLC et al.*, (1:09-cv-01521—US DC for the Northern District of IL), Nov. 8, 2010.
Notification of Docket Entry, Order, Granting Plaintiffs' Motion for Leave to File Sur-Reply, *Edge Capture LLC and Edge Specialists, LLC v. Barclays Bank PLC et al.*, (1:09-cv-01521—US DC for the Northern District of IL), Nov. 10, 2010.
Sur-Reply of Plaintiffs in Opposition to Barclay's and UBS's Renewed Motion, *Edge Capture LLC and Edge Specialists, LLC v. Barclays Bank PLC et al.*, (1:09-cv-01521—US DC for the Northern District of IL), Nov. 10, 2010.
Plaintiffs' Notice of Supplemental Authority, *Edge Capture LLC and Edge Specialists, LLC v. Barclays Bank PLC et al.*, (1:09-cv-01521—US DC for the Northern District of IL), Dec. 16, 2010.
Barclays and UBS's Motion for Leave to File a Response to Plaintiffs' Notice of Supplemental Authority, *Edge Capture LLC and Edge Specialists, LLC v. Barclays Bank PLC et al.*, (1:09-cv-01521—US DC for the Northern District of IL), Dec. 22, 2010.
Notification of Docket Entry, Minute Order Granting Barclays and UBS's Motion for Leave to File a Response to Plaintiffs' Notice of Supplemental Authority, *Edge Capture LLC and Edge Specialists, LLC v. Barclays Bank PLC et al.*, (1:09-cv-01521—US DC for the Northern District of IL), Jan. 5, 2011.
Barclays and UBS's Response to Plaintiffs Notice of Supplemental Authority, *Edge Capture LLC and Edge Specialists, LLC v. Barclays Bank PLC et al.*, (1:09-cv-01521—US DC for the Northern District of IL), Jan. 5, 2011.
Order Denying Defendants' Motion to Dismiss, *Edge Capture LLC and Edge Specialists, LLC v. Barclays Bank PLC et al.*, (1:09-cv-01521—US DC for the Northern District of IL), Jan. 31, 2011.
CBOE Member Trading Services Dept., Feb. 22, 2000, W725: RAES Monthly Activity 1999-2000, 1 page.
Handwritten Notes, File 99-51, one page, dated Dec. 10, 1999, re John Roeser and 75 up filing for RAES, author unknown.

Handwritten Notes, File 99-51, one page, Dec. 16, 1999, re Tim Watkins, author unknown.
Federal Register, vol. 65, No. 221, dated Nov. 15, 2000, Notices, pp. 69082-69084, re SR-CBOE-99-51.
Federal Register, vol. 65, No. 221, dated Nov. 15, 2000, Notices, pp. 69079-69080.
Federal Register, vol. 65, No. 221, dated Nov. 15, 2000, Notices, pp. 69111-69112.
Federal Register, vol. 65, No. 221, dated Nov. 15, 2000, Notices, pp. 69114-69116.
The Chicago Board Options Exchange, Regulatory Bulletin, vol. RB11, No. 49, dated Dec. 8, 2000, pp. 1-12.
Securities and Exchange Commission (Release No. 34-43517; File No. SR-CBOE-99-51), Nov. 3, 2000, pp. 1-10.
CBOE Memo to Equity Floor Procedure Committee from Timothy Thompson dated Jun. 14, 2000, re "Public Notice of Rule Filing to Increase Maximum RAES Size to 75" including Securities and Exchange Commission (Release No. 34-42930; File No. SR-CBOE-99-51), Jun. 13, 2000, pp. 1-8.
The Chicago Board Options exchange, Regulatory Bulletin, vol. RB10, No. 40, dated Oct. 1, 1999, pp. 1-24.
Securities and Exchange Commission File No. SR-CBOE-96-30, Form 19b-4, entitled Proposed Rule Change by the Chicago Board Options Exchange Chicago Board Options Exchange, Inc., pp. 1-5 and 7-14.e, Inc., pp. 1-5 and 7-14.
CBOE Memo to Office of the Chairman from Timothy Thompson dated May 7, 1996, re "OEX RAES Eligibilitty Requirements", Including SR-CBOE-96-30, Form 19b-4, entitled Proposed Rule Change by the Chicago Board Options Exchange, Inc., pp. 1-14.
Letter to John Ayanian of the SEC from Timothy Thompson, the Chicago Board Options Exchange, dated Aug. 20, 1996, re: SR-CBOE-96-51; Amendment No. 1 including Exhibit A, CBOE Rules, Chapter XXIV Index Options RAES Eligibility in SPX, 2 pages total.
Letter to Ivette Lopez of the SEC from Nancy L. Nielsen, the Chicago Board Options Exchange, dated Jul. 25, 1996, re SR-CBOE-96-51 including SR-BOE-96-51, Form 19b-4, entitled Proposed Rule Change by the Chicago Board Options Exchange, Inc., pp. 1-16.
Letter to Ivette Lopez of the SEC from Nancy L. Nielsen, the Chicago Board Options Exchange, dated Nov. 25, 1996, re SR-CBOE-96-72 including SR-CBOE-96-72, Form 19b-4, entitled Proposed Rule Change by the Chicago Board Options Exchange, Inc., pp. 1-13.
Letter to Kelly Riley of the SEC from Timothy Thompson, the Chicago Board Options Exchange, dated May 18, 2000, re Amendment No. 5 to SR-CBOE-97-37, including Exhibit A, CBOE Rules, Chapter VIII, 3 pages total.
Letter to Kelly Riley of the SEC from Timothy Thompson, the Chicago Board Options Exchange, dated Mar. 21, 2000, re Amendment No. 4 to SR-CBOE-97-37, including Exhibit A, CBOE Rules, Chapter VIII, 2 pages total.
Letter to Kelly Riley of the SEC from Stephanie Mullins, the Chicago Board Options Exchange, dated Dec. 7, 1999, re Amendment No. 3 to SR-CBOE-97-37 including Exhibit A, CBOE Rules, Chapter VIII, 3 pages total.
Letter to Richard Strasser of the SEC from Timothy Thompson, the Chicago Board Options Exchange, dated Sep. 23, 1999, re SR-CBOE-97-37 including Exhibit A, CBOE Rules, Chapter VIII, 5 pages total.
Letter to Heather Seidel of the Sec from Timothy Thompson, the Chicago Board Options Exchange, dated Jul. 22, 1998, re SR-CBOE-97-37 including Exhibit A, CBOE Rules, Chapter VIII, 6 pages total.
Letter to Ivette Lopez of the SEC from Nancy L. Nielsen, the Chicago Board Options Exchange, dated Aug. 5, 1997, re SR-CBOE-97-37 including SR-CBOE-97-37, Form 19b-4, entitled Proposed Rule Change by the Chicago Board Options Exchange, Inc., pp. 1-15.
Letter to Howard Kramer of the SEC from Nancy L. Nielsen, the Chicago Board Options Exchange, dated Apr. 3, 1998, re SR-CBOE-98-13 including SR-CBOE-98-13, Form 19b-4, entitled Proposed Rule Change by the Chicago Board Options Exchange, Inc., pp. 1-12.
Letter to Ken Rosen of the SEC from Timothy Thompson, the Chicago Board Options Exchange, dated May 11, 1998, re Amendment to SR-CBOE-98-13, 2 pages.

Letter to Debbie Flynn of the SEC from Timothy Thompson, the Chicago Board Options Exchange, dated Jun. 19, 1998, re Amendment to SR-CBOE-98-20 including Exhibit A, Chapter XXIV Index Options RAES Eligibility in OEX and DJX, 3 pages total.
Letter to Howard Kramer of the SEC from Nancy L. Nielsen, the Chicago Board Options Exchange, dated May 15, 1998, re SR-CBOE-98-20 including SR-CBOE-98-20, Form 19b-4, entitled Proposed Rule Change by the Chicago Board Options Exchange, Inc., pp. 1-13.
Letter to Sonia Patton of the SEC from Timothy Thompson, the Chicago Board Options Exchange, dated Sep. 15, 1998, re Amendment No. 1 to SR-CBOE-98-37.
Letter to Michael Walinskas of the SEC from Nancy Nielsen, the Chicago Board Options Exchange, dated Aug. 20, 1998, re SR-CBOE-98-37 including File No. SR-CBOE-98-37, Form 19b-4, entitled Proposed Rule Change by the Chicago Board Options Exchange, Inc., pp. 1-12.
CBOE, Inc. Rule-Change Filing Cover Sheet, SR-CBOE-87-30, dated Jul. 27, 1987.
Order re Indirect Patent Infringement Claims, *Edge Capture LLC and Edge Specialists, LLC* v. *Barclays Bank PLC et al.*, (1:09-cv-01521—US DC for the Northern District of IL), Jan. 31, 2011.
Tushar M. Patel & Gail E. Kaiser, "The Splendors Real Time Portfolio Management System", Columbia University, Department of Computer Science, Apr. 14, 1991 available at http://citeseer.ist.psu.edu/viewdoc/summary?doi=10.1.1.38.464.
Ivy Schmerken, "Off-Exchange Trading Chips Away At NYSE Volume", Wall Street & Technology, vol. 10 No. 4, pp. 42-48, Dec. 1992.
Letter to Joseph Furey of the SEC from Robert P. Ackermann, the Chicago Board Options Exchange, dated Feb. 16, 1989, re Amendment 3, SR-CBOE-87-30.
Letter to Howard Kramer of the SEC from Nancy Crossman, the Chicago Board Options Exchange, dated Sep. 12, 1988, re Amendment 2, SR-CBOE-87-30, and including Long-Term Composite Comparison of Closing Values, Table I, and Short-Term Composite Comparison of Closing Values, Table IV, 4 pages total.
File No. SR-CBOE-87-30 Revised, Amendment No. 1, Securities and Exchange Commission Form 19b-4, entitled Proposed Rule Change by the Chicago Board Options Exchange, Inc., pp. 1-4.
File No. SR-CBOE-87-30 Revised, Securities and Exchange Commission Form 19b-4, entitled Proposed Rule Change by the Chicago Board Options Exchange, Inc., pp. 1-20.
File No. SR-CBOE-87-30 Revised, Securities and Exchange Commission Form 19b-4, entitled Proposed Rule Change by the Chicago Board Options Exchange, Inc., pp. 1-20, Marked as "OLD—Federal Express via A. Klein's office Jul. 27, 1987."
File No. SR-CBOE-89-12, Securities and Exchange Commission Form 19b-4, entitled Proposed Rule Change by the Chicago Board Options Exchange, Inc., pp. 1-8.
File No. SR-CBOE-89-28, Securities and Exchange Commission Form 19b-4, entitled Proposed Rule Change by the Chicago Board Options Exchange, Inc., pp. 1-6.
Letter to Sharon M. Lawson of the SEC from Dr. William J. Barclay, the Chicago Board Options Exchange, dated Feb. 24, 1993, re CBOE FLEX Options, File No. SR-CBOE-92-17.
Letter to Sharon Lawson of the SEC from Nancy Nielsen, the Chicago Board Options Exchange, dated Feb. 8, 1993, re SR-CBOE-92-17, Amendment 3, including File No. SR-CBOE-92-17 entitled Proposed Rule Change by the Chicago Board Options Exchange, Inc., 6 pages total.
Letter to Sharon Lawson of the SEC from Joanne Moffic-Silver, the Chicago Board Options Exchange, dated Jan. 26, 1993 including File No. SR-CBOE-92-17 Amendment No. 2, entitled Proposed Rule Change by the Chicago Board Options Exchange, Inc., 6 pages total.
Letter to Sharon M. Lawson of the SEC from Dr. William J. Barclay, the Chicago Board Options Exchange, dated Jan. 14, 1993, re Amendment No. 1 to File SR-CBOE-92-17 inlcuding File No. SR-CBOE-92-17 Amendment No. 1, entitled Proposed Rule Change by the Chicago Board Options Exchange, Inc., 18 pages total.
Letter to Sharon Lawson of the SEC from William J. Barclay, the Chicago Board Options Exchange, dated Aug. 28, 1992, re SR-CBOE-92-17—Resubmitted, including File No. SR-CBOE-92-

17 Resubmitted, entitled Proposed Rule Change by the Chicago Board Options Exchange, Inc., pp. 1-37.

Letter to Sharon Lawson of the SEC from Joanne Moffic-Silver, the Chicago Board Options Exchange, dated Aug. 21, 1992, re SR-CBOE-92-17 including File No. SR-CBOE-92-17, entitled Proposed Rule Change by the Chicago Board Options Exchange, Inc., pp. 1-37.

Letter to Sharon M. Lawson of the SEC from Michael L. Meyer, Schiff Hardin & Waite, dated Jul. 19, 1993, re Amendment No. 2 to File No. SR-CBOE-92-40; Interpretational Policy .01 under CBOE Rule 6.8—RAES Operation in Equity Options including Exhibit A, Chapter VI Doing Business on the Exchange Floor, 1 page.

Letter to Richard L. Zack of the SEC from Michael L. Meyer, Schiff Hardin & Waite, dated May 4, 1993, re Amendment No. 1 to File No. SR-CBOE-92-40; Interpretations and Policies under CBOE Rule 6.8—RAES Operation in Equity Options.

Letter to Sharon Lawson of the SEC from Joanne Moffic-Silver, the Chicago Board Options Exchange, dated Dec. 15, 1992, re SR-CBOE-92-40, and including File No. SR-CBOE-92-40, entitled Proposed Rule Change by the Chicago Board Options Exchange, Inc., pp. 1-13.

Letter to Sharon Lawson of the SEC from Nancy L. Nielsen, the Chicago Board Options Exchange, dated Jan. 18, 1994, re File No. SR-CBOE-94-02 including File No. SR-CBOE-94-02, entitled Proposed Rule Change by the Chicago Board Options Exchange, Inc., pp. 1-17.

Victor Fay Wolfe et al., "Real-Time Object-Oriented Database Support for Intelligent Program Stock Trading", in "The Second Annual International Conference on Artificial Applications on Wall Street: Tactical & Strategic Technologies" (Dr. Roy S. Freedman eds., Apr. 19-22, 1993).

David H. Freedman, "Enter the Market Merlins", Forbes ASAP, Oct. 25, 1993, pp. 38-41.

Daniel Friedman & John Rust eds., "The Double Auction Market: Institutions, Theories & Evidence", Proceedings of the Workshop on Double Auction Markets Held Jun. 1991, vol. XIV, 1993.

Ryan Garvey & Fei Wu, "Speed, Distance, and Electronic Trading: New Evidence on Why Location Matters", date unknown, available at http://papers.ssrn.com/sol3/papers.cfm?abstract_id=1335028.

Ryan Garvey & Fei Wu, "Do Location Advantages Exist for Trading U.S. Equities?", date unknown, available at http://papers.ssrn.com/sol3/papers.cfm?abstract_id=1140482.

Robert Geske & H.E. Johnson, "The American Put Option Valued Analytically", The Journal of Finance, vol. 39, No. 5, Dec. 1984.

Robert Geske & Kuldeep Shastri, "Valuation by Approximation: A Comparison of Alternative Option Valuation Techniques", The Journal of Financial and Quantitative Analysis, vol. 20, No. 1, Mar. 1985.

Asim Ghosh, "Cross-Hedging Foreign Currency Risk: Empirical Evidence form an Error Correction Model", Review of Quantitative Finance and Accounting, vol. 6, 1996, pp. 223-231.

Ann Goodman, "Are Markets as Messy as They Look?", Wall Street & Technology, vol. 9 No. 9, May 1992.

Alan J. Chapman, "Stock Market Trading Systems Through Neural Networks: Developing a Model", in "International Journal of Applied Expert Systems", vol. 2 No. 2 (Taylor Graham eds., 1994).

Allan D. Grody et al., "Global Electronic Markets: A Preliminary Report of Findings", Department of Information Systems, Stern School of Business, New York University, STERN IS-95-18, May 31, 1994.

Randy L. Grossman, "Algorithmic Trading: Brokers Race to Mediocrity", Securities Industry News, Oct. 25, 2004.

Vijay Gurbaxani & Seungjin Whang, "The Impact of Information Systems on Organizations and Markets", Communications of the ACM, vol. 34 No. 1, Jan. 1991.

Brent Hailpern & Gail E. Kaiser, "An Architecture for Dynamic Reconfiguration in a Distributed Object-Based Programming Language", Feb. 23, 1993, 35 pages.

Erik Haites & Fiona Mullins, "Linking Domestic and Industry Greenhouse Gas Emission Trading Systems", Prepared for Electric Power Research Institute (EPRI), International Energy Agency (IEA) and International Emissions Trading Association, Oct. 2001.

Nils H. Hakansson et al., "On the Feasibility of Automated Market Making by a Programmed Specialist", The Journal of Finance, vol. 40 No. 1, Mar. 1985, pp. 1-20.

Yasushi Hamao & Joel Hasbrouck, "Securities Trading in the Absence of Dealers: Trades, and Quotes on the Tokyo Stock Exchange", The Review of Financial Studies, Fall 1995, vol. 8 No. 3, pp. 849-878.

Lawrence E. Harris, "Monograph Series in Finance and Economics: Liquidity, Trading Rules, and Electronic Trading Systems", New York University Salomon Center, Leonard N. Stern School of Business, 1990.

Robert J. Hauser & James S. Eales, "Option Hedging Strategies", North Central Journal of Agricultural Economics, vol. 9 No. 1, Jan. 1987, pp. 123-134.

Thomas Hellström, "Predicting Stock Prices", Power Point Presentation at the Riga Workshop, Nov. 28-29, 1997.

Thomas Hellström, "Power Presentation: Optimizing the Sharpe Ratio for a Rank-Based Trading System", Power Point Presentation at the 10th Portuguese Conference on Artificial Intelligence, AIFTSA Workshop: Artificial Intelligence Techniques for Financial Time Series Analysis, Dec. 2001.

Stephan Heuer et al., "INVEST: An Expert System for Financial Investments", IEEE Expert, vol. 3 No. 2, Summer 1988, pp. 60-68.

Jacqueline Huang, "American Options and Complementarity Problems", Dissertation at the Johns Hopkins University, UMI No. 9950539, Aug. 1999, 149 pages.

Jacqueline Huang & Jong-Shi Pang, "Option Pricing and Linear Complementarity", Journal of Computational Finance, vol. 2 No. 3, 1998.

James M. Hutchinson et al., "A Nonparametric Approach to Pricing and Hedging Derivative Securities Via Learning Networks", Massachusetts Institute of Technology Artificial Intelligence Laboratory & Center for Biological and Computational Learning, A.I. Memo No. 1471, C.B.C.L. Paper No. 92, Apr. 1994.

T. Huynh & C. Lassez, "An Expert Decision-Support System for Option—Based Investment Strategies", Computers Math. Applic., vol. 20 No. 9 10, pp. 1-14, 1990.

Jens Carsten Jackwerth, "Generalized Binomial Trees", May 12, 1997, 16 pages.

George H. John et al., "Stock Selecting Using ReconTM/SM", in "Neural Networks in Financial Engineering", pp. 303-316, World Scientific, London, (Y. Abu-Mostafa et al. eds., 1996).

George Johnson, "Sifting Hidden Market Patterns for Profit", The New York Times, Sep. 11, 1995, pp. C1 and C6-C7.

Sam Johnson, "Fix 4.1 Specification Draft is Available", FIX Protocol Organization, Jan. 28, 1998, available at http://www.fixprotocol.org/discuss/read/33ed5258.

C.M. Jones, "Automated Technical Foreign Exchange Trading with High Frequency Data", Centre for Financial Research, Judge Institute of Management Studies & St. John's College, University of Cambridge, Jun. 1999, Dissertation.

Carol Jouzaitis, "Tiny Intex Still Awaits Big Break", the Chicago Tribune, Jul. 13, 1987, Section 4 pp. 3-4.

Kirk Kandt & Paul Yuenger, "A Financial Investment Assistant", Proceedings of the Twenty-First Annual Hawaii International Conference on System Sciences, vol. 3, 1988.

Dave Kansas, "OptiMark Technologies to Announce Trading System Aimed at Institutions", The Wall Street Journal, Sep. 24, 1996.

Kevin Kelly, "Cracking Wall Street", Wired, Jul. 1994, pp. 93-95 and 132-136.

Alexander Kempf & Olaf Korn, "Trading System and Market Integration", Journal of Financial Intermediation, vol. 7 Issue 3, Jul. 1998, pp. 220-239.

David Kline et al., "The Treatment of Biomass Fuels in Carbon Emissions Trading Systems", Center for Clean Air Policy, Mar. 1998, 9 pages.

Paul Kofman & James T. Moser, "Spreads, information flows and transparency, across trading systems", Applied Financial Economics, vol. 7, pp. 281-294, 1997.

Jonathan R. Laing, "New Brains: How smart computers are beating the stock market", Barron's, Feb. 27, 1995, pp. 29-32.

Glen A. Larsen, Jr. & Gary R. Freeman, "Hedging Foreign Currency Transaction Exposure: The Importance of Real Rates of Interest", Journal of Financial and Strategic Decisions, vol. 9 No. 1, Spring 1996.
Catherine Lassez et al., "Constraint Logic Programming and Option Trading", IEEE Expert, vol. 2 Issue 3, Sep. 1987.
Ho Geun Lee, "Intelligent Order Matching Systems for Commodity Markets", Intelligent Systems in Accounting, Finance, and Management, vol. 4, pp. 1-12, 1995.
David J. Leinweber & Yossi Beinart, "A Little Artificial Intelligence Goes a Long Way on Wall Street", The Journal of Portfolio Management, Winter 1996, pp. 95-106.
Hugues Levecq & Bruce W. Weber, "Electronic Trading Systems: Strategic Implications of Market Design", Department of Information Systems Stern School of Business, New York University, STERN #IS-95-19, Mar. 3, 1995.
Roger Lewin, "Marking maths make money", New Scientist, No. 1816, Apr. 11, 1992, pp. 31-34.
Claudia Loebbecke, "Electronic Trading in On-line Delivered Content", Proceedings of the Thirty Second Hawaii International Conference on System Sciences, 1999.
Kalman J. Cohen & Robert A Schwartz, "An Electronic Call Market: Its Design and Desirability", in "The Challenge of Information Technology for the Securities Markets: Liquidity, Volatility, and Global Trading", The Center for Research on Information Systems & the Salomon Brothers Center for the Study of Financial Institutions (Henry C. Lucas, Jr. & Robert A. Schwartz, eds., 1989).
Louis P. Lukac et al., "Similarity of Computer Guided Technical Trading Systems", The Journal of Futures Markets, vol. 8 No. 1, pp. 1-13, 1988.
Ananth Madhavan, "Market Microstructure: A Survey", Journal of Financial Markets, vol. 3, pp. 205-258, Mar. 16, 2000.
Craig McGuire, "The Next Level of Proprietary Protection", Wall Street & Technology, vol. 17 Issue 1, Jan. 1999, p. 52.
Michael P. Wellman & Peter R. Wurman, "A Trading Agent Competition for the Research Community", IJCAI Workshop on Agent-Mediated Electronic Commerce (1999), 14 pages.
Colin C. Williams, "Local purchasing scheme and rural development: an evaluation of local exchange and trading systems (LETS)", Journal of Rural Studies, vol. 12 No. 3, pp. 213-244, 1996.
C. L. Wilson, "Self-Organizing Neural Network System for Trading Commons Stocks", IEEE World Congress on Computational Intelligence, 1994 IEEE International Conference on Neural Networks, vol. 6, pp. 3651-3654, Jun. 27-Jul. 2, 1994.
M. Anthony Wong & Robert High, "Fixed-Income Arbitrage: Analytical Techniques and Strategies", A Wiley Finance Edition, (1993), 254 pages.
Patrick Young & Thomas Theys, "Capital Market Revolution: The Future of Market in an Online World", Financial Times Prentice Hall, (1999), 212 pages.
Yi-Cheng Zhang, "One Hundred Years of Physics in Finance", Europhysics News, Jan./Feb. 1998.
Sharon Begley et al., "Chaos Grows Up: Scientists seek practical uses for the new hidden order", Newsweek, date unknown.
Barry James, "Betting on Chaos in Markets: Physicists Aim to Predict the Unpredictable", Herald International Tribune, No. 33,959, May 5, 1992.
"Expression (mathematics)", Wikipedia, the free encyclopedia, available at http://en.wikipedia.org/wiki/Mathematical_expression, last visited on Jun. 15, 2006.
"Function (mathematics)", Wikipedia, the free encyclopedia, available at http://en.wikipedia.org/wiki/Mathematical_Function, last visited on Jun. 15, 2006.
"KPMG Seminar Brings Clarity to FASB 133", PR Newswire, Oct. 1, 1998, available at http://www.thefreelibrary.com/KPMG+Seminar+Brings+Clarity+to+FASB+133.-a053047.
"TradeNow! May 17-21, 1999", TradeNow!—Archive, available at http://internettrading.net/tradenow/arch/ex12.shtml, last visited on Nov. 30, 2004.
"Dictionary of Finance and Investment Terms", Barrons, pp. 116-117, (John Downes ed., 1998).
Dian Hymer, "Starting Out: The Complete Home Buyer's Guide", Chapter 8: Strategies for Repeat Home Buyers, pp. 221-234, (1997).

Defendant UBS Financial Services Inc.'s Answer, Affirmative Defenses, and Counterclaims in Response to Plaintiffs Edge Capture L.L.C. and Edge Specialists, L.L.C's Amended Complaint, *Edge Capture LLC and Edge Specialists, LLC v. Barclays Bank PLC et al.*, (1:09-cv-01521—US DC for the Northern District of IL), Mar. 23, 2011.
Defendant UBS Securities LLC's Answer, Affirmative Defenses, and Counterclaims in Response to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.
Defendant UBS AG's Answer and Affirmative Defenses in Responses to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.
The Barclays and UBS Defendants' Opposition to Plaintiff Edge Capture L.L.C.'s and Edge Specialists, L.L.C.'s Motion to Strike Defendants' Renewed Motion to Bifurcate, *Edge Capture LLC and Edge Specialists, LLC v. Barclays Bank PLC et al.*, (1:09-cv-01521—US DC for the Northern District of IL), Mar. 25, 2011.
Plaintiffs' Memorandum of Law in Opposition to Defendants' Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Mar. 25, 2011.
Plaintiffs Edge Capture L.L.C.'s and Edge Specialists, L.L.C.'s Reply Brief in Support of Their Motion to Strike Defendants' Renewed Motions to Bifurcate, *Edge Capture LLC and Edge Specialists, LLC v. Barclays Bank PLC et al.*, (1:09-cv-01521—US DC for the Northern District of IL), Apr. 1, 2011.
Wolverine Trading, L.L.C. and Wolverine Execution Services, L.L.C.'s Reply Memorandum in Support of Renewed Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Apr. 1, 2011.
The Barclays and UBS Defendants' Reply In Support of Their Renewed Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Apr. 1, 2011.
The Barclays and UBS Defendants' Sur-Reply in Opposition to Plaintiff Edge Capture L.L.C.'s and Edge Specialists, L.L.C.'s Motion to Strike Defendants' Renewed Motion to Bifurcate, *Edge Capture LLC and Edge Specialists, LLC v. Barclays Bank PLC et al.*, (1:09-cv-01521—US DC for the Northern District of IL), Apr. 7, 2011.
Notification of Docket Entry, Order Denying Defendants' Renewed Motion to Bifurcate and Plaintiffs' Motion to Strike Defendants' Renewed Motion, *Edge Capture LLC and Edge Specialists, LLC v. Barclays Bank PLC et al.*, (1:09-cv-01521—US DC for the Northern District of IL), Apr. 21, 2011.
Memorandum Opinion and Order, *Edge Capture LLC and Edge Specialists, LLC v. Barclays Bank PLC et al.*, (1:09-cv-01521—US DC for the Northern District of IL), Apr. 21, 2011.
Memorandum of Law in Support of Plaintiffs' Motion to Dismiss Defendant Barclays' and Defendant UBS's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 4, 2011.
Memorandum of Law in Support of Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 4, 2011.
Wolverine Trading, LLC and Wolverine Execution Services, LLC's Opposition to Plaintiffs' Motion to Dismiss Defendant Wolverine's State Law and Inequitable Conduct Counterclaims, *Edge Capture LLC and Edge Specialists, LLC v. Barclays Bank PLC et al.*, (1:09-cv-01521—US DC for the Northern District of IL), May 25, 2011.

Barclays and UBS Defendants' Opposition to Plaintiffs' Motion to Dismiss Barclays' and UBS' State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 25, 2011.
Reply Memorandum of Law in Support of Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 8, 2011.
Reply Memorandum of Law in Support of Plaintiffs' Motion to Dismiss Defendant Barclays' and Defendant UBS's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 8, 2011.
The Barclays and UBS Defendants' Sur-Reply in Opposition to Plaintiff Edge Capture L.L.C.'s and Edge Specialists, L.L.C.'s Motion to Dismiss Barclays' and UBS' State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 15, 2011.
Notification of Docket Entry, Order Granting in Part and Denying in Part Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jul. 26, 2011.
Memorandum Opinion and Order, *Edge Capture LLC and Edge Specialists, LLC v. Barclays Bank PLC et al.*, (1:09-cv-01521—US DC for the Northern District of IL), Jul. 27, 2011.
Plaintiffs Edge Capture L.L.C. and Edge Specialists, L.L.C.'s Answer and Affirmative Defenses to Defendants Wolverine Trading, L.L.C. and Wolverine Execution Services, L.L.C.'s Counterclaims, *Edge Capture LLC and Edge Specialists, LLC v. Barclays Bank PLC et al.*, (1:09-cv-01521—US DC for the Northern District of IL), Aug. 16, 2011.
"Web POP: Online Options Risk Analysis for Traders and Brokers"; by PMpublishing; available at http://www.pmpublishing.com/webpop/; date unknown; 2 pages.
Giovanni Barone-Adesi & Robert E. Whaley "Efficient Analytic Approximation of American Option Values" in The Journal of Finance, vol. 42 Issue 2; pp. 301-320 (Jun. 1987); 20 pages.
"Electronic Trading System Matches Buyers, Sellers" by Zach Coleman, Atlanta Business Chronicle, vol. 20 No. 12, p. 37A, Aug. 1997.
The Chicago Mercantile Exchange, "Globex: Expanding Futures and Options Trading Around the World, Around the Clock", Mar. 30, 1989, 24 pages.
"Trading Pad" by GL Trade, Operational Manual, date unknown, 8 pages.
A High-Level Protocol and System for Computer Controlled Financial Trading, Massimo Bigliardo et al, Carnegie Mellon University Information Networking Institute, Technical Report, TR 1993-9, date unknown, 156 pages.
A Hybrid Approach to Automated Trading Systems, Raymond k Wong & Patty N. Ng, Proceedings of the 1994 Second Australian and New Zealand Conference on Intelligent Information Systems, pp. 278-282, Nov. 29-Dec. 2, 1994.
Aurora: A Replication of Proven Market Efficiency, Chicago Board of Trade, date unknown, 11 pages.
Welcome to the AZX Arizona Stock Exchange: The Online Stock Auction, Presentation, The Arizona Stock Exchange, date unknown, 39 pages.
"Canadian Brokerage Hedges with On-line Expertise", Trading Technology in the Wall Street Computer Review, Dec. 1990, 3 pages.
"Introducing the OptiMark System", The Chicago Board Options Exchange, date unknown, 3 pages.
"ITG Pairs and Long/Short Trading Strategies", ITG QuantEX, available at http://web.archive.org/web/20000925182843/www.itginc.com/products/quantex/qtx99-pai . . . I/13, date unknown, last visited on Jan. 13, 2010.
The "Mesa User's Guide" (Release 1.5); 431 pages.
"O'Connor Funds Chaos Research", Frontlines, date unknown, 1 page.
"POSIT: Portfolio System for Institutional Trading: User's Guide", date unknown, 93 pages.
"Optimization of Trading Rules: with a Penalty Term for Increased Risk-Adjusted Performance", by Thomas Hellström, Department of Computing Science Umeå University, Sweden, Power Point Presentation, date unknown.
"QuantEX: Electronic Trading Made Intelligent", ITG QuantEX, available at http://web.archive.org/web/20000414060938/www.itginc.com/products/quantex/quantex.h . . . 1/13, date unknown, last visited on Jan. 13, 2010.
"RealTick: Trading Guide", Townsend Analytics, Ltd., TAL Trading Tools, Edition 4, May 2000, 39 pages.
"The Berkeley Options Data Base User's Guide", Institute of Business and Economic Research #1922, Release 3.0, University of California, Berkeley, Aug. 1998, 70 pages.
"Telekurs Investdata System Manual", Edition '94/E, date unknown, 108 pages.
"Canadian Quantex User Manual: vol. 1 Trade Execution", Canadian Quantex, Release Version 1.1, RBC Dominion Securities Inc.: Quantitative Integrated Trading Technologies Inc., date unknown, 115 pages.
Automation in the Futures Industry: Proceedings of a Conference Sponsored by Commodity Futures Trading Commission, Jun. 15, 1977, Washington, D.C.
"CATS: Computer Assisted Trading System Trader's Manual", The Toronto Stock Exchange, 1979, 9 pages.
"CATS Project Notice—79-3—Re: CATS Service and Information Centre", The Toronto Stock Exchange, Mar. 2, 1979, 132 pages.
"Late But Hopeful, Intex Looks for Summer Start Up", Futures World, Jun. 14, 1984, 3 pages.
"Automated Trading Works: Now for the Next Hurdle", Futures World, Nov. 22, 1984, 3 pages.
"Multi-Talented System Opens Windows for Trader's World", The Wall Street Computer Review, vol. 5 No. 7, Apr. 1988, pp. 86-90.
"How Computer Assisted Trading is Making the Toronto Stock Exchange Purr", The Wall Street Computer Review, vol. 5 No. 3, Dec. 1987, pp. 71-78 and 97.
"Davidge Debuts DOT/PC Order Routing for NYSE Members", Trading Systems Technology, Aug. 26, 1987, 1 page.
Claire Mencke, "Finding the Lowest-Cost Path for Stock Trading", Investor's Business Daily, May 1, 1996.
Brandon Mitchener, "On Election Course, Race is Wide Open German Contest Remains Close for Buyers of Political Shares", International Herald Tribune, Oct. 13, 1994.
Merton H. Miller, "Merton Miller on Derivatives", John Wiley & Sons, Inc., 1997, 226 pages.
Jeffrey D. Miller et. Al., "Program Trading: The New Age of Investing: The Role of the Individual Investor in Today's Changing Stock Market", J.K. Lasser Institute, 1989, 212 pages.
Laura Monsen, "Using Microsoft Excel 97: Clear. Concise. Dependable", Chapter 19: Importing and Exporting Data and Chapter 20: Introducing Visual Basic for Applications, 1997.
Jun Muranaga & Tokiko Shimizu, "Market microstructure and market liquidity", Bank of Japan, 29 pages, 1999, available at http://www.bis.org/publ/cgfs11mura_a.pdf.
Vasanttilak Naik, "Option Valuation and Hedging Strategies with Jumps in the Volatility of Asset Returns", The Journal of Finance, vol. 48 No. 5, pp. 1969-1984, Dec. 1993.
Jonas Niemeyer & Patrik Sandås, "An Empirical Analysis of the Trading Structure at the Stockholm Stock Exchange", Jan. 16, 1995, 38 pages, available at http://swopec.hhs.se/hastef/abs/hastef0044.htm.
Peggy Lee O'Neil, "High-Tech Trading: Growing Number of Money Managers Relying on Computer-Guided Investment Strategies" The Albuquerque Journal, pp. C9-C10, Nov. 12, 1995.
Eleanya A. Okoroji, "Automated Stock Option Trading", John B Case Library Archives Department, Master Thesis, May 1988, 72 pages.
Eve Oppenheim, "G-183 Electronic Trading Systems: Which, Why, Where", Business Communications Company, Inc., 1998, 10 pages.
James Orford, "Introducing a New Way to Trade: Trading on the Frontier", Plan Sponsor, Oct. 1996, pp. 17-27.

Jennifer Ouellette, "Physicists Graduate from Wall Street", The Industrial Physicist, Dec. 1999, pp. 9-13.

Michael Pacione, "Local Exchange Trading Systems—A Rural Response to the Globalization of Capitalism?" Journal of Rural Studies, vol. 13 No. 4, pp. 415-427, 1997.

K.N. Pantazopoulos et al., "A Knowledge Based System for Evaluation of Option Pricing Algorithms" Proceedings of the IEEE/IAFE/INFORMS 1998 Conference on Computational Intelligence for Financial Engineering (CIFEr), Mar. 29-31, 1998, pp. 123-140.

Satu S. Parikh & Gerald L. Lohse, "Electronic Futures Markets Versus Floor Trading: Implications for Interface Design" In Proceedings for CHI, 1995, 8 pages, available at http://www.sigchi.org/chi95/proceedings/papers/jll_bdy.htm.

Tushar M. Patel, "Real-time Portfolio Management and Automatic Extensions: MS Thesis", Columbia University, Department of Computer Science, Oct. 7, 1991, 56 pages.

Craig Pirrong, "Market Liquidity and Depth on Computerized and Open Outcry Trading Systems: A Comparison of DTB and LIFFE Bund Contracts", The Journal of Futures Markets, vol. 16 No. 5, pp. 519-543 (1996).

John Pitt, "When Your Investment Horizon is Minutes", Global Finance, pp. 38-42, Jun. 1995.

Benny Rachlevsky-Reich et al., "GEM: A Global Electronic Market System", Information Systems, vol. 24 No. 6, pp. 495-518, 1999.

Benny Rachlevsky-Reich, "GEM: A Global Electronic Market System", Research Thesis, Israel Institute of Technology, Jul. 1999, 152 pages.

Christina I. Ray, "The Bond Market: Trading and Risk Management", Chapter 4: The Rules of the Game, pp. 59-69, 1993.

Benny Reich & Israel Ben-Shaul, "A Componentized Architecture for Scalable Market Exchange", Techion, Israel Institute of Technology, Department of Electrical Engineering, date unknown, 4 pages.

Adrian Joubert & L.C.G. Rogers, "Fast, Accurate, and Inelegant Valuation of American Options", in "Numerical Methods of Finance", Cambridge University Press, pp. 88-92 (L.C.G. Rogers & D. Talay, eds., 1997).

Articles and advertisements regarding "Mesa" from NeXT World Magazine, dates unknown.

G.J. Santoni, "Has Programmed Trading Made Stock Prices More Volatile?", Federal Reserve Bank of St. Louis, May 1987, pp. 18-29.

Ivy Schmerken, "What's Next on Wall Street's Automation Agenda? (trading technology)", Wall Street Computer Review, vol. 6 No. 7, pp. 44 (6), Apr. 1989.

Ivy Schmerken, "The Bulls and Bears Come Out at Night: Electronic Trading", Wall Street Computer Review, vol. 7 No. 12, pp. 14 (9), Sep. 1990.

Ivy Schmerken, "Wall Street's Quiet Revolution", Wall Street & Technology, vol. 9 No. 10, p. 25 (7), Jun. 1992.

Michael Schrage, "Seeing Order in Financial Chaos", Los Angeles Times, Jan. 1992.

Michael Schrage, "Trying to Probably Predict What Might Maybe Happen", Los Angeles Times, Jan. 3, 1992.

Michael Schrage, "Future markets show vital signs but will they be predictable?", The Boston Sunday Globe, Jan. 5, 1992.

Robert A. Schwartz & Bruce W. Weber, "Next-Generation Securities Market Systems: An Experimental Investigation of Quote-Driven and Order-Driven Trading" Journal of Management Information Systems, vol. 14 No. 2, pp. 57-79, Fall 1997.

Robert A. Schwartz & Bruce W. Weber, "Combining Quote-Driven and Order-Driven Trading Systems in Next-Generation Stock Markets: An Experimental Investigation", Department of Information, Operations, and Management Sciences, Leonard N. Stern School of Business, New York University, IS-96-13, Jul. 1996.

Seng-Cho Timothy Chou et al., "A Rule-based Neural Stock Trading Decision Support System", Proceedings of the IEEE/IAFE 1996 Conference on Computational Intelligence for Financial Engineering, pp. 148-154, Mar. 24-26, 1996.

Song-yi Yi & Heonshik Shin, "Design of a Real-Time Trader for Mobile Objects in Open Distributed Environments", Proceedings of the Eight Euromicro Workshop on Real-Time Systems, pp. 212-217, Jun. 12-14, 1996.

"A Probus Guide to World Markets: Innovation and Technology in the Markets—A Reordering of the World's Capital Market Systems", (Daniel R. Siegel ed., 1990).

Barry D. Solomon, "New directions in emissions the potential contribution of new institutional economics", Ecological Economics, vol. 30, pp. 371-387, 1999.

Benn Steil et al., "The European Equity Markets: The State of the Union and an Agenda for the Millennium", Chapter 1: Equity Trading I: The Evolution of European Trading Systems, pp. 1-58, (1996).

Ian Domowitz and Benn Steil, "Securities Trading", in "Technological Innovation & Economic Performance", Princeton University Press (Benn Steil et al., eds., 2002).

Hans R. Stoll & Robert E. Whaley, "Futures and Options on Stock Indexes: Economic Purpose, Arbitrage, and Market Structure", the Review of Futures Markets, vol. 7 No. 2, pp. 224-248, 1988.

John Sweeney, "Essex Eurotrader", Stocks & Commodities, V. 5:8, pp. 275-280, 1986.

Dr. Clarence N. W. Tan, Ph.D., "A Hybrid Financial Trading System Incorporating Chaos Theory, Statistical and Artificial Intelligence/Soft Computing Methods", Invited Paper—Queensland Finance Conference 1999, 19 pages.

Stuart M. Turnbull & Lee Macdonald Wakeman, "A Quick Algorithm for Pricing European Average Options", Journal of Financial and Quantitative Analysis, vol. 26 No. 3, Sep. 1991.

Steven R. Umlauf, "Information Asymmetries and Security Market Design: An Empirical study of the Secondary Market for U.S. Government Securitas", The Journal of Finance, vol. 46 No. 3, Jul. 1991, pp. 929-953.

Ted Jackson, "Bloomberg's Next Step: The Instinct Killer?", Wall Street & Technology, vol. 14 No. 8, pp. 34-38, Aug. 1, 1996.

Bruce W. Weber, "Next Generation Trading in Futures Markets: a Comparison of Open Outcry and Ordering Matching Systems", Journal of Management Information Systems, vol. 16 No. 2, pp. 29-45, Fall 1999.

Bruce W. Weber, "Information Technology in the Major International Financial Markets", Department of Information, Operations, and Management Sciences, Leonard N. Stern School of Business, New York University, IS-93-12, Apr. 7, 1993, 45 pages.

Bruce W. Weber, "Screen-Based Trading in Futures Markets: Recent Developments and Research Propositions", Proceedings of the Thirty Second Hawaii International Conference on System Sciences, 1999, 10 pages.

Bruce W. Weber, "Transparency and Bypass in Electronic Financial Markets", Department of Information Systems, Stern School of Business, New York University, STERN IS-93-15, Jun. 10, 1993, 23 pages.

"RealTrade: Trading Guide", Townsend Analytics, Ltd., TAL Trading Tools, Edition 2.1, Jul. 1999, 64 pages.

"Quotron's Open Windows: Q1000 Data for PC Users", Trading Systems Technology, Oct. 10, 1988, 3 pages.

"SIA Technology Shows Bucks Down Market: Blue Smoke and Mirrors at Hilton Bash", Trading Systems Technology, Feb. 15, 1988, 4 pages.

"Slim Pickin's at Fincom: A Vegas Trade Show in NYC", Trading Systems Technology, Jul. 18, 1988, 3 pages.

"From Airline Tickets to Human Organs, the Electronic Markets are Booming" by Clifford Carlsen, San Francisco Business Times, vol. 3 No. 50 Sec 1 p. 17, Aug. 14, 1989.

"Breathing Liffe into Futures", Banking Technology, Apr. 1989, pp. 46-47.

"Benefiting the Broker, FCM, and Customer", Broker Workstation, Chicago Board of Trade, 1990, 6 pages.

"Soffex User Device Operation and Administration Manual" Soffex, Oct. 15, 1990, 1 page.

"EJV Snares Sanction for Autotrade System", Bond Week: A Publication of Institutional Investor, vol. 27 No. 16, Apr. 22, 1991.

"Data Exchange, Salomon Launch Equities Order-Routing System", Trading Systems Technology, Jul. 29, 1991, 2 pages.

"Financial Technology Corp. Unveils Basket Trading System", Trading Systems Technology, Jun. 17, 1991, 2 pages.

"LIT Uses Beats to Route Orders to Nyse's Superdot", Trading Systems Technology, Jul. 29, 1991, 3 pages.

"TST Interviews Bob McFarlane, Head of Consultants Interport", Trading Systems Technology, Jul. 1, 1991, 6 pages.

"Member System Overview" Soffex, Feb. 14, 1991, 1 page.

"CBIC/Wood Gundy Proprietary Traders Lead the Way for 275-Position Room", Trading Systems Technology, Jul. 13, 1992, 3 pages.

"Reuters Buys Chunk of Effix; Expands Triach/Effic Line", Trading Systems Technology, Jun. 15, 1992, 4 pages.

The "Mesa User's Guide" (Beta Release); Jul. 1992, 111 pages.

"Automating German Equity Trading: Bid-Ask Spreads on Competing Systems" by Harmut Schmidt and Peter Iversen, Journal of Financial Services Research, 1992, p. 373-397.

"J.P. Morgan Selects Unix for Program-Trading Group", Trading Systems Technology, Apr. 20, 1992, 3 pages.

"Nikko N.Y. Taps Davidge, Sun for Equities Trading Systems", Trading Systems Technology, Apr. 20, 1992, 2 pages.

"Chaos Hits Wall Street: An investment firm is ready to bet hundreds of millions that arcane mathematics can give the bulls and bears a run for the money" by David Berreby, Discover, Mar. 1993, 8 pages.

"Can Chaos Beat the Market? Connecting the Dots" by Jim Jubak, Worth, Mar. 1993, 4 pages.

"Selling a Peek Into Future" by Bob Hagan, Albuquerque Journal, p. 3 Section C, Jun. 13, 1993.

Federal Register, vol. 58, No. 249, dated Dec. 30, 1993, pp. 69419-69430.

Charles Schwab Street Smart: Getting Started, 1994, 30 pages.

WOSA Extensions for Real-Time Market Data, Backgrounders and White Paper—Microsoft Development Library, Jan. 1994.

"Get Smart About Chaos" by Mark Etzkorn, Trading Techniques, Futures Magazine, May 1995, pp. 38-40.

"Identifying Buyer Market Areas and the Impact of Buyer Concentration in Feeder Cattle Markets Using Mapping and Spatial Statistics" by DeeVon Bailey et al., Amer. J. Agr. Econ. vol. 77, pp. 309-318, May 1995.

"Predicting the Future: Local Firm's Software Helps Make Order Out of Chaos" by Bob Quick, The New Mexican, Section F, p. F1 and F5, Jul. 23, 1995.

"Local Exchange and Trading Systems: A New Source of Work and Credit for the Poor and Unemployed?" by C. C. Williams, Environment and Planning, vol. 28 No. 8, pp. 1395-1415, Aug. 1996.

"Local Exchange and Trading Systems in the United Kingdom: A Case of Re-Embedding" by L. Thorne, Environment and Planning, vol. 28 No. 8, pp. 1361-1376, Aug. 1996.

"The World According Norman Packard", Derivatives Strategy, Dec./Jan. 1996, pp. 30-34.

"On the Possibility of Hedging Options in the Presence of Transaction Costs" by Shlomo Leventhal & Anatolii V. Skorohod, The Annals of Applied Probability, vol. 7 No. 2, pp. 410-443, May 1997.

Section 2320, Best Execution and Interpositioning, NASD Manual & Notices to Members, 1998.

"Electronic Trading on Futures Exchanges" by Asani Sarkar and Michelle Tozzi, Current Issues in Economics and Finance, Federal Reserve Bank of New York, vol. 4 No. 1, Jan. 1998.

"Intermarket Trading System ('ITS') Plan; Proposed Amendments to Expand the ITS/Computer Assisted Execution System Linkage to All Listed Securities and to Eliminate the Unanimous Volte Provision"; Federal Register, vol. 63, No. 146, dated Jul. 30, 1998; Securities and Exchange Commission; Release No. 34-40260; File No. 4-208]; pp. 40748-40759.

"Self-Regulatory Organizations; Notice of Filing of Proposed Rule Change & Amendment No. 1 by the Pacific Exchange, Inc."; Federal Register, vol. 63 No. 263, dated Dec. 9, 1998; Securities and Exchange Commission; Release No. 34-40734; File No. SR-PCX-98-55; pp. 67971-67972.

"5th Market to Establish New ECN for Derivatives Trading in Early 2000; 5th Market Announces Completion of Equity Financing", PR Newswire, Aug. 27, 1999.

"Foreign Currency Hedges: Hedging Foreign-Currency Denominated Interest Payments", Financial Accounting Standards Board: Derivative Implementation Group, 1999.

"J.P. Morgan, Pricewaterhouse Coopers Propose FpML, a new e-commerce standard", FpML Press Release, Jun. 9, 1999, available at http://xml.coverpages.org/fpml-press9906.html.

"Mesirow 'Black Box' Integrates Order Routing on ADP T1 Network", Wall Street Network News, May 7, 1993.

"Open outcry and electronic trading in futures exchanges" by Ray Tsang, Bank of Canada Review, Spring 1999.

"Animals of Finance: Black Box" by Thomas A. Bass, The New Yorker: The Money Issue, Apr. 26, 1999, pp. 114-129.

Excerpts of the Hull Group, Inc. Form S-1/A filed with the Securities Exchange Commission on Jul. 6, 1999; 151 pages.

Excerpts of the Hull Group, Inc. Form S-1/A filed with the Securities Exchange Commission on Jun. 22, 1999; 232 pages.

The "Orc 2.3 Introduction Manual", 2000, 30 pages.

"Money From Chaos: Are nature's hidden patterns a key to investing?", Time Bonus Section, Your Business, May 2001, 1 Page.

"Errors in Implied Volatility Estimation" by Ludger Hentschel, "The Journal of Financial and Quantitative Analysis," vol. 38 No. 4, Dec. 2003, pp. 779-810.

"Day Trading Strategies, Strategy 1: Breakout", tradetrek.com, available at http://www.tradetrek.com/education/Day_Trading/breakouts.asp.

"Fundamental Analysis", tradetrek.com, http://web.archive.org/web/20000303081938/http://tradetrek.com/fundanalysis/default.asp.

Letter to Richard Strasser of the SEC from Stephanie Mullins, Chicago Board Options Exchange, dated Dec. 23, 1998, re Amendment 1 to SR-CBOE-98-44, 3 pages total.

Letter to Michael Walinskas of the SEC from Nancy Nielsen, Chicago Board Options Exchange, dated Oct. 1, 1998, re SR-CBOE-98-44 including Securities and Exchange Commission File No. SR-CBOE-98-44, entitled Proposed Rule Change by the Chicago Board Options Exchange, Inc., 10 pages.

Memo to Charles J. Henry from Stephanie Mullins, Chicago Board Options Exchange, dated Sep. 29, 1998, re Changes to Rule 6.8(b).

Federal Register, vol. 63, No. 212, dated Nov. 3, 1998, pp. 59350-59351, re SR-CBOE-98-44.

The Chicago Board Options Exchange, Regulatory Bulletin, Oct. 16, 1998, vol. RB9, No. 27, pp. 1-6.

"Windows Autoquote User Manual for DPMs Market Makers and Exchange Employees—Chicago Board Options Exchange" Sep. 1, 2001. pp. 1-9, 11-13, 15, and 17-32.

"PC Auto Quote User Manual for Market Makers and Exchange Employees—Chicago Board Options Exchange" Dec. 1990. Second Edition. pp. 1-11, 14-22, 24-28, and 31-35.

CBOE Information Circular IC91-15, Feb. 25, 1991 entitled "Auto Quote "Best Quote" Process."

CBOE Memo, Mar. 21, 1991 entitled "New Version of P.C. Auto Quote". 3 pages.

CBOE Information Circular IC91-76, Oct. 28, 1991 entitled "Auto Quote Series Enablements". 3 pages.

CBOE Information Circular IC92-92, Aug. 30, 1993 entitled "Auto Quote Enhancements". 2 pages.

CBOE Information Circular IC93-76, Sep. 30, 1992 entitled "New P.C. AutoQuote Version". 2 pages.

CBOE Information Circular IC94-16, Mar. 9, 1994 entitled "New P.C. AutoQuote Version".

CBOE Information Circular IC95-15, Mar. 6, 1995 entitled "P.C. AutoQuote Enhancements". 3 pages.

CBOE Information Circular IC97-22, May 27, 1997 entitled "P.C. AutoQuote Enhancements". 3 pages.

"Complaint"; *Edge Capture L.L.C.,* v. *Citadel Investment Group, L.L.C.*; US District Court for the Northern District of Illinois Eastern Division; Civil Action No. 07C 4648; Aug. 17, 2007; 57 pages.

"Dismissal Order"; US District Court for the Northern District of Illinois Eastern Division; Civil Action No. 07C 4648; Feb. 25, 2008; 1 page.

"Complaint"; *Edge Capture L.L.C.*; v. *Lehman Brothers Holdings, Inc.*; US District Court for the Northern District of Illinois Eastern Division; Civil Action No. 08-CV-2412; Apr. 28, 2008; 57 pages.

"Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412; Jun. 4, 2008; 2 pages.

"Defendant's Memorandum in Support of Their Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412, Jun. 4, 2008; 20 pages.

"Plaintiffs' Memorandum of Law in Opposition to Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412; Jul. 1, 2008; 61 pages.

"Defendant's Reply Memorandum in Support of Their Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412; Jul. 15, 2008; 35 pages.

"Declaration of Jeffrey G. Randall in Support of Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412, Jun. 4, 2008; 5 pages.

U.S. Securities and Exchange Commission; "A Monitoring Report on the Operation of the Cincinnati Stock Exchange National Securities Trading System"; Directorate of Economic and Policy Analysis; May 1981; 42 pages.

U.S. Securities and Exchange Commission; "A Report on the Operation of the Cincinnati Stock Exchange National Securities Trading System" 1978-1982; Directorate of Economic and Policy Analysis; Sep. 1982; 46 pages.

"Self-Regulatory Organizations; Proposed Rule Change by the Cincinnati Stock Exchange Relating to Small Order Execution Guarantee"; File No. SR-CSE-85-4; Aug. 15, 1985; Securities and Exchange Commission (S.E.C.) *1 Securities Exchange Act of 1934; Westlaw; 33 S.E.C. Docket 1136; Release No. 34-22330, 1985 WL 547562; 10 pages.

"Self-Regulatory Organizations, Chicago Board Options Exchange, Inc."; Order Approving Proposed Rule Changes Relating to the Retail Automatic Execution System ("RAES"); Aug. 19, 1988; Securities and Exchange Commission; Release No. 34-25995; File Nos. SR-CBOE-87-35 and SR-CBOE-87-47; 13 pages.

Exhibit I; "Impressive Project Provides Extended Opportunity in CBOT Financial Complex"; by Lisa Dunbar, Associate Product Manager, Market & Product Development Department, Chicago Board of Trade; available at http://web.archive.org/web/19990429192354/finance.wat.ch/SCFOA/bulletin/_0001960.htm; date unknown; 3 pages.

Brad Adelberg et al., "Overview of the STanford Real-time Information Processor (STRIP)"; Mar. 1996; 4 pages.

The index of 25:1 SIGMOD Record; containing "Overview of the STanford real-time Information Processor (STRIP)"; Mar. 1996; available at http://www.sigmod.org/record/issues/9603/; 4 pages.

Brad Adelberg et al.; "The STRIP Rule System for Efficiently Maintaining Derived Data"; Jun. 1997, 28 pages.

26:2 SIGMOD Record (Jun. 1997) publishing the Proceedings of the 1997 ACM SIGMOD International Conference on Management of Data (May 13-15, 1997, Tucson, AZ, USA) and containing "The STRIP Rule System for Efficiently Maintaining Derived Data"; available at http://www.sigmod.org/record/issues/9706/; 11 pages.

Defendant's representative claim charts applying the teachings of the Mar. 1996 STRIP system to U.S. Patent No. 7,251,629; (Case 1:08-Cv-02412) 11 pages.

Defendant's representative claim chart applying the teachings of the Mar. 1996 STRIP system to U.S. Patent No. 7,177,833; (Case 1:08-CV-02412); 7 pages.

Joseph Alotta; Project Nimble: An Automated Equity Options Market Making System, in "Computerized Trading: Maximizing Day Trading and Overnight Profits"; pp. 387-396; (Mark Jurik ed., 1999); 12 pages.

ISBN information listing a May 10, 1999 publication date for "Computerized Trading: Maximizing Day Trading and Overnight Profits"; (Mark Jurik ed., 1999); available at http://www.chapters.indigo.ca; 1 page.

Defendant's representative claim chart applying the teachings of the May 1999 Nimble system to U.S. Patent No. 7,251,629; (Case 1:08-CV-02412); 12 pages.

Defendant's representative claim chart applying the teachings of the May 1999 Nimble system to U.S. Patent No. 7,177,833; (Case 1:08-CV-02412); 9 pages.

Excerpts of the Chicago Board Options Exchange Annual Report 2001; available at http://www.cboe.com/AboutCBOE/AnnualReportArchive/AnnualReport2001.pdf; 2 pages.

The "Swiss Exchange SWX TS User Manual" (Ver. 2.1, Dec. 31, 1998); 249 pages.

Defendant's representative claim chart applying the teachings of the Dec. 1998 Swiss Exchange SWX system to U.S. Patent No. 7,251,629; 6 pages.

Adriaan Joubert & L.C.G. Rogers "Fast, Accurate and Inelegant Valuation of American Options" in Numerical Methods in Finance; pp. 88-92 (L.C.G. Roger & D. Talay eds., 1997); 7 pages.

Excerpts of the Hull Group, Inc. Form S-1 filed with the Securities Exchange Commission on May 13, 1999; 15 pages.

Defendant's claim chart applying the teachings of the Pang (6,546,375) patent to U.S. Patent No. 7,177,833; (Case 1:08-CV-02412); 13 pages.

Defendant's representative claim chart applying the teachings of the Pang patent (6,546,375)in view of Joubert (1997) to U.S. Patent No. 7,251,629; (Case 1:08-CV-02412); 9 pages.

Wolverine's Renewed Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Mar. 8, 2011.

Plaintiffs Edge Capture L.L.C.'s and Edge Specialists, L.L.C.'s Memorandum of Law Supporting their Motion to Strike Defendants' Renewed Motions to Bifurcate, *Edge Capture LLC and Edge Specialists, LLC v. Barclays Bank PLC et al.*, (1:09-cv-01521—US DC for the Northern District of IL), Mar. 9, 2011.

Wolverine Trading, L.L.C. and Wolverine Execution Services, L.L.C.'s Answer, Affirmative Defenses, and Counterclaims to Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.

Defendant Barclays Capital Inc.'s Answer, Affirmative Defenses, and Counterclaims in Response to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.

Defendant Barclays Bank PLC's Answer and Affirmative Defenses in Response to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.

Lakshminarayana R. Talluru & Vedat Akgiray, Knowledge Representation for Investment Strategy Selection, in Proceedings of the Twenty-First Annual Hawaii International Conference on System Sciences: Decision Support and Knowledge Based Systems Track, vol. III, pp. 189-196 (ed. Benn R. Konsynski, The Computer Society Press of the IEEE, Oct. 4, 1988).

Real-Time Object-Oriented Database Support for Program Stock Trading, Victor Fay-Wolfe et al, pp. 3-17, vol. 5 No. 2, Journal of Database Management, Spring 1994.

EasyOption User Guide, EasyScreen Inc., 21 pgs, 1998.

Allan D. Grody & Hugues Levecq, "Past, Present and Future: The Evolution and Development of Electronic Financial Markets", Center for Digital Economy Research, Stern School of Business, Working Paper Series: STERN IS-95-21, Nov. 1993.

Haug, Espen Gaarder, The Complete Guide to Option Pricing Formulas, pp. 1-34, 111-143, 165-178, 187-211 (McGraw-Hill, 1998).

PC Quote 6.0: Professional Real-time Quotes, Charts and Technical Analysis, available at http://web.archive.org/web/19981201232112/http://www.pcquote.com/pcwnew/table1.html (last visited on Dec. 21, 2011).

Standard & Poor's Comstock on the Net: Real-time Market Data with Unlimited Flexibility, available at http://web.archive.org/web/19980210175112/http://www.spcomstock.com (last visited on Dec. 21, 2011).

InterQuote Service Packages, available at http://web.archive.org/web/19980116230119/http://www.interquote.com/packages2.html (last visited on Dec. 21, 2011).
Introducing InterQuote 2.5: Download InterQuote!, available at http://web.archive.org/web/19980116225257/http://www.interquote.com/downld.html (last visited on Dec. 21, 2011).
InterQuote for Windows, available at http://web.archive.org/web/19980116230625/http://www.interquote.com/portfolios/Windows.html (last visited on Dec. 21, 2011).
The Inside Track on Pension Funds: Financial News—QT links with ICV, available at http://www.efnancialnews.com/story/1998-6-22/qt-links-with-icv (Jun. 22, 1998) (last visited on Dec. 21, 2011).
Univ. of RI: RTSORAC: Publications List, available at http://web.archive.org/web/19990419204933/http://homepage.cs.uri.edu/research/rtsorac/publications.html (Last updated Jun. 1997) (last visited on Dec. 21, 2011).
N.F. Maxemschuk & D.H. Shur, An Internet Multicast System for the Stock Market, available at the Cornell Library (http://arxiv.org/abs/cs/0002011) (Feb. 17, 2000).
Brad Adelberg et al., "Database Support for Efficiently Maintaining Derived Data", in Advances in Database Technology EDBT '96, 5th International Conference on Extending Databse Technology Avignon, France, Mar. 25-29, 1996 Proceedings, pp. 223-240 (eds. P. Apers et al., Springer-Verlag Berlin Heidelberg 1996).
Flextrade: Presenting . . . The most quantitative, F.I.X. complaint Institutional Equity Trading System, available at http://web.archive.org/web/19980529103322/http://www.flextrade.com (last visited on Dec. 22, 2011).
FlexTrade Systems, Inc.: FlexTRADER Overview, available at http://web.archive.org/web/19990508212935/http://www.flextrade.com/Flex_Trdr.htm (last visited on Dec. 22, 2011).
FlexTrade Systems, Inc.: Product Information, available at http://web.archive.org/web/19990508212027/http://www.flextrade.com/Flex_Prod.htm (last visited on Dec. 22, 2011).
PC Quote 6.0: Hardware Specifications, available at http://web.archive.org/web/19971121113837/http://www.pcquote.com/pcwnew/hardware.html (last visited on Dec. 21, 2011).
PC Quote 6.0: Fastest, Most Accurate Real-Time Data (HyperFeed), available at http://web.archive.org/web/19971121113908/http://www.pcquote.com/pcwnew/hyperfeed.html (last visited on Dec. 21, 2011).
PC Quote 6.0: Powerful Features That Are Easy to Use: Work in Excel, available at http://web.archive.org/web/19971121115839/http://www.pcquote.com/pcwnew/feat_excel.html (last visited on Dec. 21, 2011).
AQTOR-Automated Quoting and Trading of Risk by Actant.
AQTOR Reference Manual by Actant.
AQTOR Version 3.14 Reference Manual by Actant.
Belzberg Financial Market and News, Inc. Centre Pane, available at http://www.bfmni.com/centre_pane.html (last visited Jul. 12, 1999) (no longer available).
Letter to the Members of DTB Deutsche Terminhorse from Dr. Jorg Franke and Thomas Whal, entitled "Implementation Regulations of DTB for Technical Facilities/Rules Applying to Utilization of Quote Machines and Electronic Eyes," dated Nov. 21, 1996, 3 pages.
EasyScreen Product Guide, EasyScreen Inc., 20 pgs.
Flextrade Documents submitted by Defendant Wolverine in *Edge Specialists, LLC* v. *Barclays Bank PLC et al.*, (1:09-cv-01521—US DC for the Northern District of IL), 3 pgs.
Flextrade Equity Trading Systems, 3 pgs, Flextrade Systems Inc.
Flextrade: Real Time Equity Trading & Order Management Systems, System Details, 8 pgs., Flextrade Systems Inc.
Introducing Tradestation 3, Tradestation advertisement, order form, and printed materials, Omega Research Inc.
MicroHedge 4.0 User's Manual: Option Analytic and Risk Management Solutions, 108 pgs., 2000.
MicroHedge: The Options Analytics and Risk Management Choice: A Guide to Using, 120 pgs., 1998.
2.0 Auto Quote Requirements, 4 pages, Jul. 14, 1989.
David S. Ruder and Alden S. Adkins, Automation of Information Dissemination and Trading in the U.S. Securities Market, in U.S. Securities and Exchange Commission News Release, Remarks of David S. Ruder, Chairman, U.S. Securities and Exchange Commission, before the Annenberg Washington Program 1989 Forum on Technology and Financial Markets, on Feb. 27, 1989, 34 pgs.
RTD: Realtime Trading Desktop Manual, RTS Realtime Systems Group, 20 pgs.
Robert C. Merton, Applications of Option-Pricing Theory: Twenty-Five Years Later, The American Economic Review, vol. 88 No. 3, pp. 323-349, Jun. 1998.
Office Action from the United States Patent and Trademark Office, U.S. Appl. No. 09/417,774, 7 pgs., May 17, 2004.
Office Action from the United States Patent and Trademark Office, U.S. Appl. No. 09/417,774, 7 pgs., Aug. 1, 2002.
Interview Summary from the United States Patent and Trademark Office, U.S. Appl. No. 09/417,774, 4 pgs., Feb. 23, 2006.
Notice of Allowance from the United States Patent and Trademark Office, U.S. Appl. No. 09/417,774, 7 pgs., Feb. 24, 2006.
Interview Summary from the United States Patent and Trademark Office, U.S. Appl. No. 09/618,222, 3 pgs., Feb. 15, 2006.
Office Action from the United States Patent and Trademark Office, U.S. Appl. No. 09/618,222, 6 pgs., Jan. 28, 2004.
Office Action from the United States Patent and Trademark Office, U.S. Appl. No. 09/618,222, 6 pgs., Aug. 27, 2003.
Xticket: Global Risk Trading Solutions Product Overview, 6 pgs.
Building the Future Together, RTS Realtime Systems, Product Overview, 7 pgs.
MicroHedge Option Analytic and Risk Management Solutions, Product Materials, 8 pgs.
Yakov Amihud and Haim Mendelson, An Integrated Computerized Trading System, in Market Making Changing Structure Securities Industry, pp. 217-235 (eds. Yakov Amihud, Thomas S.Y. Ho, Robert A. Schwartz, 1985).
Stephen L. Williams, The Evolving National Market System, in Market Making Changing Structure Securities Industry, pp. 257-268 (eds. Yakov Amihud, Thomas S.Y. Ho, Robert A. Schwartz, 1985).
Jeffry L. Davis, The Intermarket Trading System and the Cincinnati Experiment, in Market Making Changing Structure Securities Industry, pp. 269-283 (eds. Yakov Amihud, Thomas S.Y. Ho, Robert A. Schwartz, 1985).
Roger W. Marshall and Severin C. Carlson, Electronic Trading Systems: The User's Point of View, in Market Making Changing Structure Securities Industry, pp. 285-295 (eds. Yakov Amihud, Thomas S.Y. Ho, Robert A. Schwartz, 1985).
William A. Lupien, Star Wars Technology in Trading, in Market Making Changing Structure Securities Industry, pp. 301-303 (eds. Yakov Amihud, Thomas S.Y. Ho, Robert A. Schwartz, 1985).
CRT: The Trading Machine, in The New Market Wizards: Conversations with America's Top Traders, pp. 313-317 (ed. Jack D. Schwager, 2005).
Joe Ritchie, The Intuitive Theoretician, in The New Market Wizards: Conversations with America's Top Traders, pp. 342-362 (ed. Jack D. Schwager, 2005).
Blair Hull, Getting the Edge, in The New Market Wizards: Conversations with America's Top Traders, pp. 363-389 (ed. Jack D. Schwager, 2005).
Remote Trader Workstation Manual Version 2.1.1, User Guide, Version 3.7, build 378+, Risk Information Systems & Consulting, L.L.C.: Traders Designing Software for Traders, 92 pages, 2000.
George H. John & Peter Miller, "Building Long/Short Portfolios Using Rule Induction," in Proceedings of the IEEE/IAFE 1996 Conference on Computational Intelligence for Financial Engineering, pp. 134-140, Mar. 24-26, 1996.
Henry C. Lucas, Jr. & Robert A. Schwartz, eds., "The Challenge of Information Technology for the Securities Markets: Liquidity, Volatility, and Global Trading," The Center for Research on Information Systems & the Salomon Brothers Center for the Study of Financial Institutions (1989), Chapters 2-3, 9-10, 13, 15-17, and 19 (170 pages).
The Barclays and UBS Defendants' Memorandum in Support of Their Renewed Motion to Bifurcate Patent Invalidity and Unenforceability from Alleged Infringement and Damages, *Edge Capture LLC and Edge Specialists, LLC* v. *Barclays Bank PLC et al.*, (1:09-cv-01521—US DC for the Northern District of IL), Mar. 4, 2011.
Declaration of Jeffrey G. Randall in Support of the Barclays and UBS Defendants' Memorandum in Support of Their Renewed Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Mar. 4, 2001, including only Exhibits 11, 12, 13, 42 and 43.

Real-Time Object-Oriented Database Support for Program Stock Trading, Victor Fay-Wolfe et al, University of Rhode Island, Technical Report, TR93-214, Jun. 1993.

Citadel's 42(b) Motion to Bifurcate the Issues of Invalidity and Unenforceability, *Edge Capture LLC and Edge Specialists, LLC v. Citadel Investment Group and Citadel Derivatives Group LLC*, (1:07-cv-04648—US DC for the Northern District of IL), Oct. 17, 2007.

Order Denying Citadel's Motion to Bifurcate, *Edge Capture LLC and Edge Specialists, LLC v. Citadel Investment Group and Citadel Derivatives Group LLC*, (1:07-cv-04648—US DC for the Northern District of IL), Oct. 26, 2007.

Citadel's Answers and Counterclaims, *Edge Capture LLC and Edge Specialists, LLC v. Citadel Investment Group and Citadel Derivatives Group LLC*, (1:07-cv-04648—US DC for the Northern District of IL), Nov. 13, 2007.

Plaintiffs' Reply to Counterclaims, *Edge Capture LLC and Edge Specialists, LLC v. Citadel Investment Group and Citadel Derivatives Group LLC*, (1:07-cv-04648—US DC for the Northern District of IL), Dec. 4, 2007.

Join Status Report, *Edge Capture LLC and Edge Specialists, LLC v. Citadel Investment Group and Citadel Derivatives Group LLC*, (1:07-cv-04648—US DC for the Northern District of IL), Jan. 2, 2008.

Stipulation for Dismissal with Prejudice and [Proposed] Order Thereon, *Edge Capture LLC and Edge Specilists, LLC v. Citadel Investment Group and Citadel Derivatives Group LLC*, (1:07-cv-04648—US DC for the Northern District of IL), Feb. 4, 2008.

Signed Order Dismissing the Case with Prejudice, *Edge Capture LLC and Edge Specialists, LLC v. Citadel Investment Group and Citadel Derivatives Group LLC*, (1:07-cv-04648—US DC for the Northern District of IL), Feb. 25, 2008.

Plaintiffs' Memo of Law in Opposition to Defendants' Motion to Dismiss for Failure to State a Claim or, Alternatively, to Bifurcate Patent Invalidity and Unenforceability from Infringement and Damages, *Edge Capture LLC and Edge Specialists, LLC v. Lehman Brothers Holdings Inc. and Lehman Brothers Inc.*, (1:08-cv-02412—US DC for the Northern District of IL), Jul. 1, 2008.

Plaintiffs' Corrected Appendix of Unpublished Authorities Cited in Plaintiffs' Memo in Opposition to Defendants' Motion to Dismiss, *Edge Capture LLC and Edge Specialists, LLC v. Lehman Brothers Holdings Inc. and Lehman Brothers Inc.*, (1:08-cv-02412—US DC for the Northern District of IL), Jul. 1, 2008.

Defendants' Reply Memo in Support of Their Motion to Dismiss, *Edge Capture LLC and Edge Specialists, LLC v. Lehman Brothers Holdings Inc. and Lehman Brothers Inc.*, (1:08-cv-02412—US DC for the Northern District of IL), Jul. 15, 2008.

Declaration of Jeffrey G. Randall in Support of Defendants Motion to Dismiss, *Edge Capture LLC and Edge Specialists, LLC v. Lehman Brothers Holdings Inc. and Lehman Brothers Inc.*, (1:08-cv-02412—US DC for the Northern District of IL), Jul. 15, 2008.

Order Denying Defendats' Motion to Dismiss, *Edge Capture LLC and Edge Specialists, LLC v. Lehman Brothers Holdings Inc. and Lehman Brothers Inc.*, (1:08-cv-02412—US DC for the Northern District of IL), Aug. 28, 2008.

Memorandum Opinion and Order, *Edge Capture LLC and Edge Specialists, LLC v. Lehman Brothers Holdings Inc. and Lehman Brothers Inc.*, (1:08-cv-02412—US DC for the Northern District of IL), Aug. 28, 2008.

Plaintiffs' Notice of Voluntary Dismissal, *Edge Capture LLC and Edge Specialists, LLC v. Lehman Brothers Holdings Inc. and Lehman Brothers Inc.*, (1:08-cv-02412—US DC for the Northern District of IL), Dec. 17, 2008.

Notification of Docket Entry, Order Closing Case, *Edge Capture LLC and Edge Specialists, LLC v. Lehman Brothers Holdings Inc. and Lehman Brothers Inc.*, (1:08-cv-02412—US DC for the Northern District of IL), Dec. 18, 2008.

Complaint, *Edge Capture LLC and Edge Specialists, LLC v. Barclays Bank PLC et al.*, (1:09-cv-01521—US DC for the Northern District of IL), Mar. 10, 2009.

Defendants' Motion to Dismiss or Bifurcate, *Edge Capture LLC and Edge Specialists, LLC v. Barclays Bank PLC et al.*, (1:09-cv-01521—US DC for the Northern District of IL), Jun. 5, 2009.

Barclays and UBS Memo in Support to Dismiss or, Bifurcate, *Edge Capture LLC and Edge Specialists, LLC v. Barclays Bank PLC et al.*, (1:09-cv-01521—US DC for the Northern District of IL), Jun. 5, 2009.

Declaration of Jeffrey Randall re Motion to Dismiss or, Bifurcate, *Edge Capture LLC and Edge Specialists, LLC v. Barclays Bank PLC et al.*, (1:09-cv-01521—US DC for the Northern District of IL), Jun. 5, 2009, Part 1, pp. 1-259.

Declaration of Jeffrey Randall re Motion to Dismiss or, Bifurcate, *Edge Capture LLC and Edge Specialists, LLC v. Barclays Bank PLC et al.*, (1:09-cv-01521—US DC for the Northern District of IL), Jun. 5, 2009, Part 2, pp. 260-525.

Plaintiffs' Memo in Opposition to Defendants' Motion to Dismiss or, Bifurcate, *Edge Capture LLC and Edge Specialists, LLC v. Barclays Bank PLC et al.*, (1:09-cv-01521—US DC for the Northern District of IL), Jul. 6, 2009.

Wolverine's Motion to Dismiss or, Join Co-Defendants' Motion to Bifurcate, *Edge Capture LLC and Edge Specialists, LLC v. Barclays Bank PLC et al.*, (1:09-cv-01521—US DC for the Northern District of IL), Jul. 6, 2009.

Wolverine's Memo in Support of Motion to Dismiss or, Join Co-Defendant's Motion to Bifurcate, *Edge Capture LLC and Edge Specialists, LLC v. Barclays Bank PLC et al.*, (1:09-cv-01521—US DC for the Northern District of IL), Jul. 6, 2009.

Barclays and UBS Reply Memo in Support of Their Motion to Dismiss or Bifurcate, *Edge Capture LLC and Edge Specialists, LLC v. Barclays Bank PLC et al.*, (1:09-cv-01521—US DC for the Northern District of IL), Jul. 20, 2009.

Wolverine's Motion to Continue the Deadline for the Parties to Submit an Agreed Discovery Schedule, *Edge Capture LLC and Edge Specialists, LLC v. Barclays Bank PLC et al.*, (1:09-cv-01521—US DC for the Northern District of IL), Jul. 21, 2009.

Defendants' Memo in Support of Their Motion to Continue the Discovery Deadline for the Parties to Submit an Agreed Discovery Schedule, *Edge Capture LLC and Edge Specialists, LLC v. Barclays Bank PLC et al.*, (1:09-cv-01521—US DC for the Northern District of IL), Jul. 21, 2009.

Plaintiffs' Memo in Opposition to Motion to Continue the Discovery Deadline for the Parties to Submit an Agreed Discovery Schedule, *Edge Capture LLC and Edge Specialists, LLC v. Barclays Bank PLC et al.*, (1:09-cv-01521—US DC for the Northern District of IL), Jul. 23, 2009.

Wolverine's Reply in Support of Their Motion to Continue the Deadline for the Parties to Submit an Agreed Discovery Schedule, *Edge Capture LLC and Edge Specialists, LLC v. Barclays Bank PLC et al.*, (1:09-cv-01521—US DC for the Northern District of IL), Jul. 23, 2009.

Minute Entry by Hon. C. Norgle Granting Defendants' Motion to Continue the Deadline, *Edge Capture LLC and Edge Specialists, LLC v. Barclays Bank PLC et al.*, (1:09-cv-01521—US DC for the Northern District of IL), Jul. 24, 2009.

Plaintiffs' Memo in Opposition to Defendants' Motion to Dismiss or, Bifurcate, *Edge Capture LLC and Edge Specialists, LLC v. Barclays Bank PLC et al.*, (1:09-cv-01521—US DC for the Northern District of IL), Jul. 24, 2009.

Wolverine's Reply to Plaintiffs' Memo in Opposition to Motion to Dismiss, *Edge Capture LLC and Edge Specialists, LLC v. Barclays Bank PLC et al.*, (1:09-cv-01521—US DC for the Northern District of IL), Aug. 7, 2009.

Reply by Wolverine to Plaintiffs' Memo in Opposition to Motion to Dismiss, *Edge Capture LLC and Edge Specialists, LLC v. Barclays Bank PLC et al.*, (1:09-cv-01521—US DC for the Northern District of IL), Aug. 12, 2009.

Wolverine's Response in Opposition to Plaintiffs' Motion for Leave to File Sur-Reply to Motion to Dismiss, *Edge Capture LLC and Edge Specialists, LLC v. Barclays Bank PLC et al.*, (1:09-cv-01521—US DC for the Northern District of IL), Aug. 13, 2009.

Notification of Docket Entry, Minute Entry Granting Plaintiffs' Motion for Leave to File Sur-Reply to Motion to Dismiss, *Edge Capture LLC and Edge Specialists, LLC* v. *Barclays Bank PLC et al.*, (1:09-cv-01521—US DC for the Northern District of IL), Aug. 13, 2009.

Plaintiffs' Sur-Reply to Defendants' Motion to Dismiss, *Edge Capture LLC and Edge Specialists, LLC* v. *Barclays Bank PLC et al.*, (1:09-cv-01521—US DC for the Northern District of IL), Aug. 14, 2009.

Minute Entry Denying Defendants' Motion to Dismiss, *Edge Capture LLC and Edge Specialists, LLC* v. *Barclays Bank PLC et al.*, (1:09-cv-01521—US DC for the Northern District of IL), Oct. 20, 2009.

Amended Complaint, *Edge Capture LLC and Edge Specialists, LLC* v. *Barclays Bank PLC et al.*, (1:09-cv-01521—US DC for the Northern District of IL), Dec. 4, 2009.

Barclays & UBS's Motion to Dismiss or Stay the Proceeding Pending Bilski Decision, *Edge Capture LLC and Edge Specialists, LLC* v. *Barclays Bank PLC et al.*, (1:09-cv-01521—US DC for the Northern District of IL), Dec. 18, 2009.

Wolverine's Motion to Dismiss or Stay the Proceedings Pending Bilski Decision, *Edge Capture LLC and Edge Specialists, LLC* v. *Barclays Bank PLC et al.*, (1:09-cv-01521—US DC for the Northern District of IL), Dec. 21, 2009.

Wolverine's Memo in Support of Motion to Dismiss or Stay Proceedings, *Edge Capture LLC and Edge Specialists, LLC* v. *Barclays Bank PLC et al.*, (1:09-cv-01521—US DC for the Northern District of IL), Dec. 21, 2009.

Plaintiffs' Memo in Opposition to Wolverine's Motion to Dismiss or Stay Proceedings, *Edge Capture LLC and Edge Specialists, LLC* v. *Barclays Bank PLC et al.*, (1:09-cv-01521—US DC for the Northern District of IL), Jan. 15, 2010.

Plaintiffs' Response to Barclays and UBS Motion to Dismiss or Stay Proceedings, *Edge Capture LLC and Edge Specialists, LLC* v. *Barclays Bank PLC et al.*, (1:09-cv-01521—US DC for the Northern District of IL), Jan. 15, 2010.

Wolverine's Reply in Support of Motion to Dismiss, or, In the Alternative, to Stay Pending Resolution of *Bilski* v. *Doll*, *Edge Capture LLC and Edge Specialists, LLC* v. *Barclays Bank PLC et al.*, (1:09-cv-01521—US DC for the Northern District of IL), Jan. 29 2010.

Barclays and UBS Reply Memo in Support of Motion to Dismiss or, Alternatively, to Stay All Proceedings Pending Resolution of *Bilski* v. *Doll*, *Edge Capture LLC and Edge Specialists, LLC* v. *Barclays Bank PLC et al.*, (1:09-cv-01521—US DC for the Northern District of IL), Jan. 29, 2010.

Court Order Granting Wolverine's Motion to Stay All Proceedings Pending US Supreme Court Decision in Bilski, *Edge Capture LLC and Edge Specialists, LLC* v. *Barclays Bank PLC et al.*, (1:09-cv-01521—US DC for the Northern District of IL), Mar. 5, 2010.

Defendants' Memo in Support of Motion to Dismiss or Stay Proceedings, *Edge Capture LLC and Edge Specialists, LLC* v. *Barclays Bank PLC et al.*, (1:09-cv-01521—US DC for the Northern District of IL), Dec. 18, 2009, Part 1, pp. 1-134.

Defendants' Memo in Support of Motion to Dismiss or Stay Proceedings, *Edge Capture LLC and Edge Specialists, LLC* v. *Barclays Bank PLC et al.*, (1:09-cv-01521—US DC for the Northern District of IL), Dec. 18, 2009, Part 2, pp. 135-263.

\* cited by examiner

THEORETICAL PRICE LOOK-UP TABLE 435

ASSUMPTIONS OF INPUT VARIABLES FOR THEORETICAL PRICES
(2) RISK FREE INTEREST RATE=3.0% PER ANNUM
(3) VOLATILITY OF THE UNDERLYING SECURITY=32.0% PER ANNUM
(4) EXPECTED DIVIDEND STREAM=A DIVIDEND OF $10.00, PAYABLE IN 77 DAYS (AUGUST 19 MINUS JUNE 03)
(5) TIME UNTIL OPTION EXPIRATION=109 DAYS (SEPTEMBER 20 MINUS JUNE 03)
(6) CAN BE EXERCISED EARLY=YES=AMERICAN STYLE OPTION
(7) IS THE OPTION A CALL OR PUT=CALL

FIG.4

| UNDERLYING PRICE | | | | | | | | | | | | | | | | | | | |
|---|---|---|---|---|---|---|---|---|---|---|---|---|---|---|---|---|---|---|---|
| STRIKE | 75.0 | 75.1 | 75.2 | 75.3 | 75.4 | 75.5 | 75.6 | 75.7 | 75.8 | 75.9 | 76.0 | 76.1 | 76.2 | 76.3 | 76.4 | 76.5 | 76.6 | 76.7 | 76.8 |
| 50.0 | 25.17 | 25.27 | 25.37 | 25.47 | 25.57 | 25.67 | 25.77 | 25.87 | 25.97 | 26.07 | 26.17 | 26.27 | 26.37 | 26.47 | 26.57 | 26.67 | 26.77 | 26.87 | 26.97 |
| 52.5 | 22.70 | 22.80 | 22.90 | 23.00 | 23.10 | 23.20 | 23.30 | 23.40 | 23.50 | 23.59 | 23.69 | 23.79 | 23.89 | 23.99 | 24.09 | 24.19 | 24.29 | 24.39 | 24.49 |
| 55.0 | 20.24 | 20.34 | 20.44 | 20.54 | 20.64 | 20.74 | 20.84 | 20.94 | 21.04 | 21.13 | 21.23 | 21.33 | 21.43 | 21.53 | 21.63 | 21.73 | 21.83 | 21.93 | 22.03 |
| 57.5 | 17.83 | 17.92 | 18.02 | 18.12 | 18.22 | 18.31 | 18.41 | 18.51 | 18.61 | 18.71 | 18.81 | 18.90 | 19.00 | 19.10 | 19.20 | 19.30 | 19.40 | 19.49 | 19.59 |
| 60.0 | 15.46 | 15.57 | 15.67 | 15.76 | 15.86 | 15.95 | 16.04 | 16.14 | 16.23 | 16.33 | 16.42 | 16.52 | 16.62 | 16.71 | 16.81 | 16.91 | 17.00 | 17.10 | 17.20 |
| 62.5 | 13.21 | 13.30 | 13.39 | 13.49 | 13.58 | 13.67 | 13.76 | 13.85 | 13.94 | 14.03 | 14.13 | 14.22 | 14.32 | 14.41 | 14.51 | 14.60 | 14.69 | 14.79 | 14.88 |
| 65.0 | 11.09 | 11.16 | 11.26 | 11.35 | 11.44 | 11.52 | 11.61 | 11.69 | 11.76 | 11.87 | 11.95 | 12.04 | 12.12 | 12.21 | 12.30 | 12.39 | 12.48 | 12.57 | 12.66 |
| 67.5 | 9.12 | 9.20 | 9.28 | 9.36 | 9.44 | 9.52 | 9.60 | 9.68 | 9.76 | 9.84 | 9.92 | 10.01 | 10.09 | 10.16 | 10.26 | 10.35 | 10.44 | 10.52 | 10.61 |
| 70.0 | 7.36 | 7.43 | 7.50 | 7.58 | 7.65 | 7.72 | 7.79 | 7.86 | 7.93 | 8.00 | 8.08 | 8.16 | 8.24 | 8.31 | 8.39 | 8.47 | 8.55 | 8.63 | 8.70 |
| 72.5 | 5.80 | 5.86 | 5.93 | 5.99 | 6.05 | 6.11 | 6.18 | 6.25 | 6.32 | 6.39 | 6.46 | 6.53 | 6.60 | 6.67 | 6.74 | 6.81 | 6.88 | 6.95 | 7.02 |
| 75.0 | 4.46 | 4.51 | 4.57 | 4.62 | 4.69 | 4.75 | 4.81 | 4.87 | 4.93 | 4.99 | 5.05 | 5.11 | 5.17 | 5.23 | 5.29 | 5.35 | 5.41 | 5.47 | 5.53 |
| 77.5 | 3.36 | 3.41 | 3.46 | 3.51 | 3.56 | 3.61 | 3.66 | 3.71 | 3.76 | 3.81 | 3.88 | 3.91 | 3.96 | 4.01 | 4.06 | 4.11 | 4.16 | 4.21 | 4.27 |
| 80.0 | 2.47 | 2.51 | 2.55 | 2.59 | 2.63 | 2.67 | 2.71 | 2.75 | 2.79 | 2.83 | 2.87 | 2.91 | 2.95 | 3.00 | 3.04 | 3.08 | 3.12 | 3.16 | 3.20 |
| 82.5 | 1.76 | 1.79 | 1.82 | 1.85 | 1.88 | 1.91 | 1.94 | 1.97 | 2.01 | 2.04 | 2.07 | 2.10 | 2.13 | 2.16 | 2.20 | 2.23 | 2.26 | 2.30 | 2.34 |
| 85.0 | 1.21 | 1.23 | 1.25 | 1.28 | 1.30 | 1.32 | 1.34 | 1.37 | 1.39 | 1.41 | 1.44 | 1.46 | 1.49 | 1.52 | 1.55 | 1.58 | 1.61 | 1.65 | 1.68 |
| 87.5 | 0.77 | 0.79 | 0.81 | 0.83 | 0.85 | 0.88 | 0.90 | 0.92 | 0.94 | 0.96 | 0.99 | 1.01 | 1.03 | 1.05 | 1.07 | 1.10 | 1.12 | 1.14 | 1.16 |
| 90.0 | 0.47 | 0.49 | 0.50 | 0.52 | 0.53 | 0.55 | 0.56 | 0.58 | 0.59 | 0.61 | 0.62 | 0.64 | 0.65 | 0.67 | 0.69 | 0.70 | 0.72 | 0.73 | 0.75 |
| 92.5 | 0.27 | 0.27 | 0.28 | 0.29 | 0.30 | 0.31 | 0.32 | 0.33 | 0.34 | 0.35 | 0.36 | 0.37 | 0.38 | 0.39 | 0.40 | 0.41 | 0.42 | 0.43 | 0.45 |
| 95.0 | 0.10 | 0.10 | 0.11 | 0.12 | 0.12 | 0.13 | 0.14 | 0.15 | 0.16 | 0.17 | 0.18 | 0.19 | 0.20 | 0.21 | 0.22 | 0.23 | 0.24 | 0.25 | 0.26 |
| 97.5 | 0.00 | 0.00 | 0.00 | 0.01 | 0.01 | 0.02 | 0.02 | 0.03 | 0.03 | 0.04 | 0.05 | 0.05 | 0.06 | 0.07 | 0.07 | 0.08 | 0.08 | 0.09 | 0.10 |

FIG.4A

| | 76.9 | 77.0 | 77.1 | 77.2 | 77.3 | 77.4 | 77.5 | 77.6 | 77.7 | 77.8 |
|---|---|---|---|---|---|---|---|---|---|---|
| | 27.07 | 27.17 | 27.27 | 27.37 | 27.47 | 27.57 | 27.67 | 27.77 | 27.87 | 27.97 |
| | 24.59 | 24.69 | 24.79 | 24.89 | 24.99 | 25.09 | 25.19 | 25.29 | 25.39 | 25.49 |
| | 22.13 | 22.23 | 22.32 | 22.42 | 22.52 | 22.62 | 22.72 | 22.82 | 22.92 | 23.02 |
| | 19.69 | 19.79 | 19.89 | 19.98 | 20.08 | 20.18 | 20.28 | 20.38 | 20.48 | 20.58 |
| | 17.29 | 17.39 | 17.49 | 17.58 | 17.68 | 17.78 | 17.87 | 17.97 | 18.07 | 18.16 |
| | 14.98 | 15.07 | 15.17 | 15.26 | 15.35 | 15.45 | 15.54 | 15.64 | 15.73 | 15.83 |
| | 12.76 | 12.85 | 12.94 | 13.03 | 13.12 | 13.21 | 13.30 | 13.39 | 13.48 | 13.57 |
| | 10.69 | 10.78 | 10.86 | 10.95 | 11.03 | 11.12 | 11.20 | 11.29 | 11.37 | 11.46 |
| | 8.79 | 8.86 | 8.94 | 9.02 | 9.10 | 9.17 | 9.25 | 9.33 | 9.41 | 9.49 |
| | 7.09 | 7.16 | 7.23 | 7.30 | 7.37 | 7.44 | 7.51 | 7.58 | 7.65 | 7.72 |
| | 5.59 | 5.65 | 5.71 | 5.78 | 5.84 | 5.90 | 5.96 | 6.02 | 6.08 | 6.15 |
| | 4.32 | 4.37 | 4.42 | 4.47 | 4.52 | 4.57 | 4.62 | 4.68 | 4.73 | 4.78 |
| | 3.24 | 3.29 | 3.33 | 3.37 | 3.41 | 3.46 | 3.51 | 3.56 | 3.61 | 3.66 |
| | 2.38 | 2.42 | 2.46 | 2.50 | 2.54 | 2.58 | 2.62 | 2.66 | 2.70 | 2.74 |
| | 1.71 | 1.74 | 1.77 | 1.80 | 1.83 | 1.86 | 1.89 | 1.92 | 1.95 | 1.98 |
| | 1.18 | 1.21 | 1.23 | 1.25 | 1.27 | 1.30 | 1.32 | 1.34 | 1.37 | 1.39 |
| | 0.77 | 0.78 | 0.80 | 0.81 | 0.83 | 0.85 | 0.87 | 0.90 | 0.92 | 0.94 |
| | 0.46 | 0.48 | 0.49 | 0.51 | 0.52 | 0.54 | 0.55 | 0.57 | 0.58 | 0.60 |
| | 0.27 | 0.28 | 0.29 | 0.29 | 0.30 | 0.31 | 0.32 | 0.33 | 0.34 | 0.35 |
| | 0.10 | 0.11 | 0.12 | 0.12 | 0.13 | 0.14 | 0.14 | 0.15 | 0.16 | 0.17 |

FIG.5A

UPPER LEFT QUADRANT

FIG.5B

LOWER LEFT QUADRANT

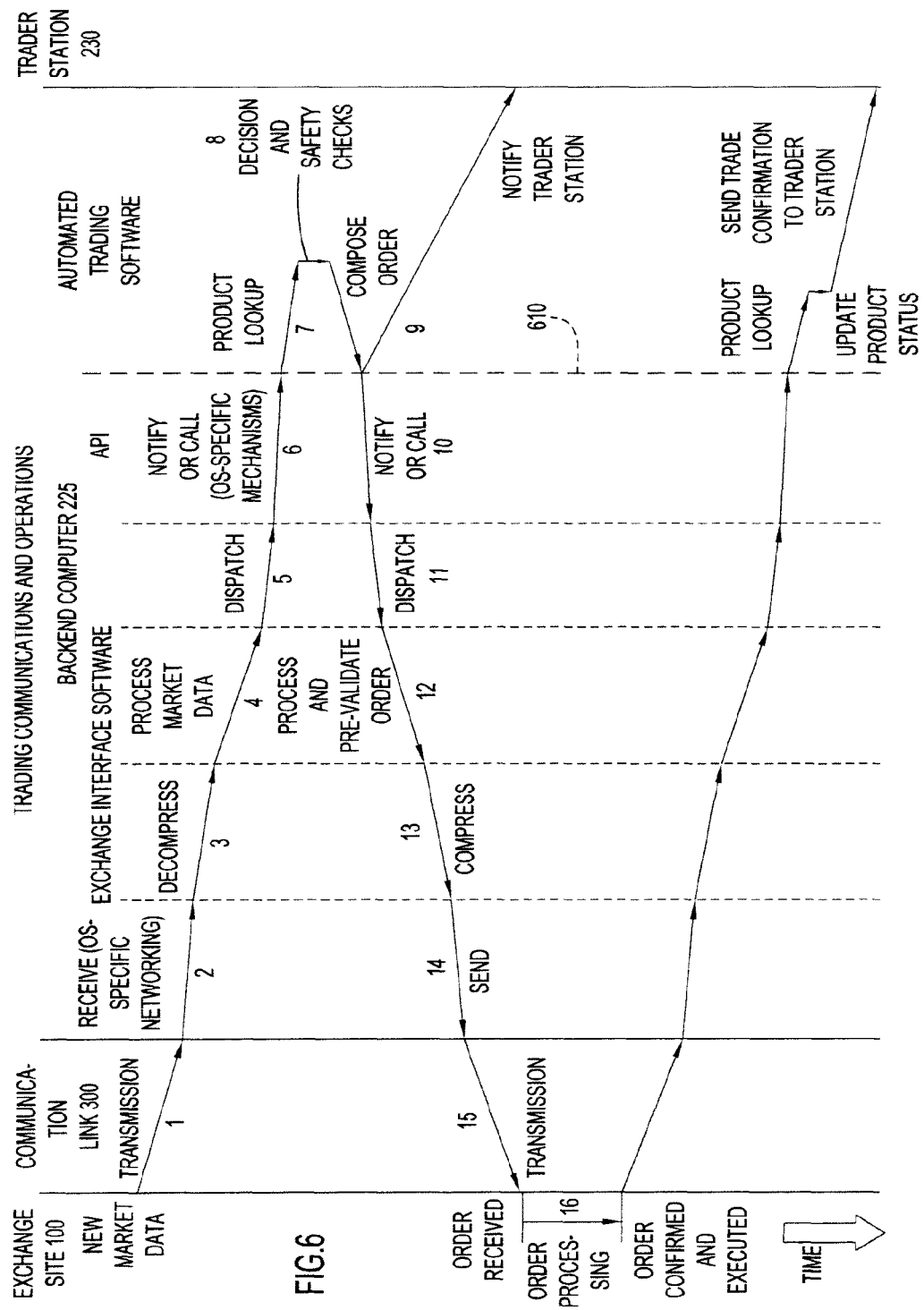

AUTOMATED TRADING SYSTEM IN AN ELECTRONIC TRADING EXCHANGE

The present application is a divisional of U.S. patent application Ser. No. 11/474,951 filed on Jun. 27, 2006, which is a divisional of U.S. patent application Ser. No. 09/417,774 filed on Oct. 14, 1999, now issued as U.S. Pat. No. 7,251,629, all of which are hereby incorporated by reference.

BACKGROUND OF THE INVENTION

1. Field of the Invention

The present invention relates to an automated trading system for use in an electronic trading exchange network system and, more particularly, a trading system that rapidly, accurately, and safely responds to desirable trading opportunities.

2. Description of the Related Art

Trading exchanges historically provided a location for buyers and sellers to meet to trade stocks, bonds, currencies, commodities, and other items. The New York Stock Exchange and the Chicago Mercantile Exchange are examples of such trading exchanges. Recent advances in computer and communications technology have led to electronic trading exchange system networks. Electronic trading exchange system networks use communications networks and computers to replicate traditional face-to-face exchange functions. For example, centralized exchange computers disseminate market information, maintain records and statistics, settle cash payments, determine risk based margin requirements, and match trades. Matching of trades is typically done on a first come-first served basis, whereby time of order entry is an important criterion for determining priority in fulfillment of a transaction.

A communications network connects the exchange computers to numerous trader sites. Each trader site includes one or more trader stations operated by traders. Exchange network operators typically provide exchange members with interface software and, in some cases, hardware to enable traders to view prices and other information relating to products, and to execute transactions by submitting orders and quotes. This trading information is displayed in a grid or other organized format. Market competition is fierce. Traders who can quickly identify opportunities and act on them generate the largest profits.

Most trader stations in use today rely upon the traders themselves to decide whether to submit an order in response to a trading opportunity presented through the exchange. In this regard, the trading information is received from the exchange, processed, and displayed on a monitor of the trader's station. The trader reads the trading information from the monitor and decides whether or not to submit an order. The trader submits an order by entering instructions into the trader station using a keyboard or mouse.

Attempts have been made to implement trading systems that automate decision-making so that orders may be submitted with limited trader interaction. These systems have a number of drawbacks. For example, user-friendly systems that automatically submit orders without trader interaction, while faster than a human trader, are relatively slow in terms of computer speed due to application and system design. In a typical set-up, trading information received from the exchange is processed by general purpose backend computer equipment. The backend computer may, among other things, (1) act as a gateway by communicating to market information from the exchange to various types of client equipment, (2) submit, delete, and modify orders and quotes to the exchange from the various client equipment, (3) receive real-time trade confirmations and end-of-day back office reports, and (4) perform risk analysis, position management, and accounting functions. The trader stations are clients of the backend computer. The trader stations may be tasked with numerous functions, such as (1) receiving and displaying real-time market information, (2) creating and displaying theoretical prices related to market products, (3) composing, submitting, modifying, and deleting orders and quotes, (4) maintaining positions and calculating risk management, to name a few. Each trader station is typically configured in a very user-friendly, Windows-based environment since the trader will spend long periods of time each day watching and interacting with it. The overhead associated with the functions performed by the backend computer and the trader stations reduces the response speed of automated trading.

In addition, computer equipment lacks the trading judgment of a human trader. A computer can generate staggering losses in the blink of an eye by submitting orders based upon incomplete or mistaken assumptions inherent in the trading program, erroneous input data, or corrupted data relied upon by the trading program. Accordingly, there exists a need in the art for an automated trading system that rapidly responds to trade information transmitted from an exchange, yet is safe and accurate.

SUMMARY OF THE INVENTION

The present invention has been made in view of the above circumstances and has as an object to provide an improved trading system that rapidly responds to trading information received from an exchange.

A further object of the invention is to provide an automated trading system in an electronic trading exchange system that rapidly submits orders in response to trading information received from the exchange.

A further object of the invention is to provide an automated trading system that ensures the accuracy of automatic trading operations.

A further object of the invention is to provide an automated trading system that performs automatic trading operations without the risk of enormous losses due to erroneous, mistaken and/or repeated operation.

A further object of the invention is to provide a trading system in an automated trader to station that may be remotely controlled.

A further object of the invention is to provide an automated trader system that automatically hedges some or all of the delta risk associated with the execution of a trade by submitting an order in connection with another, related trade opportunity.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an automated trading system for use in an electronic exchange system network that includes a receiver interface that receives market price information for a first traded item from an exchange, data reference logic that outputs a transaction value for the first traded item from a data structure based on price information for a second traded item related to the first traded item, decision logic using at least a portion of the received market price information and the transaction value to generate a decision whether to submit an order for the first traded item, and an output interface for outputting a request for market transaction for one of the first traded item and the second traded item for transmission to the exchange in response to the decision logic. By way of example, the first traded item may correspond to an option and the second traded item may correspond to a security underlying the option.

The data reference logic may receive current price information for the second traded item and uses the current price information to output the transaction value. The data reference logic may include memory storing the data structure, which maps pre-calculated transaction values of the first traded item over a range of price values of the second traded item, and reference logic for identifying one of the pre-calculated transaction values based at least in part on a current price value for the second traded item. The data structure may comprise one or more of a two-dimensional data structure mapping pre-calculated transaction values of the first traded item over a range of prices of the second traded item, an n-dimensional data structure, where n is 3 or more, a look-up table, a linked list, and/or a tree structure.

The decision logic may compare at least a portion of the received market price information to the transaction value when automated trading in the first item first becomes enabled. The automated trading system may also include safety check logic, responsive to the decision logic, to prevent transmission of a request for market transaction (or to cap the maximum quantity of the market transaction) for the first traded item to the exchange if the request does not meet a predetermined criterion, such as a maximum trade quantity for the first traded item or a maximum number of market transaction attempts within a predetermined period of time. The decision logic may compare at least a portion of the received market price information to the transaction value when the maximum number of attempts is increased.

The receiver interface may receive the market price information for the first traded item indirectly from the exchange via an exchange interface. Further, the decision logic may compare the transactional value to at least a portion of the received market price information, where the transaction value is a minimum sell price for the first traded item, and the market price information includes a market bid price for the first traded item. The transaction value may be a maximum buy price for the first traded item, and the market price information may include a market ask price for the first traded item. The transactional value may be a theoretical value of the first traded item based on a mathematical model.

The price information for the second traded item may correspond to a current market price for the second traded item. The decision logic may then generate a comparison when the current market price for the second traded item changes. Comparisons may additionally be generated when the current market price for the first traded item changes, when a table variable are updated or changed, when automated trading is enabled, and/or when safety checks are relaxed.

A backend computer may include the receiver interface, the data reference logic, the decision logic, and the output interface. The first backend computer may operate using a Windows-based operating system or a text-based operating system. A trader station separate from the backend computer may be coupled to the backend computer through a communication link. The trader station may include a graphic user interface to enable a trader to monitor the operation of the backend computer. The trader station may transmit updated data reference information for updating the data reference logic to the backend computer over the communication link. For example, the trader station can calculate the updated data reference information, which the backend computer stores. The backend computer may be located substantially closer than the trader station to the exchange that transmits the market price information for the first traded item.

The present invention further comprises an automated trading method for use in an electronic exchange system network, that includes receiving market price information for a first traded item, identifying a desired price for the first traded item in a look-up table based on price information for a second traded item related to the first traded item, comparing the received market price information for the first traded item to the desired price for the first traded item, and generating an order for one of the first traded item and the second traded item based on the comparison of the received market price information to the desired price.

The first traded item may correspond to an option and the second traded item may correspond to a security underlying the option. The step of identifying a desired price may include receiving current market price information for the second traded item, using that current market price information to index a desired price for the first traded item in the look-up table. The look-up table may be a two-dimensional table providing desired price values indexed by item traded and price of the second traded item or an n-dimensional table, where n is 3 or more.

The present invention further comprises an automated method of trading in an electronic exchange system network, comprising the steps of receiving a current market price for an option from an electronic exchange, comparing the current market price for the option with a desired price for the option, where the desired price is derived from current price information for an underlying security for the option, and submitting an order for the option to the electronic exchange within 1 millisecond of the step of receiving the current market price.

The step of submitting an order may be performed within 600 microseconds of the step of receiving the current market price, and even within 380 or 250 microseconds of the step of receiving the current market price.

The present invention further comprises an automated trading method for use in an electronic exchange system network, including the steps of receiving market information for a first traded item, identifying a transaction value for the first traded item in a look-up table based on at least one of price information for a second traded item related to the first traded item and received market information for the first traded value, and using at least the identified transaction value in determining whether to submit an order for the first traded item.

The identified transaction value may be an implied volatility value corresponding to the first traded item, a maximum buy value for the first traded item, a minimum sell value for the first traded item, or a theoretical value for the first traded item generated based on a mathematical model. Further, the look-up table may comprise a linked list.

The backend computer may perform the receiving, identifying, and using steps on a Windows-based operating system or on a text-based platform. A trader station separate from the backend computer may calculates transaction values for storage in the look-up table and transmit the calculated transaction values to the backend computer, which stores the calculated transaction values in the look-up table. The values stored in the look-up table of the backend computer may be checked against values stored in a look-up table in the trader station to confirm the accuracy of the look-up table stored in the backend computer.

Moreover, the method may further include submitting an order for the first traded item receiving confirmation of a transaction from an exchange responsive to the order submitted, and submitting an order for the second traded item to hedge a delta risk associated with the confirmed transaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIGS. 4 and 4A, collectively referred to in the description of the preferred embodiment as FIG. 4, illustrate a representation of an embodiment of a theoretical price look-up table in accordance with the present invention, with FIG. 4A being a continuation of the right end of FIG. 4.

FIG. 5A, 5B, 5C and 5D, collectively referred to in the description of the preferred embodiment as FIG. 5, illustrate an embodiment of a trading screen for use in connection with a trader station in accordance with the present invention, with FIG. 5A being the upper left quadrant, FIG. 5B being the upper right quadrant, FIG. 5C being the lower right quadrant, and FIG. 5D being the lower left quadrant of FIG. 5.

FIG. 6 provides a flow diagram of the steps performed in automated trading in accordance with the present invention.

DESCRIPTION OF THE PREFERRED EMBODIMENT

The present invention recognizes that electronic trading exchange system computers match buy and sell orders on a first come/first serve basis. Accordingly, the speed and accuracy of submitting orders or other responses is critical to the trader's ability to participate in the most profitable transactions. Even short delays in response may freeze a trader out of an otherwise lucrative transaction.

The present invention is capable of reducing the time it takes for the trader to submit an order in response to incoming trading information from the exchange. In accordance with one aspect of the present invention, the trader's computer equipment automatically decides whether or not to submit an order based upon a look-up table of trading information stored by the computer equipment and trading information received from the exchange computers. The look-up table, among other advantages, eliminates the need to recalculate decision information when trading conditions change. Recalculating decision information is time consuming, particularly when trading conditions change frequently. For example, calculating a single price for an option can take several hundred microseconds to a few milliseconds and each underlying security may correspond to several hundred options. In addition, information in the look-up table can be structured to enable automated decisions to be made for select traded items sooner than for other traded items. To further enhance the response speed of the trader, the trader's computer equipment may be dedicated or substantially dedicated to performing automated trading operations, with limited or minimized overhead permitted for other tasks. Further, the trader's computer equipment assigned to automated trading may be used to process raw trading information received from the exchange. The present invention is further capable of reducing the time delay associated with the transfer of trading information from the exchange computers to the trader.

In an additional aspect of the present invention, safe and accurate automated trading may be achieved by performing various checks of the information used in decision-making and/or information concerning the order. Further, an automated hedging feature may be invoked which, when a trader takes a position in a security, automatically establishes a hedge position in a related security.

Reference will now be made in detail to the present exemplary embodiment(s) of the invention illustrated in the accompanying drawings. Wherever possible, the same reference numbers will be used throughout the drawings to refer to the same or like parts.

Figure 1:
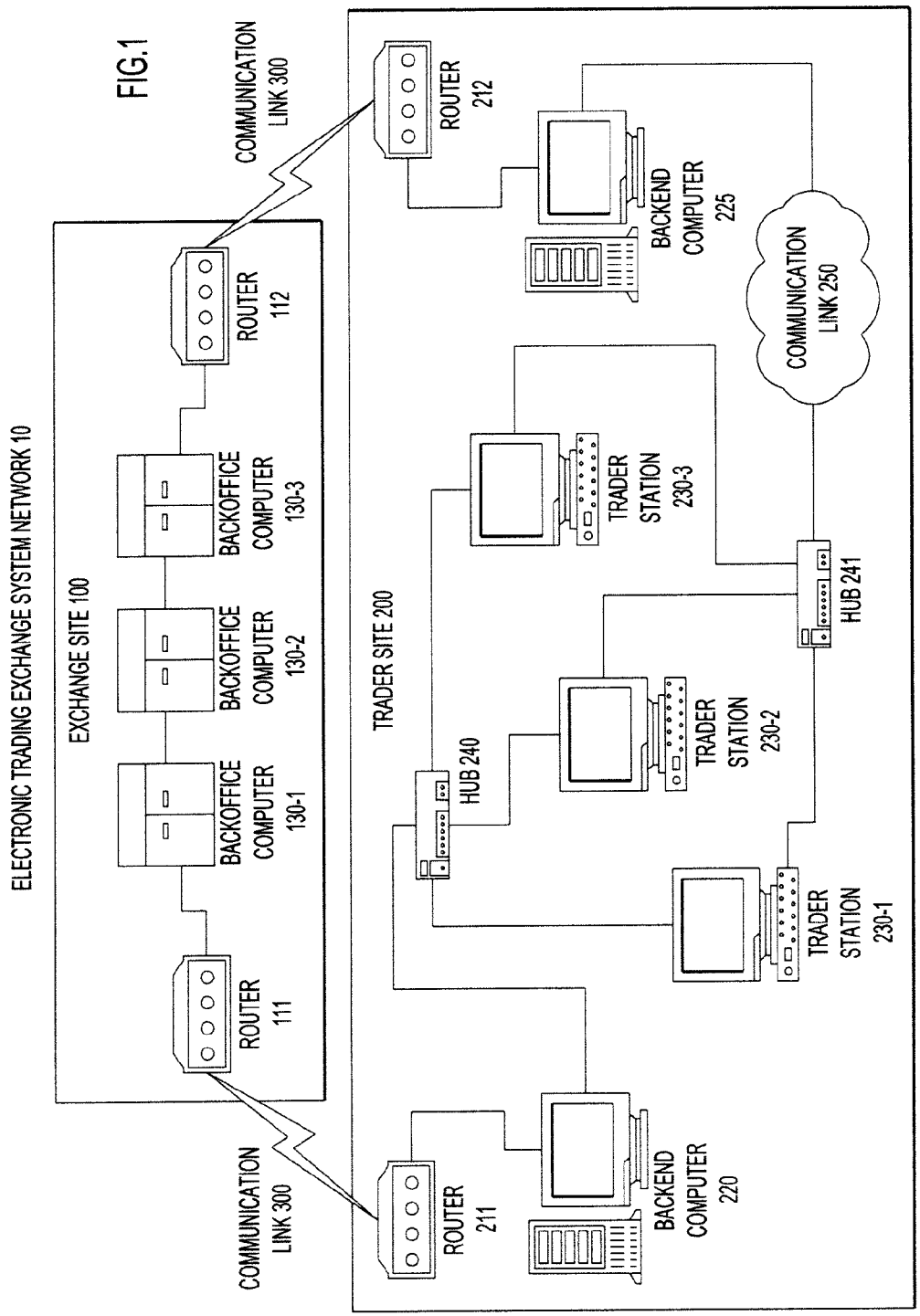
FIG. 1 illustrates an embodiment of an electronic trading exchange system network in accordance with the present invention.

FIG. 1 provides a schematic of an embodiment of an electronic trading exchange system network 10 that may be used in connection with the present invention. Other network arrangements may be used as well. The electronic trading exchange system network 10 includes an exchange site 100 and a plurality of trading sites 200. For purposes of simplification, FIG. 1 illustrates an exchange site 100 linked to a single trading site 200. Other trading sites 200 may be located in a different part of the same city, as the exchange site 100, a different city, a different country or different continent as the exchange site 100. The exchange site 100 need not be limited to equipment provided at a single location, but may be provided in multiple locations linked by a network. Similarly, the trading sites 200 need not be limited to equipment provided at a single location, but may include equipment at multiple locations linked by a network, such as a wide area network (WAN).

The exchange site 100 may be linked to the trading site 200 by one or more communication links 300. The communication links 300 may be part of a wide area network formed by dedicated communications lines, commonly-accessible communication lines, or a combination thereof. For example, dedicated lines may be strung between the exchange site 100 and one or more of the member trading sites 200. Alternatively, dedicated lines may be leased from telephone, cable, or other communication network operators. For example, the public switched telephone network may embody the commonly-accessible communication lines. Of course, the communications links 300 may also include, in whole or in part, wireless communications, such as microwave or satellite links.

In one embodiment, the exchange site 100 may be designed as a local area network (LAN) and include, for example, one or more security routers and one or more back office computers, among other equipment. For purposes of illustration only, two security routers 111, 112 and three back office computers 130-1 130-2, 130-3 (referred to collectively as back office computer 130) are shown in FIG. 1. The security routers 111, 112 control communications between the back office computers 130 and the communications links 300. Each security router 111, 112 transmits and receives communications over the communications links 300, as well as restricts communications from unauthorized sources. More particularly, the security router 111, 112 may be used to isolate the equipment at the exchange site 100 from intrusion and facilitate communication with the back office computers 130.

The back office computers 130 manage the trading of the various securities (e.g., futures, options, swaps or other derivatives; currencies, stocks, bonds, or other physicals like corn, precious metals, electricity, etc.) and/or other items traded on the exchange. For example, one or more of the back office computers 130 may function as market servers. In this capacity, they may maintain order books, perform order matching, generate market information for use at the exchange site 100 and/or for transmission over the communication links 300, and supply trade information to other back office computers 130 for accounting and/or cash settlement purposes. One or more of the back office computers 130 may function as short-term accounting servers. As such, these computers may receive information from the market servers and generate information for transmission over the communication links 300. The short-term accounting servers may be initialized with status information from the previous day's trading before performing accounting tasks for the current day. One or more of the back office computers 130 may function as long-term account servers and, accordingly, function to collect data from the short-term accounting servers for batch processing and record. The long-term account servers may supply information to initialize the short-term account servers and generate reports for transmission to trading sites 200. Of course, the back office computers 130 may perform additional functions and a single computer may perform more than one of the above functions.

The trading sites 200 may include a LAN architecture having one or more security routers, one or more backend computers, one or more trader stations, and one or more hubs, among other equipment. For purposes of illustration only, FIG. 1 shows two security routers 211, 212, two backend computers 220, 225, three trader stations 230-1, 230-2, 230-3, (collectively referred to as trader stations 230) and two hubs 240, 241. The security routers 211, 212 transfer trading information between the trading site 200 and the exchange site 100 and screen communications from unauthorized sources. The hubs 240, 241 distribute data between the backend computers 220, 225 and the trading stations 230.

Backend computer 220 may be configured as a communication server for the trader stations 230. The exchange often supplies software and/or hardware for the backend computer 220 to facilitate communications with the exchange site 100. Backend computer 220 handles communications between the trader stations 230 and the back office computers 130 of the exchange. Of course, the trader site 200 may include multiple backend computers 220.

Backend computer 225 may also be equipped with software and/or hardware that facilitates communications with the exchange site. Some exchanges, for example, such as the EUREX (the German and Swiss Derivatives Exchange), recommend installation of a redundant on-site backend computer in the event that the primary communication backend computer 220 fails. In addition, backend computer 225 may be configured to perform automated trading functions under the control of one or more of the trader stations 230. The automated trading functions are described in more detail below. The backend computer 225 should be equipped with a high-speed processor and sufficient memory to efficiently handle automated trade processing. The trader stations 230 may control backend computer 225 remotely through a communication link 250, for example, a WAN. The trader site 200 may include multiple backend computers 225.

In one preferred embodiment, backend computer 225 is dedicated or substantially dedicated to performing automated trading-related functions, as discussed in greater detail below. Backend computer 220, rather than backend computer 225, may be assigned trading-related tasks, such as (1) serving as a gateway to communicate market information from the exchange site 100 to trader stations 230, (2) submitting, deleting, and modifying orders and quotes to exchange site 100 from the trader stations 230, (3) receiving real-time trade confirmations and end-of-day back office reports, and/or (4) performing risk analysis, position management, and accounting functions. In this way, backend computer 225 may perform automated trading functions with limited interruption or delays associated with other tasks the backend computers (such as backend computer 220) may be requested to perform. This increases the response speed for automated trading operations. Moreover, the total time delay in submitting an order to the exchange site 100 includes a component attributable the transmission delay or network lag in transmitting signals between the exchange site 100 and the trader site 200. Therefore, backend computer 225 is preferably located near to the equipment of the exchange site 100 to reduce delays associated with transmitting information and orders between the backend computer 225 and the exchange site 100. Accordingly, the total time for responding to trading opportunities can be reduced both by reducing transmission delays and by increasing decision-making speed at the trader site 200. Significantly, the backend computer 225 may be remotely supported or controlled by a distant trader station 230, which permits the trader station 230 to be located virtually anywhere without adversely affecting the response time of the automated trading system. Accordingly, the trader site 230 may be chosen based on considerations such as tax, real estate costs, and quality of life, without having to worry that trader station location will impair the performance of automated trading carried on by backend computer 225.

Trader stations 230 receive information from the exchange site 100, process that information, and display at least part of it on a monitor. Each trader station 230 typically runs interactive software that enables a trader, among other things, to submit orders and/or quotes to the exchange site 100. As discussed further below, one or more of the trader stations 230 may additionally be equipped with software for controlling the automated trading functions of backend computer 225.

Figure 2:
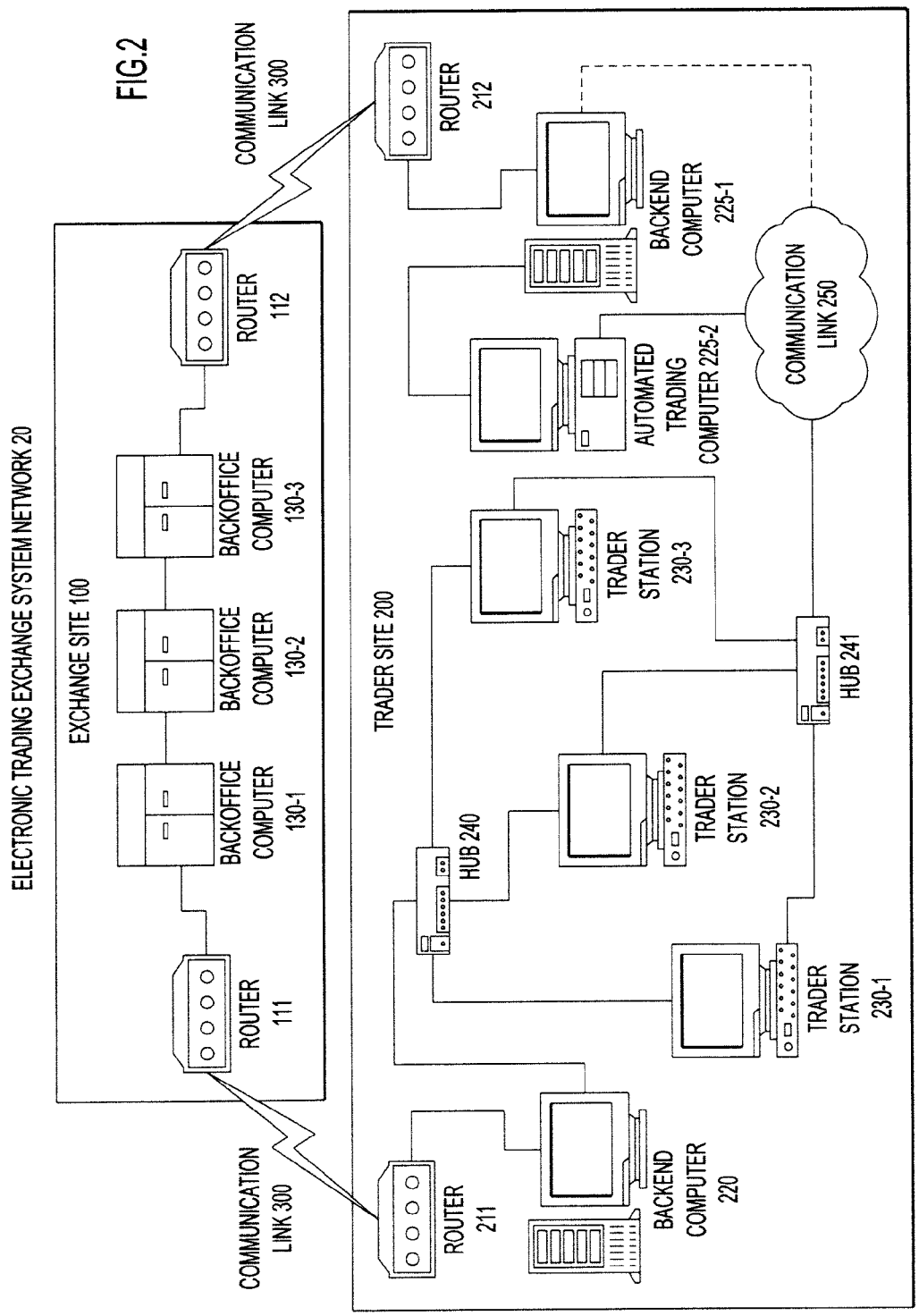
FIG. 2 illustrates a further embodiment of an electronic trading system network in accordance with the present invention.

FIG. 2 illustrates an alternative embodiment of an electronic trading exchange system network 20. For the sake of brevity, features of FIG. 2 similar to those in FIG. 1, which are described above, will not be repeated. In FIG. 2, the trading site 200 includes an automated trading system computer 225-2 separate from the backend computer 225-1. In this embodiment, the automated trading system computer 225-2 performs automated trading system functions and the backend computer 225-1 manages communications between the automated trading system computer 225-2 and the exchange site 100. The automated trading system computer 225-2 may be connected to the backend computer 225-1 using, for example, network interface cards or through a hub (not shown). The automated trading system computer 225-2 may be controlled using one or more trader stations 230 either locally or through a communication link 250. Alternatively, the automated trading system computer 225-2 may be controlled through the communication computer 225-1 (as indicated by the dotted lines), which would serve to communicate information between the trader stations 230 and the automated trading system computer 225-2.

Figure 3:
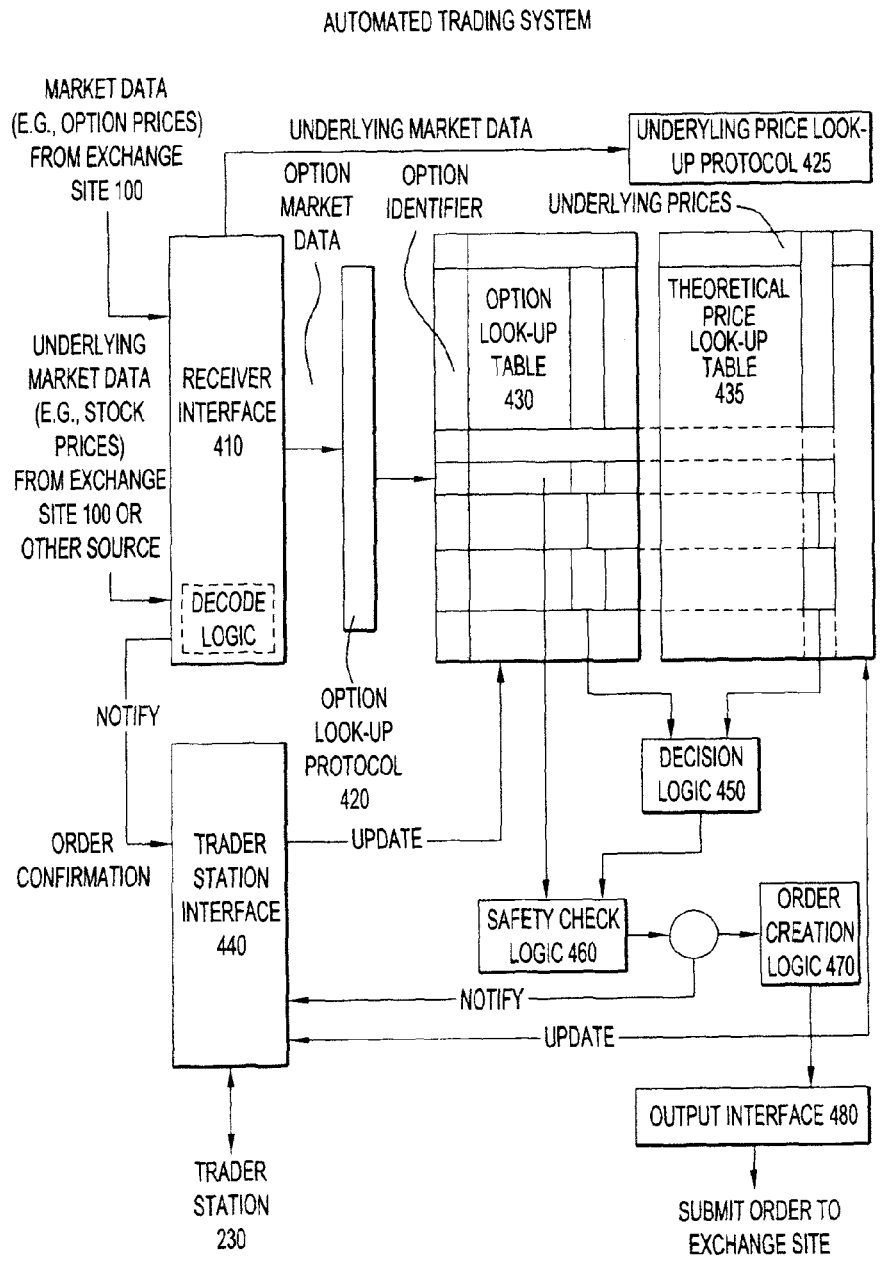
FIG. 3 provides a schematic of the functionality of an embodiment of an automated trading system in accordance with the present invention.

FIG. 3 provides a functional diagram illustrating the operation of an embodiment of an automated trading system used in connection with options trading. Of course, the embodiment may be modified for use in trading other securities (e.g., futures, options, swaps or other derivatives; currencies, stocks, bonds, or other physicals like corn, precious metals, electricity, etc.) and/or other items traded on the exchange. The automated trading system is preferably resident in the backend computer 225 as configured in FIG. 1, which may utilize multiple CPUs. However, it may also be resident in one or more of the trader stations 230 or the backend computers 220. The automated trading system software may run in a text-based environment or a Windows or Windows-like environment. For example, the automated trading system may be run on an operating system, such as VMS, DOS, or LINUX, or in a WINDOWS or similar operating system, which is more user-friendly. In some operating systems, automated trading may be assigned priority over other tasks or processes and run without debug messages. Local decision-making times of less than 250 microseconds have been achieved in a text-based VMS system run on a backend computer 225 and times of 50-150 milliseconds or less have been achieved on a Windows-based system run on a trader station 230, depending on the processor load from other tasks.

The automated trading system receives and decodes current market information broadcast from the exchange site 100 through a receiver interface 410. The decoding of market information may be performed, for example, transparently by software supplied by the exchange for use with the backend computers, by the exchange software at the request or direction of the automated trading system, or by the automated trading system itself. The current market information may include information related to the options and underlying security of the option. Specifically, market bid, ask and last prices and the day's volume for call options (the right to buy the underlying security at a specified time in the future at a specified price), put options (the right to sell the underlying security at a specified time in the future at a specified price) and the underlying security, to name a few, are typically received by the trader site. An option look-up protocol 420 is used to locate the particular option identified in the current market information in an option look-up array or table 430, which may be formed in memory of the backend computer 225. The look-up protocol 420 may be any of several known look-up or search protocols. For example, the look-up protocol may involve a linear search, search tree, use of a hash or index table, or other known search protocol.

The option look-up array or table 430 stores information concerning options that may be automatically traded. For simplicity, a two-dimensional table having rows and columns will be described. However, it should be understood that higher-dimension arrays or tables may be used in connection with the present invention. Each row of the option look-up table 430 stores information relevant to a particular option including, for example, option name, current market prices, times and quantities of the most recent trades by the trader, maximum order quantity, and whether automated trading is enabled for the option. As discussed further below, this information may be used as a check against erroneous operation. Alternatively, option look-up table 430 may store information in connection with items that are actually being automatically traded at a given time. As a further alternative, look-up table 430 may include indices that link only the items currently enabled for automated trading and skip those for which automated trading is not enabled. In such a case, an additional table may be maintained for the full set of items for which automated trading may be performed. This is useful in increasing the speed at which a disabled option can be enabled. Accuracy checks may use both the additional table and look-up table 430. Communications between the automated trading system and the trader stations 230 are conducted through a trading station interface 440. For example, a trader station 230 may update information contained in the option look-up table 430 via a trading station interface 440. In this way, the option look-up table 430 may be updated to enable (disable) automated trading for a particular option.

The option look-up table 430 may be organized in several different ways. For example, the market bid and ask prices for a particular option may be stored in different rows of the option look-up table 430. Alternatively, the bid and ask prices may be stored in the same row of the option look-up table 430, but in different columns, or as different cells in a price dimension, for example. Also, the option look-up table 430 may be segmented, for example, so that all bid prices are grouped together and all ask prices are grouped together. Different classes of options (i.e., options with different underlying securities) may be indexed in a single look-up table 430 or in multiple look-up tables 430, for example, with each option having its own look-up table 430.

In addition to the current market information concerning option trading, the automated trading system may receive and decode current market information concerning the security (or securities) underlying the options. For example, an exchange that trades the underlying security typically maintains a book of bid (ask) prices and quantities of current order and quotes of those traders wishing to buy (sell) the underlying security. The automated trading system may receive the underlying market information, for example, from the exchange site 100, from a separate exchange site, or from another market feed either directly or indirectly, to e.g., through a trader station 230. The underlying market information for a given security may be indexed in a theoretical price look-up array or table 435, which may be formed in the memory of backend computer 225, to identify theoretical buy and sell prices for options associated with the underlying security. While the theoretical price look-up table 435 may constitute a multi-dimensional array or table, a two-dimensional table will be described for purposes of simplicity. It should be understood that data structures other than arrays or tables may be used in connection with the present invention. The theoretical price look-up table 435 may be updated by a trading station 230 via trading station interface 440. In one embodiment, the trader station 230 supplies the content of the theoretical price look-up table 435 to the automated trading system.

The theoretical buy and sell prices for derivatives, such as options, may be determined using mathematical models. The mathematical models produce a theoretical value for an option given values for a set of variables that may change over time. Variables considered in these models may include (1) the current market price of the underlying security (e.g., the price of the stock or future from which the option is derived), (2) risk free interest rates, (3) volatility of underlying price, (4) dividend stream, (5) time until expiration, (6) whether the option can be exercised before the expiration date, and (7) whether the option is a call or put. Variables (2)-(7) are not likely to change as frequently as the price of the underlying security, variable (1). Some variables, such as price of the underlying security, can be derived from the market. Other variables require some qualitative assessment by the trader. In one embodiment of the invention, the current market price of the underlying security is used to index the theoretical price look-up table 435. However, the theoretical price look-up table 435 may be indexed using other variables in addition to or instead of current market price of the underlying security.

The current market price of the underlying security may be defined in several different ways. At any given time during normal trading, the underlying security will usually have: (1) bid prices and quantities; (2) ask prices and quantities; (3) a last price and volume at which the underlying security was traded (last price); (4) an average of the current highest bid and lowest offer prices (average best bid, best ask price); and (5) an average price of a certain depth, among other values. The average price of a certain depth, say 5000 shares, would take the average of the: (a) best (highest) bid prices in the book of the first 5000 shares, and (b) best (lowest) offer prices in the book of the first 5000 shares. Obviously, there are many more definitions of underlying price that can be created, for example, using permutations of the five definitions provided above.

It is highly probable that at least four of these five definitions will yield (perhaps slightly) different results at any time. Since the normal hedging response of an option trade is to buy or sell the underlying security, the option trader may very carefully define underlying price used in her models. Specifically, buying (selling) calls and selling (buying) puts will usually lead to selling (buying) the underlying for hedging. For reasons discussed further below, the trader may want to set the theoretical buy price for call options and the theoretical sell price for put options using the bid price (and/or possibly bid underlying depth) of the underlying security. Likewise, the trader may want to set the theoretical sell price for call options and the theoretical buy price of put options using the ask price (and/or possibly the ask underlying depth) of the underlying security. In summary, theoretical value calculations used for automatic option trading should be flexible enough to use various definitions of underlying price.

In addition to generating a theoretical value for an option, the trader selects a buy spread and a sell spread. The buy spread may be subtracted from the theoretical value to produce the theoretical buy price—the highest price at which the trader is willing to buy a particular option using automated trading. The sell spread may be added to the theoretical value to produce the theoretical sell price—the lowest price at which the trader is willing to sell a particular option using automated trading. Accordingly, the trader would like to sell an option having a bid price that is the same as, or higher than, the trader's theoretical sell price. The trader would like to buy the option from anyone offering a price that is the same as, or lower than, the trader's theoretical buy price.

Accordingly, in the embodiment illustrated in FIG. 3, the theoretical price look-up table 435 is designed to correlate the current market price of an underlying security to the theoretical buy and sell prices of the options for which automated trading is performed. For example, if automated trading is performed for options underlying Exxon stock, the theoretical price look-up table correlates the current price of Exxon stock to the theoretical buy and sell prices of Exxon stock options. If the price of Exxon stock changes, the theoretical price look-up table can be used to index different theoretical prices for the Exxon stock options.

Similar to the option look-up table 430, the theoretical price look-up table 435 may to be organized in several ways. For example, all theoretical buy prices for a given price (such as bid price or ask price) of an underlying security may be provided in a single column of a look-up table 435, with a separate look-up table provided for theoretical sell prices. Alternatively, the look-up table 435 may index both a theoretical buy price and a theoretical sell price. The theoretical price look-up table 435 may be segmented or multi-dimensional. Moreover, the theoretical price look-up table 435 may be combined with, a portion of, or linked to option look-up table 430.

In addition, the theoretical look-up table 435 and the option look-up table 430 can be structured consistent with the particular search protocol used by the option look-up protocol 420 so that certain options or other items are located by the search protocol before other options or items. For example, if option look-up protocol 420 implements a linear search, the first options in the option look-up table 430 and the theoretical look-up table 435 (e.g., at the top of the tables 430 and 435) will be reviewed by the option look-up protocol 420 before options at the bottom of the table. Accordingly, the trader station 230 or the backend computer 225 may structure the option look-up table 430 and/or the theoretical price look-up table 435 so that options that have shown in the past, or are likely to show in the future, the most promising profits will be located first. The particular order of the options in the tables 430 and 435 may depend on the trading volume in an option, for example. Options with relatively high traded volumes over recent trading days or the current trading day may be given a higher priority ranking in look-up table 430 and/or theoretical price look-up table 435. Moreover, some exchanges may limit the number of orders that a particular trader may submit at a given time. Accordingly, structuring the tables 430 and 435 as described increases the opportunity for the trader to participate in the most lucrative transactions when there are restrictions on the number of concurrent orders placed.

In accordance with the embodiment shown in FIG. 3, the trader station 230 may respond to changes in variables (2)-(7) and/or other variables taken into account in determining theoretical buy and sell prices by updating the theoretical price look-up table 435. Alternatively, the theoretical price look-up table 435 may hold theoretical prices over ranges of any one or more of the items defined by theoretical price variables (1)-(7) described above, as well as other variables that one may wish to take into account, such as variable buy and sell spreads (described in more detail below). In such a case, theoretical price is identified in an n-dimensional look-up table 435 responsive to n variables. Calculating the theoretical value for options or other trading derivatives can be relatively time consuming. Moreover, the theoretical values for a series of options change when one of the contributing variables changes. As noted above, some of these variables, such as price of the underlying security, may change frequently. Use of the theoretical price look-up table 435 avoids the need for recalculating theoretical prices when the value of a variable that affects the theoretical price changes. Calculating the theoretical price each time a variable changes unnecessarily consumes computer resources, such as CPU time, better allocated to performing automated trading. The automated trading system of the present invention utilizes a precalculated table of theoretical prices over a range of one or more variables that affect theoretical price. Accordingly, when a variable affecting theoretical price (such as the market price of the underlying security) changes, the automated trading system simply references a new theoretical price in the theoretical price look-up table 435 and uses the new theoretical price in deciding whether to buy or sell options.

The values stored in the theoretical price look-up table 435 may be calculated, for example, using one or more of the trader stations 230, a backend computer 220, the backend computer 225, or some combination of these. When a trader station 230 calculates the values for the theoretical price look-up table 435, the backend computer 225 may be free to focus its computing resources on automated trading. However, the additional overhead associated with using the backend computer 225 to calculate the values for the theoretical price look-up table 435 may be acceptable in some applications.

Referring still to FIG. 3, decision logic 450 compares the theoretical price identified in the theoretical price look-up table 435 to the market price for the option, and based on the comparison, determines whether the option should be bought or sold. For example, in an embodiment in which the theoretical look-up table 435 indexes theoretical buy and sell prices for a particular option based on the price of the underlying security, decisions may be triggered (1) when the market price of the underlying security changes, but the market bid and ask prices of the option remain the same (i.e., changing underlying price, static option price), (2) when the bid or ask price of the option changes, but the market price for the underlying security remains the same (i.e., changing option prices, static underlying price), (3) when the values of theoretical price table 435 are updated, (4) when automated trading is enabled for a particular option, and (5) when safety checks are relaxed for a particular option.

Consider example (1) in which the theoretical buy (sell) price of a particular option to changes (for example, as a result of a change in underlying security price) and the bid and ask prices of an option remain static. Decision logic 450 will compare the current market ask (bid) price of the option to the new theoretical buy (sell) price obtained from the theoretical price table 435. In this case, the decision logic 450 performs all comparisons affected by the change in underlying price. For example, a change in the bid (ask) price of the underlying security may affect the theoretical buy (sell) price of some or all call options and the theoretical sell (buy) price of some or all put options associated with the underlying security. Accordingly, the decision logic 450 makes comparisons of market bid or ask prices corresponding to new theoretical sell and buy prices.

Consider example (2) in which the market bid (ask) price for a particular option changes and the price of the underlying security remains static. The decision logic 450 will compare the new market bid (ask) price to the corresponding theoretical sell (buy) price that exists at that time from the theoretical price table 435. Accordingly, a change in market bid (ask) price of a particular option may trigger a comparison of market bid (ask) price to theoretical sell (buy) price. Based on the comparison, for example, if the market bid (ask) price is greater (less) than or equal to the theoretical sell (buy) price, the automated trading system may prepare an order for the particular option.

Consider example (3) in which the theoretical price look-up table 435 is updated with static market option and underlying prices. For example, when the look-up table 435 is updated, the decision logic 450 compares the updated theoretical buy and sell prices corresponding to the current market price of the underlying security to the current ask and bid prices of the options subject to automated trading. As noted above, the theoretical price look-up table 435 may be updated when, for example, one or more of the values that effect the theoretical buy and sell prices changes such as, but not limited to, the buy and ask spreads and/or theoretical variables (2)-(7). For example, theoretical price variables (2)-(7) discussed above could change, perhaps due to a change in the trader's assessment of market conditions. These changes may occur when the trader enters new information through a trader station 230 or when new information becomes available through another source (e.g., a change in risk-free interest rate occurs in a database associated with the trading site 200). A change in one or more of variables (2)-(7) triggers a re-computation of (probably) all values in the theoretical look-up table 435. These new values in table 435 are updated on backend computer 225. Accordingly, the decision logic 450 makes comparisons of market bid and ask to prices corresponding to new theoretical sell and buy prices.

Consider example (4) when automated buying or selling trading for a particular option is changed from disabled to an enabled state. This could arise, for instance, at the beginning of the trading day if the default state of a new trading session is all options disabled. Enabling automated selling (buying) for a particular option or group of options can trigger decision logic 450 to make a comparison of the market bid (ask) prices to the theoretical sell (buy) price in table 435.

In addition to enabled and disabled states, a third, "warming up" or "test" state may be provided for an option in the automated trading system. In this third state, the automated trading system may perform all steps except actually placing an order. This allows the trader to monitor the operation of the automated trading system without actually submitting orders, thereby reducing the risk of enabling options for automatic trading using theoretical prices which are not market realistic.

Consider example (5) in which a safety check for a particular option is relaxed. This could arise, for example, if a global safety check condition implemented by safety check logic 460 is disabled or changed. For example, a safety check condition relating to the maximum quantity or frequency of trading attempts of a particular option may be increased. In connection with the trading frequency condition, the entire automated trading system may be held in a "pause" state if it had made more than a predetermined number (e.g., 3) automated trading attempts within a predetermined time period (e.g., 60 seconds). If this global safety check is disabled or relaxed, for example, by increasing the predetermined number of attempts (e.g., from 3 to 5), the trading frequency safety check may no longer be in violation. As a result, the entire automated trading system may transition from the "paused" state to the enabled state. If a particular option had been enabled for automated selling (buying), the decision logic 450 will then compare the market bid (ask) price to the theoretical sell (buy) price in table 435.

Decision logic 450 determines that a sell (buy) order should be submitted if the market bid (ask) price is greater (less) than or equal to the theoretical sell (buy) price. Even if decision logic 450 determines that an order should be submitted, safety check logic 460 may be used to prevent an order from being submitted. Safety check logic 460, for example, can block orders entirely, or put a cap on the maximum quantity attempted to be bought or sold, for an option when acceptance of that order would result in the trader having a position greater than a predetermined threshold quantity of that option. Also, the automated trading system may be paused or stopped if the number of attempted orders exceeds a predetermined amount in a predetermined period of time. The constraints may be provided in look-up tables provided to the automated trading system and may be varied for individual options. Other constraints may involve generating warnings and/or preventing orders, for example, when the: is (1) theoretical buy price exceeds the theoretical ask price, (2) theoretical buy price exceeds the theoretical value, (3) theoretical sell price is less than the theoretical value, and/or (4) theoretical sell price is less than the intrinsic value of the option. The intrinsic value may be defined as the difference between the strike price and the market price of the underlying security for puts, and the difference between the market price of the underlying security and the strike price for calls, where the minimum intrinsic value is zero. The trader may be able to override some or all of the checks performed by safety check logic 460 to increase speed of automated trading.

If the safety checks are passed (or overridden), order logic 470 creates an order and submits the order to the exchange site 100 via an output interface 480. The trading station 230 is notified through a trading station interface whether or not the safety checks are passed. The output interface 480 may pass the order to exchange interface software for ultimate transmission to the exchange site 100. The receiver interface 410 and the output interface 480 may be formed by common equipment and/or data ports.

FIG. 4 illustrates an example of theoretical price look-up table 435 for call options with an expiration date of Sep. 20, 1999; an annualized volatility of 32.0%; expected dividend to be paid on the underlying security on Aug. 19, 1999, for an amount of $10.0; risk free interest rate of 3.0%; American style option; and today's date being Jun. 3, 1999. When created, the look-up table 435 may be centered about the current price of the underlying security. Each row of the look-up table 435 provides theoretical prices for a given strike price. As illustrated, the look-up table 435 includes twenty (20) rows having strike values ranging from 50.0 to 97.5, in increments of 2.5. The strike values correspond to individual options available for trading as determined by the exchange. The trader may limit the set of options to those he/she actually trades, and consequently can enable them for automatic trading, individually or in predefined groups. The columns of the look-up table 435 provide theoretical prices for a given price of the underlying security. The range of underlying security price provided in the table and the incremental price between adjacent entries (tick to size) can be selected by the trader. For example, the look-up table 435 shown in FIG. 4 has twenty-nine (29) price entries ranging from 75.0 to 77.8 with tick size is 0.1 and with the underlying price centered at 76.4. A smaller tick size and a larger range will, of course, result in a larger look-up table. Under the assumptions of FIG. 4, a September 1999 call, with a strike price of 72.5 and an underlying price of 77.2 (using a definition of underlying price determined by the trader), has a theoretical price of 7.30.

Several alternatives are available for updating the look-up table 435 to avoid the underlying price from exceeding the boundaries of the table. For example, the automated trading system may notify the trader station 230, which may then in turn supply an updated look-up table 435 centered about a new underlying price. The trader station 230 may be called upon to calculate the additional entries needed to complete the updated look-up table 435 or simply recall them from memory. For example, the look-up 435 table may be updated dynamically from the trader station 230 when the underlying price moves from the center price by a predetermined margin. This methodology serves to increase the processing power that the backend computer 225 can apply to automated decision making. The look-up table 435 can be checked periodically to ensure the accuracy of its content. For example, checks may be performed every, say, 15 seconds. This can be done, for example, by performing a checksum operation in which the entries in the look-up table are summed and the sum is compared with the sum of a corresponding look-up table maintained by a trader station 230. If the sums match, the look-up table 435 may be presumed to be accurate. If the sums do not match, a warning is generated and automated trading is stopped completely or paused until look-up table 435 is reloaded or updated and accuracy can be ensured. Of course, other or additional techniques for testing the accuracy of look-up table 435 may be implemented. Moreover, such an accuracy check may be omitted if one is sufficiently confident in the reliability of the software and hardware.

Knowledge of how the search protocol locates data within the look-up tables may be used to structure the look-up tables to ensure that selected options will be located particularly quickly. The selected options may be, for example, frequently traded options and/or options whose price will become attractive with a small change in the underlying security price. For example, the look-up protocol may conduct searches by starting at the first row of the table and then stepping through each successive row until a particular row is identified. In this case, the look-up table may be structured so that a select option is placed in the first row. Consequently, the search protocol will locate the select option first. Statistics may be maintained, for example, at a trader station 230, and used to restructure the look-up table as trading conditions change.

The embodiment described in connection with FIG. 3 compares the current market price of an option to theoretical buy and sell prices from a theoretical option price look-up table 435 to make a buy/sell decision. However, other values may be compared consistent with the present invention to generate buy/sell decisions. For example, the theoretical option value may be subtracted from the market bid (ask) price and compared to a sell (buy) spread selected by the trader to generate buy/sell decisions. Alternatively, the market option bid (ask) price and the price of the underlying security may be used to index an implied volatility value, for example, with that indexed implied volatility value compared to a trader-generated volatility value to make buy/sell decisions. Of course, other values may also be indexed and used for comparison to generate buy/sell decisions consistent with the present invention.

Figure 5A:
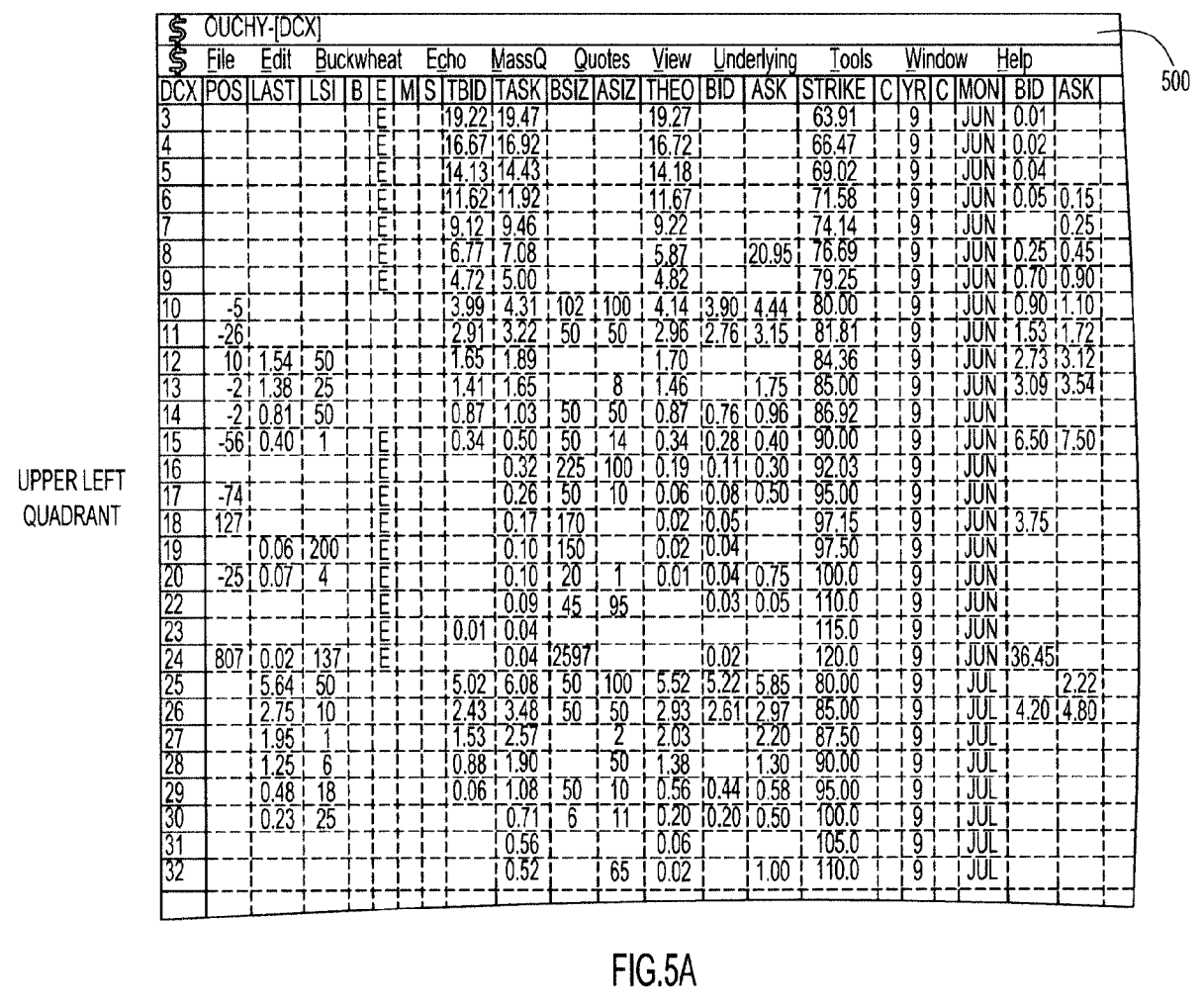
Figure 5B:
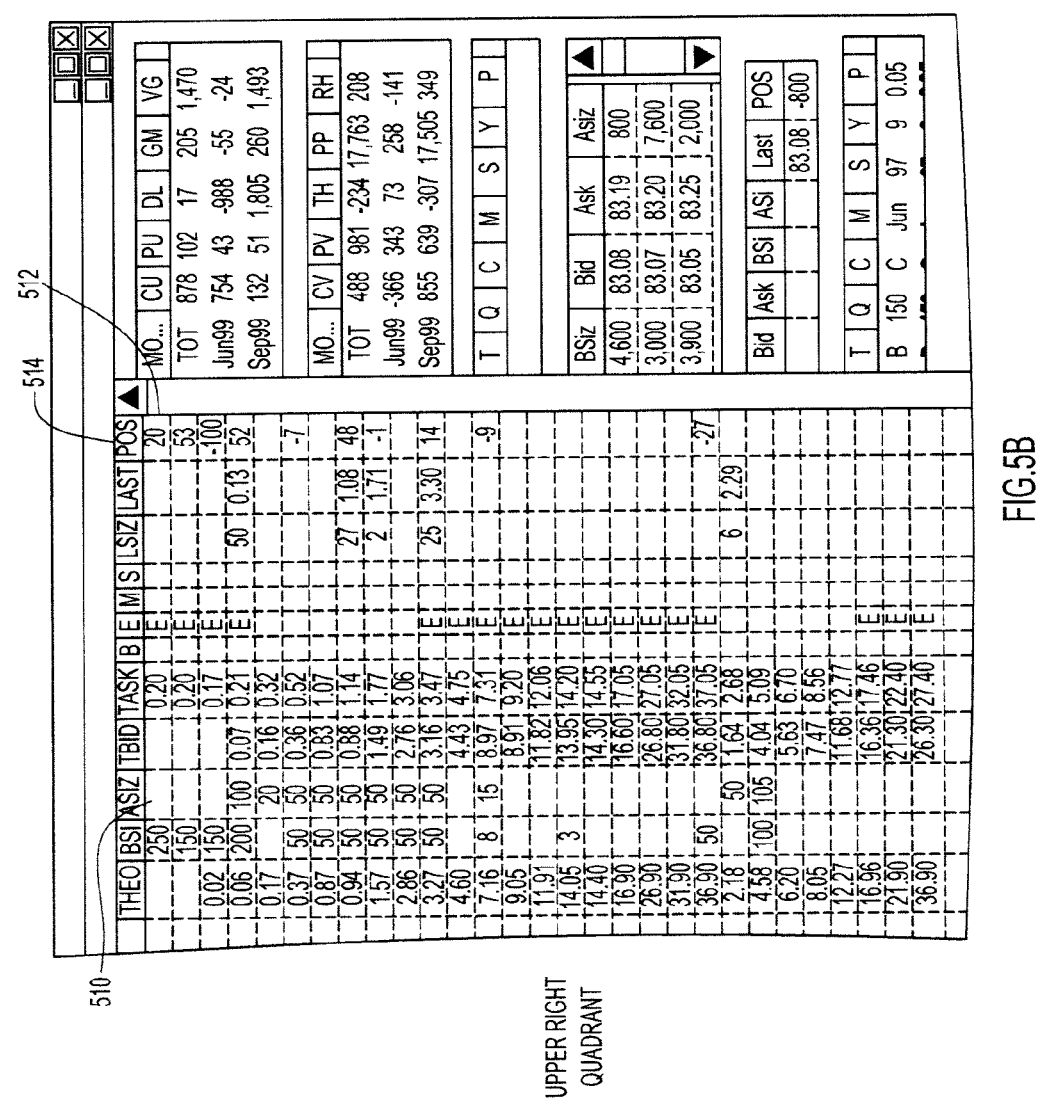
Figure 5C:
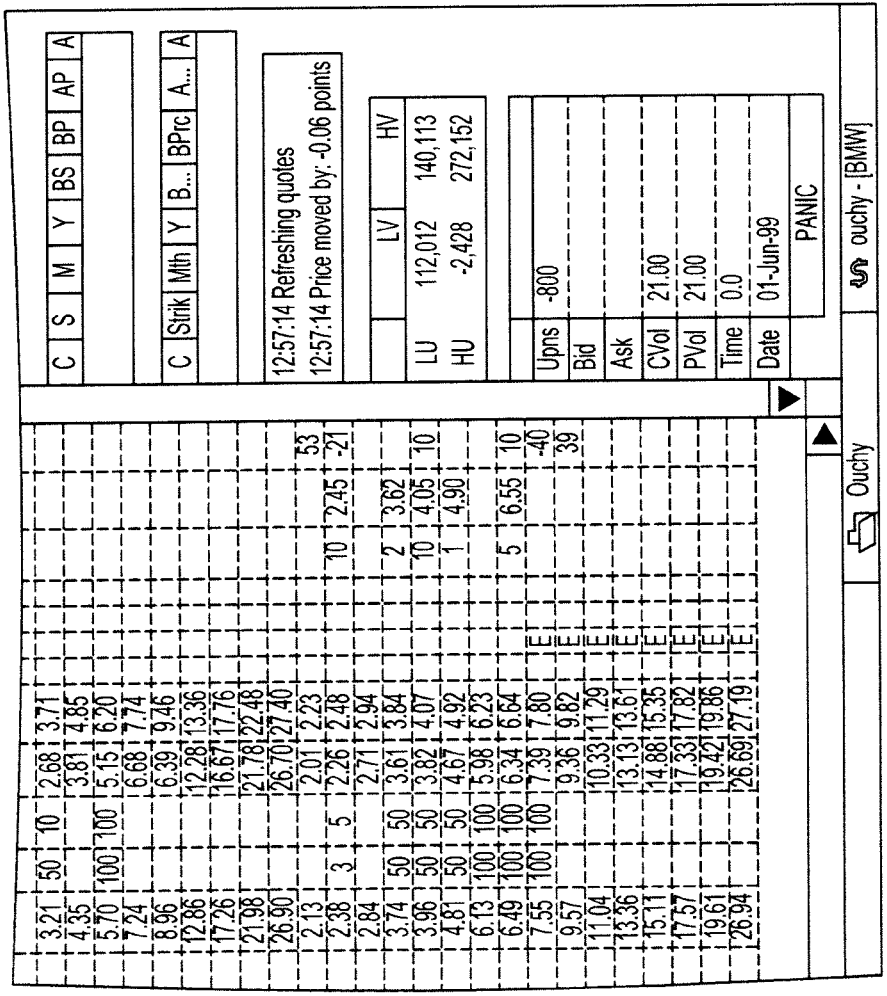
Figure 5D:
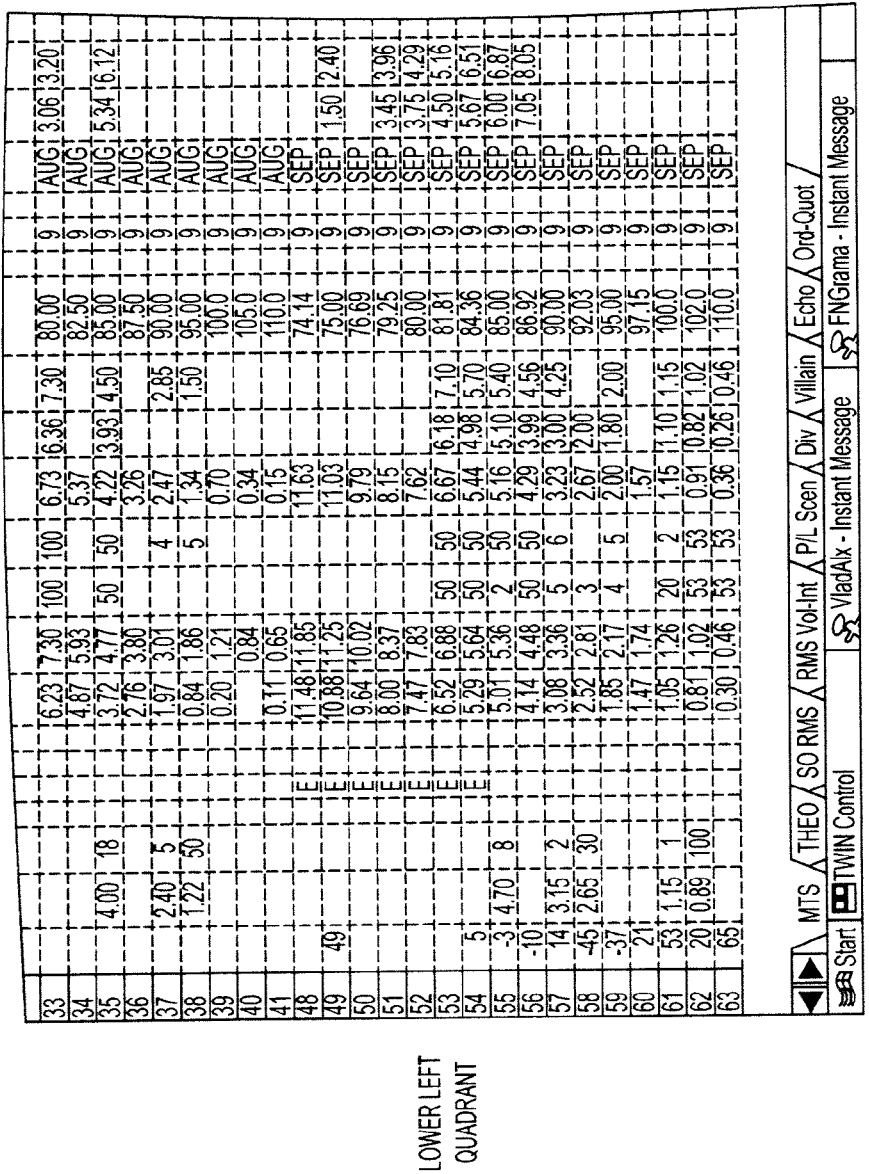

FIG. 5 illustrates an embodiment of a trader screen 500 displayed on a trader station 230 in connection with trading options on a particular security or commodity. The trading screen 500 may provide a graphic user interface to enable the trader to set parameters associated with automated trading. Trading screen 500 is organized as an array of cells 510. The rows 512 of the array represent different options available in the market for the particular security or commodity. The columns 514 of the array provide information concerning the options. More particularly, the columns to the left of the "Strike" column provide information on call options and the columns to the right of the "Mon" column provide information on put options. Call and put options are, thus, displayed as mirror images of each other.

Each row of the array represents information relating to a different pair of call and put options for a particular strike price, month and year. The first column from left to right is labeled "DCX," which identifies the underlying security for the options as Daimler-Chrysler stock. The values below the "DCX" label consecutively number the rows of the array. The trading screen may be scrolled up or down to view additional rows in the array, if any exist. The next fourteen columns contain information relating to call options. The second column, "POS," is to the right of the "DCX" column. The values below the column heading POS indicate the trader's position (i.e., how many of the options the trader possesses) in call options for each row of the array. A negative cell value in the "POS" column indicates that the trader has sold more of the option than she has bought (this is called a short position. Positive values denote a long position). Cells in the "B" column (three columns to the right of the "POS" column) indicate whether automated buying is enabled for the particular options corresponding to those cells. Cells in the "S" column (three columns to the right of the "B" column) indicate whether automated selling is enabled for the particular options corresponding to those cells. The trader may select one or more sells in the "B" and "S" columns to enable or disable automated buying and selling, respectively, of options corresponding to the selected cells.

The "TBid" and "TAsk" columns indicate the theoretical buy and sell prices for automated trading. The "Theo" column represents the theoretical value assigned to the call option for each row. To the right of the "Mon" column, the screen provides "TBid," "TAsk," "Theo," and "POS" columns, among others, for the put options in each row of the array. Additional details concerning the remaining columns of the trader screen 500, as well as other information concerning its functionality, can be found in U.S. application Ser. No. 09/273,362 to Marynowski et al., filed Mar. 22, 1999, and expressly incorporated herein by reference.

The "POS" columns provide information received from the exchange site and are not adjustable by the trader. The "TBid," "TAsk," and "Theo" columns may be adjusted by the trader using a mouse, keyboard, or other input device, such as a game pad. For example, the trader may select a particular "TBid" or "TAsk" cell by clicking once and then using up or down arrows, for instance, to increase (arrow up) or decrease (arrow down) the value. Mathematically, this may be achieved by increasing or decreasing the bid spread value (BSprd) or the ask spread value (ASprd). This may not effect the "Theo" value since BSprd and ASprd are not inputs into the "Theo" calculation. A particular "Theo" cell may be adjusted in the same manner as a "TBid" or "TAsk" cell. Mathematically, adjustments to a Theo cell may be achieved by increasing or decreasing the assumed volatility of that particular option. Since "TBid" and "TAsk" of a particular option are related to the "Theo" value, changes to the "Theo" obviously will change "TBid" and "TAsk." The "TBid", "TAsk", and "Theo" values may also adjustable in groups, for example, by selecting multiple cells or all cells in the column by selecting the column header. The trader station 230 may update the displayed values of Theo, TBid and TAsk values as the underlying security price change, or any variable contributing to Theo, TBid, or TAsk change (such as theoretical variables (2)-(7) discussed above). For example, the trader station 230 may receive a market to feed providing price information concerning the underlying security. The price information may be used to update or refresh the trading screen 500. This may include the displayed TBid, TAsk, and Theo values for a given underlying price. Additionally, market information received by 230 may trigger an update of the theoretical price look-up table 435 maintained at the backend computer 225. For example, if the underlying price has moved sufficiently far enough from the value of the underlying security used the last time table 435 was created and/or last modified, trading station 230 may update theoretical look-up table 435 using the most current underlying price as a new center point. The updates of the theoretical price look-up table 435 maintained at the backend 225 might be accomplished several different ways. For example, the trader station 230 may perform calculations and supply the calculated information to the backend computer 225 for updating the theoretical price look-up table 435. As an alternative, the trader station 230 may supply data to the backend computer 225, which is used to calculate updates of the theoretical price look-up table 435. Of course, updates of look-up table 435 may not be necessary if the new information (e.g., price information of the underlying security) corresponds to a value: (1) already in the theoretical price look-up table 435, and/or (2) within predetermined margins around the previous center value of the look-up table 435.

FIG. 6 provides an exemplary progression of steps from transmission of the current market information from the exchange site 100 to receipt of trade confirmation by the trader site 200 and the delay experienced at each step. Link 1 represents the line delay experienced by current trading information as it is transmitted from the exchange site 100 to the trader site 200. Locating the automated trading system close to the exchange site 100 reduces the line delay of Link 1 (as well as that of Link 15). Thus, by reducing the delay associated with making automated trading decisions as well as the associated line delay, the overall speed in submitting orders to the exchange site 100 is increased. Moreover, the trader station 230 that monitors and controls the backend computer 225 that implements the automated trading need not be located close to the exchange site 100, but may monitor and control the backend computer 225 remotely.

Link 2 represents delays associated with operating system (networking subsystem) related to receiving data packets from the exchange site 100. One technique for reducing this delay is to choose a platform, such as VMS or Linux, that has a good quality implementation of networking services used in automated trading.

Link 3 represents delays associated with decompressing information received from the exchange site 100. Link 4 represents other processing delays that may be inherent in exchange interface software provided by the exchange for use at the trader site 200. The exchange interface software allows the trader's equipment to interface with the exchange equipment. The exchange may impose obligations requiring traders to use the exchange interface software in trading. The exchange interface software, for example, may process the received market data and supply the data to an interface of an automated trading application installed by the trader. For instance, the market data may be input to internal tables and/or may be converted to actual values. Links 5 and 6 represent delays associated with the distribution of information from the exchange interface software to an interface of the trading system application. The exchange site 100 typically broadcasts information concerning all traded items. Each trading application usually subscribes to several sources of data (e.g. market data and trade confirmations for several products). In some cases, the exchange interface software will receive and decode all information received from the exchange site 100, but only pass some of the information to the interface of the automated trading system. The exchange interface software spends some time in determining whether a particular piece of market information should be passed to the automated trading system. The exchange interface software and the trading system interface software communicate via a protocol. For example, the exchange interface software may notify the automated trading system via a callback function supplied by the latter, or by some other operating-system dependent mechanism (e.g., mailboxes on VMS). This delay can be reduced by choosing a platform that efficiently supports the protocol chosen.

After receiving the current market information, the automated trading system decodes the information and, using a look-up protocol, searches a table of traded products, resulting in a delay indicated by link 7. A hash table with an efficient hash key or a search tree may be used to reduce the delay associated with the processing associated with link 7. The particular look-up protocol should be fine-tuned to the platform used for the automated trading system as performance may vary with the platform to the extent that a linear search may prove better than a hash table even for a surprisingly large number of products (over 100). The look-up time for hash tables is almost constant. For binary trees, the look-up time is proportional to the logarithm of N (in $O(\log N)$), where N is the number of products traded. A linear search has a look-up time that is proportional to N (in $O(N)$). Of course, the actual times to encountered in practice matter, so the look-up protocol should be tailored to the platform used Link 8 represents the delay attributable to decision-making and safety checks. As noted above, decisions are made based on a numeric comparison between the current market price and the corresponding theoretical price. Safety checks account for most of the delay experienced in link 8. Safety checks may include, for example: (1) price and quantity reasonability checks, and (2) trade attempt frequency limitations.

Links 9-15 corresponds to the delay associated with composing an order and submitting the order to the exchange. In particular, link 9 reflects the time spent composing the order, which may require a format defined by the exchange. Link 10 corresponds to the time required for the automated trading system output interface to communicate the order to the exchange interface software. This may be done, for example, using a synchronous function call or an asynchronous call. In some embodiments, the tasks associated with links 9 and 10 may be performed at the same time. Links 11 and 12 correspond to the time expended while the exchange interface software receives the order, decides which module should be used to submit the order, interprets the order request, and performs a series of validations. If the order passes these tests, it is converted into the exchange format and passed to the exchange, as indicated by links 13-15.

As noted above, the delays attributable to links 1 and 15 may be reduced by locating the automated trading system close to the exchange site 100. In addition, if routers and LANs are used at the trader site 200, the selection of high-speed equipment may reduce delays and/or priority schemes. The delay experienced in links 2-14 may be reduced, of course, by using a faster computer. However, the efficiency of the software and algorithms is also an important factor in reducing delay. Further, in some situations, it is possible to integrate the automated trading system software with the software that interfaces with the exchange site 100, which leads to reduced delay. In such a case, the automated trading system receiver and output interfaces may be the same as the exchange receiver and output interfaces.

In accordance with the present invention, assuming a change in the bid or ask price, links 6 and 7 may be completed within 80 microseconds, and commonly may be completed within 60 microseconds, and as fast or faster than 31 microseconds. The time from link 6 to the completion of the decision-making by the decision logic may be less than 155 microseconds, less than 120 microseconds, and even less than 80 microseconds. Links 6-8 may be completed within 690 microseconds, may be completed within 370 microseconds, and performed as fast as 260 microseconds or less. Links 6-9 may be completed within 930 microseconds, commonly be completed within 585 microseconds, and as fast or faster than 301 microseconds. Assuming now a change in the price of the underlying security, the time from receipt of the new price information by the automated trading system to submission of an order may be may be the same as or about 20-25 microseconds more than the totals provided in connection with links 6-9 above, depending on the number of options or other items in the data structure (e.g., table) and their respective order. The times required for links 2-5 and 10-14 are generally determined by exchange software and, accordingly, may change from exchange to exchange.

Link 16 reflects the processing of the order at the exchange site 100. Following the exchange site 100 processing, a confirmation of the trade is returned to the trader if the trader's order is matched. Not all orders result in a match. There is no sharing of lucrative trades with other traders who may have submitted similar matching orders that are received by the exchange even some microseconds later.

The embodiment illustrated in FIG. 6 corresponds to an arrangement in which the interface software provided by the exchange and the automated trading system are resident on the backend computer 225. In arrangements in which the interface software and the automated trading system are resident on separate backend computers, the vertical dashed line 610 indicates the interface between the separate computers. The separate backend computers may be connected via network interface cards or a common hub. Additional delays may be experienced in the transmission and reception of between the backend computers as well as from LAN throughput and latency.

Figure 7:
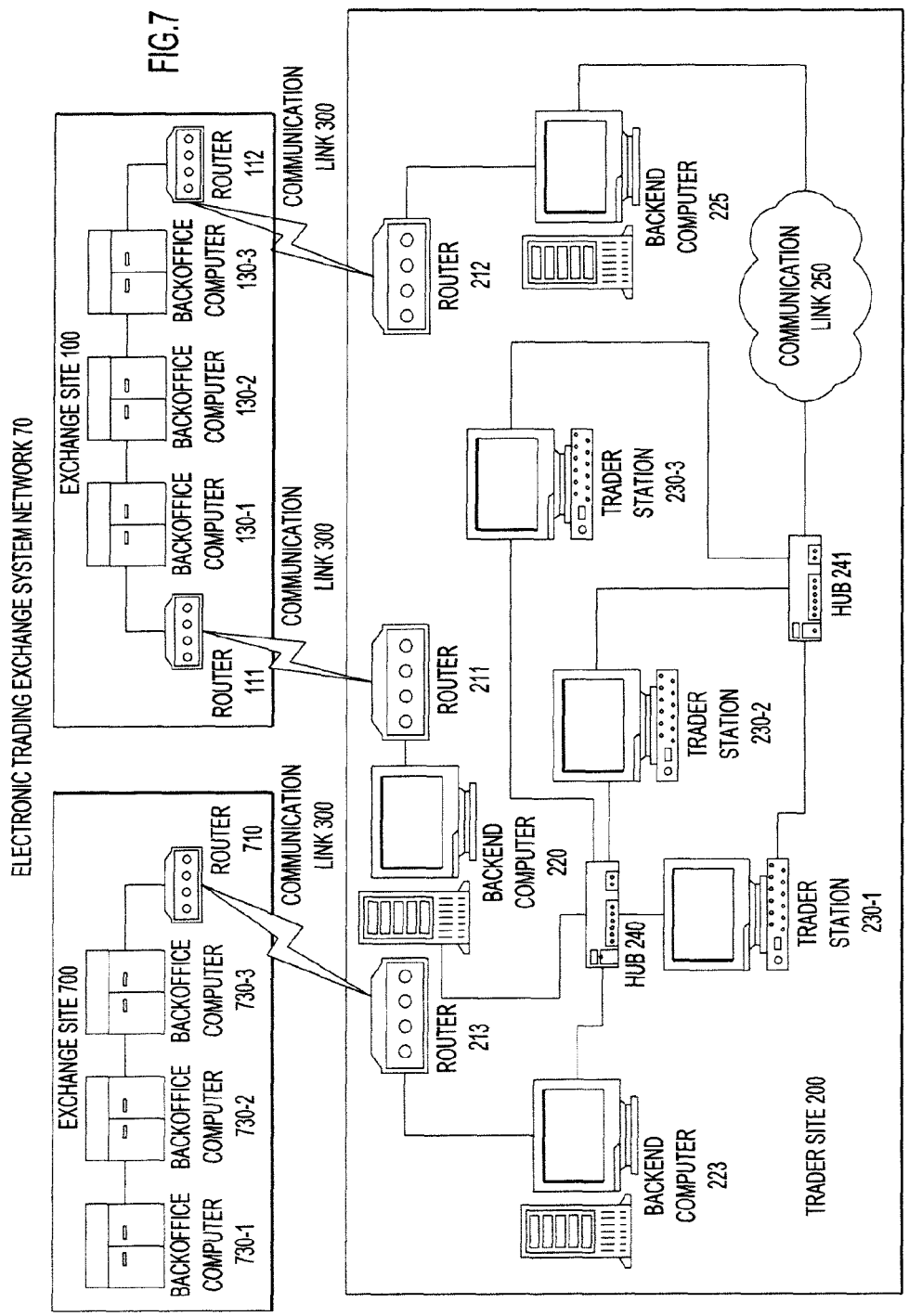
FIG. 7 illustrates a further embodiment of an electronic exchange system network in accordance with the present invention.

FIG. 7 provides a schematic of an embodiment of an electronic trading exchange system network 70 coupled to multiple trading sites. The electronic trading exchange system network 70 is similar to that shown as 10 in FIG. 1 and, for the sake of brevity, duplicative description will be omitted.

As shown in FIG. 7, exchange site 700 is coupled to trader site 200 by communication links 300. In one embodiment, the exchange site 700 may be designed as a local area network (LAN) and include, for example, one or more security routers and one or more back office computers, among other equipment. For purposes of illustration only, a single security router 710 and three back office computers 730-1, 730-2, 730-3 (referred to collectively as back office computers 730) are shown in FIG. 7. Security router 710 controls communications between the back office computers 730 and the communications link 300. Security router 710 transmits and receives communications over the communications link 300, as well as restricts communications from unauthorized sources. More particularly, the security router 710 may be used to isolate the equipment at the exchange site 700 from intrusion and facilitate communication with the back office computers 730. The back office computers 730 manage the trading of the various securities, currencies, commodities and/or other items traded on the exchange. In this regard, back office computers 730 may function similarly to the back office computers 130 of exchange site 100.

For purposes of illustration only, trading site 200 additionally includes a security router 213 and a backend computer 223 coupled to hub 240. The security router 213 and backend computer 223 may be located remotely from other equipment of the trader site 200. Security router 213 transfers trading information between the trading site 200 and the exchange site 700. As above, the security router 213 screens communications from unauthorized sources. Backend computer 223 may be configured as a communication server for the trader stations 230. Hub 240 handles communications between backend computer 223 and trader stations 230.

In the embodiment shown in FIG. 7, trader site 200 is connected to a first exchange site 100 and a second exchange site 700. Of course, other network arrangements may be used in connection with the present invention. Through the first exchange site 100, the trader site 200 may receive market information and trade securities, such as options, futures, and other derivatives; currencies, stocks, bonds, and other physicals like corn, metals, electricity, etc., and/or other items. Through the second exchange site 700, the trader site 200 may receive market information and/or trade securities (e.g., options, futures, and other derivatives; currencies, stocks, bonds, and other physicals like corn, metals, electricity, etc.,) and/or other items. Traders site 200 receives market information and trades securities or other items related to the securities or other items traded through the first exchange site 100.

The trader site 200 may be equipped with an automatic hedging capability that automatically buys or sells securities (e.g., futures, options, swaps or other derivatives; currencies, stocks, bonds, or other physicals like corn, precious metals, electricity, etc.) and/or other items traded on the exchange to hedge at least some of the risk (for example, delta risk) associated with an automated trade for other securities or items. For example, trader site 200 may trade options for a particular stock through exchange site 100 and the particular stock through exchange site 700. In general, two types of orders may be submitted to an exchange to buy (sell) a security. A market order instructs the exchange to buy (sell) a specified quantity of the security at the going market price. A limit order instructs the exchange to buy (sell) up to a specific quantity of the security if the market price is equal or better than a specified value. A trader usually can be assured that a market order will be filled by the exchange, but cannot be certain of the price at which the order is filled. The actual price that the market order is filled depends on available price and depth of market. While the trader placing a limit order can be assured of a price, all or a portion of the limit order may never be filled if the market price never meets the limit order conditions.

The principles of a market order and a limit order are illustrated by the following examples.

| Market Order Price | Market Order Quantity to Sell | Bid Price | Bid Amount | Matched Against Order? |
|---|---|---|---|---|
| Best Available Market Prices | 1000 shares | $110/share | 400 shares | Yes |
| | | $100/share | 600 shares | Yes |
| | | $80/share | 2000 shares | No |

The above table assumes a market with current bids of $110/share for 400 shares, $100/share for 600 shares and $80/share for 2000 shares, as indicated above. A market order to sell 1000 shares will be executed by the exchange at an average price of $104/share. In other words, the 1000 share market order will be matched with 400 shares at $110/share and 600 shares at $100/share, for a net of 1000 shares at an average price of $104/share.

If the bid of $110/share for 400 shares is sold just before the market order is received, the following market is presented.

| Market Order Price | Market Order Quantity to Sell | Bid Price | Bid Amount | Matched Against Order? |
|---|---|---|---|---|
| Best Available Market Prices | 1000 shares | | | Not Available |
| | | $100/share | 600 shares | Yes |
| | | $80/share | 2000 shares | Yes |

Because 400 shares at $110/share is no longer available, the exchange will match the market order using 600 shares of the $100/share bid and 400 shares of the $80/share bid, resulting in an average price of $92/share.

We next consider a similar scenario using limit orders instead of market orders.

| Limit Order Price | Market Order Quantity to Sell | Bid Price | Bid Amount | Matched Against Order? |
|---|---|---|---|---|
| $100/share | 1000 shares | | | Not Available |
| | | $100/share | 600 shares | Yes |
| | | $80/share | 2000 shares | No |

Now assume that a limit order to sell 1000 shares at $100/share is submitted instead of the market order and the $110/share bid has already been matched. The exchange will match 600 shares of the limit order at $100/share and will not match the remaining 400 shares because the $80/share bid is too low. Accordingly, the remaining 400 shares of the limit order will stay in the exchange's book until a new matching order to buy at $100/share or higher is received by the exchange, which may never occur, or until it is cancelled.

As discussed above, order submission in the automated trading system depends, for example, on the price of the underlying security, which is liable to change frequently. Thus, if the automated trading system makes an option trade, the trader may wish to hedge the risk associated with underlying price movement. This risk, commonly called delta risk, may be quantified using mathematical models. These models may be similar to, or the same as, the models used for determining theoretical option prices using input variables (1)-(7) discussed above. The option lot size (shares per option contract) and number of option contracts traded are typically factored into the hedging decision. The option lot size is typically defined by the options exchange when the contract is created and changed only under special circumstances, such as capital adjustments. The number of options that the trader has bought or sold is included in the confirmation notice transmitted from the options exchange. Accordingly, assuming a total delta hedge is desired, a trader may determine the number of shares of the underlying security to be bought or sold after each option trade based on: (1) mathematical models, including price of the underlying security, (2) options per contract and (3) number of options traded.

As noted above, the price of the underlying security may be defined in several different ways. A typical hedging response of an option trade will be to buy or sell the is underlying security. Specifically, buying (selling) calls and selling (buying) puts will usually lead to selling (buying) the underlying for delta hedging. Since the trader will need to sell (buy) the underlying to hedge the delta risk, he may be most interested in the bid (ask) price of the underlying security. While delta risk is referred to specifically, it should be understood that the automated hedging feature might be used to hedge other known risks. For example, automated hedging may be used to hedge the vega risk, the risk of a position or trade due to price changes of the options arising from changes of an option's volatility.

From a trading perspective, the trader must define how and to what extent to delta hedge. Obviously, a trader must first decide whether he wants to delta hedge manually, or automatically. In either case, he must consider two opposing dynamics: (1) speed of executing the underlying security orders, and (2) execution price of the underlying security orders. Typically, a trader may choose to hedge using market orders if she is most concerned about speed of execution, or limit orders if she is most concerned about the price at which the underlying orders are executed. As described above, entering a market order will (nearly) always result in the desired quantity being executed, but at potentially unfavorable or unexpected prices. Conversely, entering a limit order will always result in executed prices which meet certain criteria (i.e., greater than or equal to limit price if selling, and less than or equal to the limit price if buying), but only some or none of the desired quantity may actually be executed.

The trader may assess several qualitative factors in deciding whether to automatically hedge and, if so, whether to use market orders or limit orders. Some of the qualitative factors include the quantity of delta hedge underlying trade relative to the depth of the entire underlying market, volatility of the underlying market, the size of the underlying bid-ask price spread relative to the price of the underlying, and the amount of mental attention the trader can give toward the delta hedge trade. Different traders trading options on different underlying securities may opt for different hedging methods. Thus, in one embodiment of the automatic option trading system of the present invention, the trader may choose manual hedging, automatic hedging using market orders, or automatic hedging using limit orders.

The automatic hedging software may be resident on one or more of the trader stations 230, a backend computer 220, 223, 225, or other equipment of the trader site 200. One embodiment of the automated hedging system will be described in connection with FIG. 7. Backend computer 220 receives option trade confirmations from exchange site 100 based on an order submitted automatically by backend computer 225. Alternatively, or in addition, backend computer 225 may receive option trade confirmations from the exchange site 100. Further, the option trade confirmations may correspond to orders submitted either automatically or manually by a trader. Backend computer 220 routes the trade confirmation to a trader station 230 that is associated with the automatic option trade made by the backend computer 225.

If a manual hedge feature has been selected, trader station 230 displays the appropriate hedge action based on factors previously entered by the trader. For example, the trader may see a message such as "buy 4500 shares" of the underlying security. If automatic hedging using the market order has been selected, trader station 230 automatically submits a market order, for example to buy 4500 shares at the market prices, to exchange site 700 via backend computer 223. At the exchange site 700, the market order will (nearly) always be immediately filled by buying 4500 shares, albeit at a potentially unexpected or undesirable average price for those shares.

If automatic hedging using a limit order has been selected, trader station 230 automatically submits an order, for example to buy 4500 shares at a price of 68.05, to exchange site 700 via backend computer 223. The specific limit price submitted depends on the current underlying market and trader definable (a priori) as, perhaps, either: (1) current ask price, since she is buying, (2) average of current bid and ask price, or (3) last traded price. Depending on the market conditions, exchange site 700 may not be able to match the limit order immediately, if ever. Exchanges typically enable the trader to modify or delete partially matched or completely unmatched limit orders. In some cases, the exchange site through which the underlying security is traded may depend on the option traded. For example, both futures of an equity index (e.g. Standard and Poor's 500) and options on the same equity index may be traded through exchange site 100. A stock may be traded through exchange site 700, but options for the stock may be traded through exchange site 100. In such a case, the system configurations at either the trader station 230 performing hedging or other equipment at trader site 200 must ensure that hedge orders are routed to the appropriate exchange.

While the above-embodiments have been described in terms of look-up arrays or tables, it should be understood that data may include or be maintained in other organizational memory constructs consistent with the present invention, for example, linked lists, trees, heaps, hash lists, or some combination, or any other data structure or combinations of data structures useful in implementing a search algorithm. In addition, the trader site 200 is described as submitting orders to the exchange site 100 using the automated trading system. However, the trader site 200 may submit its "order" in the form of a quote to the exchange site, where the bid (ask) price of the quote corresponds to the theoretical buy (sell) price if, say, the trader wanted to buy (sell) the item.

It will be apparent to those skilled in the art that various modifications and variations can be made without departing from the scope or spirit of the invention. For example, the present invention may be applied in areas other than electronic securities, for example, the purchase and/or sale of goods or services, contests, auctions, and other applications in which fast, accurate responses are desirable. Other embodiments of the invention will be apparent to those skilled in the art from consideration of the specification and practice of the invention disclosed herein. It is intended that the specification and examples be considered as exemplary only, with a true scope and spirit of the invention being indicated by the following claim.

What is claimed is:

1. An automated trading system for use in an electronic exchange system network, comprising:
   a receiver interface in electronic communication with an electronic exchange system network, the receiver interface receiving electronic signals indicative of an option price of a option traded on the electronic exchange system network;
   a data processor that (1) generates an option threshold value for the option using at least price information for one or more securities underlying the option, (2) automatically compares the option threshold value to the option price, and (3) automatically determines, based on the result of the automatic comparison, whether one or more transaction request criteria are satisfied; and
   an output interface outputting a transaction request for the option to the electronic exchange system network within 150 milliseconds of receiving the electronic signals if the one or more transaction request criteria are satisfied.

2. The system of claim 1, wherein the option threshold value is a sell value representing a current desired price for selling the option by the automated trading system.

3. The system of claim 2, wherein the sell value includes a spread value adjustable by a user.

4. The system of claim 1, wherein the transaction request criteria include a price condition that is satisfied if the option threshold value is less than the option price.

5. The system of claim 4, wherein the transaction request is a sell order for the option.

6. The system of claim 5, wherein the sell order is a sell order for the option at a price equal to or less than the option price.

7. The system of claim 5, wherein the sell order is a price quote including a sell price equal to or less than the option price.

8. The system of claim 1, wherein the option threshold value is a buy value representing a current desired price for buying the option by the automated trading system.

9. The system of claim 8, wherein the buy value includes a spread value adjustable by a user.

10. The system of claim 1, wherein the transaction request criteria include a price condition that is satisfied if the option threshold value is greater than the option price.

11. The system of claim 10, wherein the transaction request is a buy order for the option.

12. The system of claim 11, wherein the transaction request is a buy order for the option at a price matching the option price.

13. The system of claim 11, wherein the buy order is a buy order for the option at a price equal to or greater than to the option price.

14. The system of claim 11, wherein the buy order is a price quote including a buy price equal to or greater than the option price.

15. The system of claim 1, wherein the receiver interface is in electronic communication with a communication network of the electronic exchange system network.

16. The system of claim 1, further comprising a memory, wherein the price information of the one or more securities underlying the option is stored in the memory.

17. The system of claim 1, further comprising a memory, wherein the price information of the one or more securities underlying the option is stored in a look-up table in the memory.

18. The system of claim 1, further comprising the receiver interface receiving price information of the one or more securities underlying the option.

19. The system of claim 18, wherein the price information is received from an updating market feed.

20. The system of claim 1, wherein the data processor performs at least one check before the output interface outputs the transaction request.

21. The system of claim 1, wherein one of the one or more transaction request criteria is a safety condition.

22. The system of claim 21, wherein the safety condition is a maximum number of trades within a predetermined time period.

23. The system of claim 21, wherein the safety condition is a maximum quantity of the option.

24. The system of claim 1, further comprising a user input device and memory, wherein the user input device enables a user to enter a spread value, said memory stores the spread value, and said data processor generates the option threshold value using the spread value stored in memory.

25. The system of claim 1, wherein the option threshold value is derived from multiple factors, and a user input device enables a user to adjust one or more of the factors, thereby changing the option threshold value.

26. An automated trading system for use in an electronic exchange system network, comprising:
a receiver interface in electronic communication with an electronic exchange system network, the receiver interface receiving electronic signals indicative of an option price of a option traded on the electronic exchange system network, and receiving electronic confirmations of a successful trades;
a data processor that (1) generates an option threshold value for the option using at least price information for one or more securities underlying the option, (2) automatically compares the option threshold value to the option price, and (3) automatically determines, based on the result of the automatic comparison, whether one or more transaction request criteria are satisfied; and
an output interface outputting a transaction request for the option to the electronic exchange system network within 150 milliseconds of receiving the electronic signals if the one or more transaction request criteria are satisfied, and outputting a hedge order for a security in response to receiving an electronic confirmation of a successful trade based on the transaction request.

27. The system of claim 26, wherein the hedge order hedges at least some of the risk associated with the transaction request.

28. The system of claim 27, wherein the hedge order hedges at least some of the delta risk associated with the transaction request.

29. The system of claim 27, wherein the hedge order hedges at least some of the vega risk associated with the transaction request.

30. The system of claim 26, wherein the hedge order is a market order.

31. The system of claim 26, wherein the hedge order is a limit order.

32. The system of claim 26, wherein the hedge order is an order for at least one of the one or more securities underlying the option.

33. The system of claim 26, wherein the hedge order is an order for an option.

34. The system of claim 26, wherein the hedge order is output for execution on an exchange different than the electronic exchange system network.

35. The system of claim 26, wherein a type of the hedge order is selectable by a user through a user input device that communicates electronically with the automated trading system.

36. The system of claim 35, wherein the type of the hedge order is a market order for at least one of the one or more securities underlying the option or a limit order for at least one of the one or more securities underlying the option.

37. The system of claim 26, wherein the option threshold value is derived from multiple factors.

38. The system of claim 37, wherein one of the multiple factors is volatility.

39. The system of claim 37, wherein one of the multiple factors is an interest rate.

40. The system of claim 37, wherein one of the multiple factors is a dividend stream of at least one of the one or more securities underlying the option.

41. The system of claim 37, wherein the option threshold value is re-derived when one of the factors changes.

42. The system of claim 37, wherein at least one of the factors is adjustable by a trader through a user input device.

43. The system of claim 26, wherein the option threshold value is adjustable by a trader through a user input device that communicates electronically with the data processor.

44. The system of claim 43, wherein the option threshold value is derived from a theoretical price value and a spread value, and the user input device enables a trader to adjust the spread value, thereby changing the threshold value.

45. The system of claim 44, wherein the user input device enables a trader to adjust spread values for multiple derivative securities simultaneously, thereby changing the option threshold values for the multiple derivative securities.

46. The system of claim 43, wherein the data processor is located closer to the electronic exchange system network than the user input device.

47. The system of claim 43, wherein the data processor is located substantially closer than the user input device to the electronic exchange system network.

48. The system of claim 26, wherein the data processor is located near the electronic exchange system network.

49. The system of claim 26, wherein the data processor is located in the same city as the electronic exchange system network.

50. The system of claim 25, wherein the data processor is located in a different city than the electronic exchange system network.

* * * * *